US007341117B2

(12) United States Patent
Wylie et al.

(10) Patent No.: US 7,341,117 B2
(45) Date of Patent: Mar. 11, 2008

(54) METHOD AND APPARATUS FOR A MONODIAMETER WELLBORE, MONODIAMETER CASING, MONOBORE, AND/OR MONOWELL

(75) Inventors: Glenda Wylie, Spring, TX (US); Frank Zamora, Duncan, OK (US); Beegamudre N. Murali, Katy, TX (US); Baireddy R. Reddy, Duncan, OK (US); Larry S. Eoff, Duncan, OK (US); Jimmie D. Weaver, Duncan, OK (US); John M. Wilson, Duncan, OK (US); Denise Berryhill, Duncan, OK (US); Russell M. Fitsgerald, Waurika, OK (US); Anne M. Culotta, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 11/656,223

(22) Filed: Jan. 22, 2007
(Under 37 CFR 1.47)

(65) Prior Publication Data
US 2007/0187146 A1    Aug. 16, 2007

Related U.S. Application Data

(60) Division of application No. 11/153,046, filed on Jun. 15, 2005, now Pat. No. 7,225,879, which is a continuation of application No. 10/293,013, filed on Nov. 13, 2002, now Pat. No. 7,066,284.

(60) Provisional application No. 60/414,517, filed on Sep. 27, 2002, provisional application No. 60/335,132, filed on Nov. 14, 2001.

(51) Int. Cl.
C09K 8/04    (2006.01)
C09K 8/035    (2006.01)
E21B 7/26    (2006.01)
C09K 8/42    (2006.01)

(52) U.S. Cl. .......................... 175/72; 175/65; 166/295
(58) Field of Classification Search .................. None
See application file for complete search history.

(56) References Cited

U.S. PATENT DOCUMENTS 1,880,218 A    10/1932    Simmons
(Continued)

FOREIGN PATENT DOCUMENTS

GB    2172324    9/1986
(Continued)

OTHER PUBLICATIONS

OTC 8585; G Wylie, et al; *Case History, Well Completion and Servicing Strategies for the Hibernia Field*; 1998 Presented at the Offshore Technology Conference May 4-7, 1998; (pp. 109-124).
(Continued)

*Primary Examiner*—Zakiya W. Bates
(74) *Attorney, Agent, or Firm*—Conley Rose, P.C.

(57) ABSTRACT

An assembly and methods for constructing a MONOWELL includes a monodiameter casing disposed in a monodiameter wellbore having diametric efficiency with a monobore production delivery system disposed within the monodiameter casing. An assembly for constructing a monodiameter wellbore includes a bottomhole assembly having a overgauge hole drilling member, a directional steering assembly, a measurement while drilling tool, and a logging while drilling tool; a work string attached to the bottomhole assembly and extending to the surface; drilling fluids flowing through the work string and bottomhole assembly; chemical casing casing the borehole; expandable casing disposed in the wellbore; and a sealing composition disposed between the expandable casing and the wellbore.

37 Claims, 23 Drawing Sheets

U.S. PATENT DOCUMENTS

| | | |
|---|---|---|
| 2,173,033 A | 9/1939 | Armentrout et al. |
| 2,886,288 A | 5/1959 | Gehrke |
| 3,191,677 A | 6/1965 | Kinley |
| 3,191,680 A | 6/1965 | Vincent |
| 3,203,483 A | 8/1965 | Vincent |
| 3,358,769 A | 12/1967 | Berry |
| 3,526,280 A | 9/1970 | Aulick |
| 3,746,091 A | 7/1973 | Owen et al. |
| 4,069,573 A | 1/1978 | Rogers, Jr. et al. |
| 4,664,713 A | 5/1987 | Almond et al. |
| 4,716,965 A | 1/1988 | Bol et al. |
| 4,758,357 A | 7/1988 | Hoff |
| 4,773,481 A | 9/1988 | Allison et al. |
| 4,784,223 A | 11/1988 | Worrall et al. |
| 4,785,885 A | 11/1988 | Cherrington et al. |
| 4,799,550 A | 1/1989 | Harris et al. |
| 4,976,322 A | 12/1990 | Abdrakhmanov et al. |
| 5,146,986 A | 9/1992 | Dalrymple |
| 5,156,213 A | 10/1992 | George et al. |
| 5,181,568 A | 1/1993 | McKown et al. |
| 5,232,910 A | 8/1993 | Muller et al. |
| 5,252,554 A | 10/1993 | Muller et al. |
| 5,260,268 A | 11/1993 | Forsberg et al. |
| 5,293,938 A | 3/1994 | Onan et al. |
| 5,304,620 A | 4/1994 | Holtmyer et al. |
| 5,317,111 A | 5/1994 | Orban et al. |
| 5,335,726 A | 8/1994 | Rodrigues |
| 5,339,902 A | 8/1994 | Harris et al. |
| 5,348,095 A | 9/1994 | Worrall et al. |
| 5,366,012 A | 11/1994 | Lohbeck |
| 5,409,071 A | 4/1995 | Wellington et al. |
| 5,495,899 A | 3/1996 | Pastusek et al. |
| 5,529,123 A | 6/1996 | Carpenter et al. |
| 5,555,937 A | 9/1996 | Fisk, Jr. et al. |
| 5,571,318 A | 11/1996 | Griffith et al. |
| 5,588,489 A | 12/1996 | Chatterji et al. |
| 5,593,954 A | 1/1997 | Malchow, Jr. |
| 5,667,011 A | 9/1997 | Gill et al. |
| 5,685,379 A | 11/1997 | Barr et al. |
| 5,704,436 A | 1/1998 | Smith et al. |
| 5,706,905 A | 1/1998 | Barr |
| 5,743,335 A | 4/1998 | Bussear |
| 5,767,399 A | 6/1998 | Smith et al. |
| 5,775,425 A | 7/1998 | Weaver et al. |
| 5,787,984 A | 8/1998 | Mabile |
| 5,787,986 A | 8/1998 | Weaver et al. |
| 5,791,416 A | 8/1998 | White et al. |
| 5,794,702 A | 8/1998 | Nobileau |
| 5,794,720 A | 8/1998 | Smith et al. |
| 5,803,185 A | 9/1998 | Barr et al. |
| 5,807,811 A | 9/1998 | Malchow, Jr. |
| 5,833,000 A | 11/1998 | Weaver et al. |
| 5,839,510 A | 11/1998 | Weaver et al. |
| RE36,006 E | 12/1998 | Mueller et al. |
| 5,842,518 A | 12/1998 | Soybel et al. |
| 5,853,048 A | 12/1998 | Weaver et al. |
| 5,857,531 A | 1/1999 | Estep et al. |
| 5,869,434 A | 2/1999 | Mueller et al. |
| 5,871,049 A | 2/1999 | Weaver et al. |
| 5,873,413 A | 2/1999 | Chatterji et al. |
| 5,875,844 A | 3/1999 | Chatterji et al. |
| 5,875,859 A | 3/1999 | Ikeda et al. |
| 5,886,303 A | 3/1999 | Rodney |
| 5,899,958 A | 5/1999 | Dowell et al. |
| 5,925,598 A | 7/1999 | Mody et al. |
| 5,957,204 A | 9/1999 | Chatterji et al. |
| 5,984,568 A | 11/1999 | Lohbeck |
| 5,992,522 A | 11/1999 | Boyd et al. |
| 6,003,606 A | 12/1999 | Moore et al. |
| 6,006,835 A | 12/1999 | Onan et al. |
| 6,019,173 A | 2/2000 | Saurer et al. |
| 6,026,913 A | 2/2000 | Mandal et al. |
| 6,029,748 A | 2/2000 | Forsyth et al. |
| 6,047,772 A | 4/2000 | Weaver et al. |
| 6,069,117 A | 5/2000 | Oman et al. |
| 6,085,838 A | 7/2000 | Vercaemer et al. |
| 6,095,262 A | 8/2000 | Chen |
| 6,102,152 A | 8/2000 | Masino et al. |
| 6,131,694 A | 10/2000 | Robbins et al. |
| 6,138,759 A | 10/2000 | Chatterji et al. |
| 6,143,698 A * | 11/2000 | Murphey et al. ........... 507/145 |
| 6,151,554 A | 11/2000 | Rodney |
| 6,156,708 A | 12/2000 | Brookey et al. |
| 6,176,315 B1 | 1/2001 | Reddy et al. |
| 6,189,621 B1 | 2/2001 | Vail, III |
| 6,196,335 B1 | 3/2001 | Rodney |
| 6,196,336 B1 | 3/2001 | Fincher et al. |
| 6,209,643 B1 | 4/2001 | Nguyen et al. |
| 6,209,646 B1 | 4/2001 | Reddy et al. |
| 6,213,225 B1 | 4/2001 | Chen |
| 6,236,620 B1 | 5/2001 | Schultz et al. |
| 6,244,344 B1 | 6/2001 | Chatterji et al. |
| 6,244,361 B1 | 6/2001 | Comeau et al. |
| 6,257,332 B1 | 7/2001 | Vidrine et al. |
| 6,269,892 B1 | 8/2001 | Boulton et al. |
| 6,271,181 B1 | 8/2001 | Chatterji et al. |
| 6,273,191 B1 | 8/2001 | Reddy et al. |
| 6,290,001 B1 | 9/2001 | West et al. |
| 6,296,066 B1 | 10/2001 | Terry et al. |
| 6,315,042 B1 | 11/2001 | Griffith et al. |
| 6,328,106 B1 | 12/2001 | Griffith et al. |
| 6,400,646 B1 | 6/2002 | Shah et al. |
| 6,401,839 B1 | 6/2002 | Chen |
| 6,405,809 B2 | 6/2002 | Patel et al. |
| 6,412,577 B1 | 7/2002 | Chen |
| 6,422,325 B1 | 7/2002 | Krieger |
| 6,448,206 B1 | 9/2002 | Griffith et al. |
| 6,470,966 B2 | 10/2002 | Cook et al. |
| 6,478,107 B1 | 11/2002 | Birchak et al. |
| 6,505,685 B1 | 1/2003 | Sullaway et al. |
| 6,508,306 B1 | 1/2003 | Reddy et al. |
| 6,561,227 B2 | 5/2003 | Cook et al. |
| 6,581,699 B1 | 6/2003 | Chen et al. |
| 6,609,067 B2 | 8/2003 | Tare et al. |
| 6,620,770 B1 | 9/2003 | Kirsner et al. |
| 6,631,759 B2 | 10/2003 | Cook et al. |
| 6,631,760 B2 | 10/2003 | Cook et al. |
| 6,631,769 B2 | 10/2003 | Cook et al. |
| 6,640,903 B1 | 11/2003 | Cook et al. |
| 6,651,743 B2 | 11/2003 | Szarka |
| 6,659,182 B1 | 12/2003 | Saugier et al. |
| 6,668,928 B2 | 12/2003 | Brothers |
| 6,684,947 B2 | 2/2004 | Cook et al. |
| 6,691,805 B2 | 2/2004 | Thaemlitz |
| 6,702,044 B2 | 3/2004 | Reddy et al. |
| 6,705,395 B2 | 3/2004 | Cook et al. |
| 6,708,767 B2 | 3/2004 | Harrall et al. |
| 6,722,433 B2 | 4/2004 | Brothers et al. |
| 6,722,451 B2 | 4/2004 | Saugier |
| 6,725,919 B2 | 4/2004 | Cook et al. |
| 6,739,392 B2 | 5/2004 | Cook et al. |
| 6,806,233 B2 | 10/2004 | Patel |
| 6,868,913 B2 | 3/2005 | Vidrine et al. |
| 6,923,273 B2 | 8/2005 | Terry et al. |
| 6,932,428 B2 | 8/2005 | Murphy |
| 7,040,404 B2 | 5/2006 | Brothers et al. |
| 7,050,404 B1 | 5/2006 | Devlin |
| 2001/0032723 A1 | 10/2001 | Chatterji et al. |
| 2002/0033258 A1 | 3/2002 | Patel |
| 2002/0040787 A1 | 4/2002 | Cook et al. |
| 2002/0060078 A1 | 5/2002 | Cook et al. |
| 2002/0066561 A1 | 6/2002 | Brockman |
| 2002/0074134 A1 | 6/2002 | Cook et al. |
| 2002/0092657 A1 | 7/2002 | Cook et al. |

| | | | |
|---|---|---|---|
| 2002/0096338 | A1 | 7/2002 | Cook et al. |
| 2002/0100595 | A1 | 8/2002 | Cook et al. |
| 2002/0108756 | A1 | 8/2002 | Harrall et al. |
| 2002/0162596 | A1 | 11/2002 | Simpson |
| 2002/0179306 | A1 | 12/2002 | Johnson et al. |
| 2003/0036484 | A1 | 2/2003 | Kirsner et al. |
| 2003/0075326 | A1 | 4/2003 | Ebinger |
| 2003/0173090 | A1 | 9/2003 | Cook et al. |
| 2003/0234538 | A1 | 12/2003 | Hashem |
| 2004/0163823 | A1 | 8/2004 | Trinder |
| 2004/0231861 | A1 | 11/2004 | Whanger et al. |
| 2005/0146179 | A1 | 7/2005 | Murphy |

FOREIGN PATENT DOCUMENTS

| | | | |
|---|---|---|---|
| GB | 2172325 | | 9/1986 |
| GB | 2250043 | | 5/1992 |
| GB | 2307533 | | 5/1997 |
| SU | 681090 | A * | 8/1979 |
| WO | WO 98/22690 | | 5/1998 |
| WO | WO 98/42944 | | 10/1998 |
| WO | WO 99/35368 | | 7/1999 |
| WO | WO 02/053675 | | 7/2002 |
| WO | WO 02/053676 | | 7/2002 |
| WO | WO 02/053873 | | 7/2002 |

OTHER PUBLICATIONS

OTC 14277; D C-K Chen et al; *Hole Quality Gateway to Efficient Drilling*;; Presented at the Offshore Technology Conference May 6-9, 2002; (pp. 1-15).

SPE 19525; S Walker, et al; *An Innovative Approach to Exploration and Exploitation Drilling The Slim-Hole High-Speed Drilling System*; JPT; Sep. 1990; pp. 1184-1192).

SPE 54508; M E Pointing, et al; *The Reeled Monodiameter Well*; Presented at the 1999 SPE/CoTA Coiled Tubing Roundtable May 25-26, 1999; (pp. 1-12).

SPE 65184; S Benzie, et al; *Towards a Mono-Diameter Well—Advances in Expanding Tubing Technology*; Presented at the SPE European Petroleum Conference, Paris, France Oct. 24-25, 2002; (pp. 1-7).

SPE 77612; R Gusevik, et al; *Reaching Deep reservoir Targets Using Solid Expandable Tubulars*; Presented at the SPE Annual Technical Conference and Exhibition, San Antonio, Tx Sep. 29-Oct. 2, 2002; pp. 1-8).

SPE 77617; T Gaynor, et al; *Quantifying Tortuosities by Friction Factors in Torque and Drag Model*; Presented at the SPE Annual Technical Conference and Exhibition, San Antonio, Tx Sep. 29-Oct. 2, 2002; (pp. 1-8).

SPE 77628; G Wylie, et al; *Well Construction Efficiency Processes Yielding a Significant Step Change*; Presented at the SPE Annual Technical Conference and Exhibition, San Antonio, Tx Sep. 29-Oct. 2, 2002; (pp. 1-160.

Halliburton New Technologies and General Capabilities; *Geo-Pilot™ Rotary Steerable System*; (undated); (pp. 1-5).

SPE 60750; R Marker, et al.; *Anaconda Joint Development Project Leads to Digitally Controlled Composite Coiled Tubing Drilling System*; Presented at SPE/CoTA Coiled Tubing Roundtable, Houston, Tx Apr. 5-6, 2000; (pp. 1-9).

IADC/SPE 59126; D Hahn. et al; *Simultaneous Drill and Case Technology—Case Histories, Status and Options for Further Development*; Presented at 2000 IADC/SPE Drilling Conference, N.O. La. Feb. 23-25, 2000 (pp. 1-9).

* cited by examiner

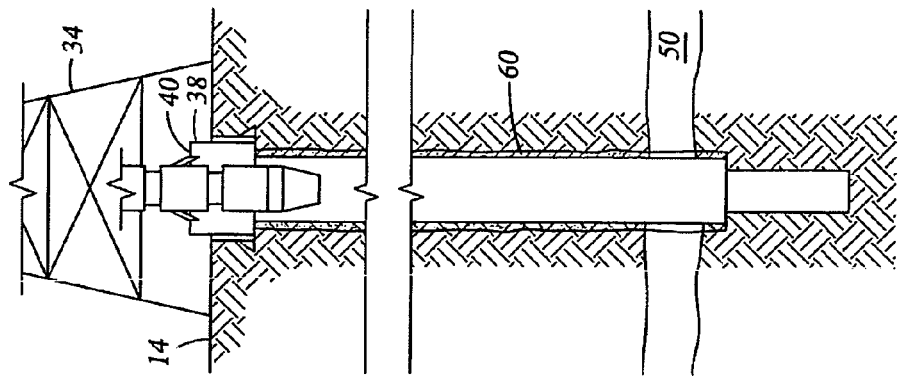
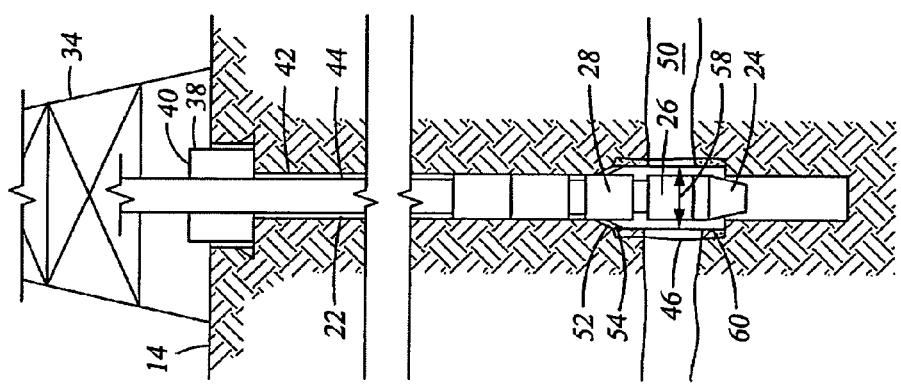
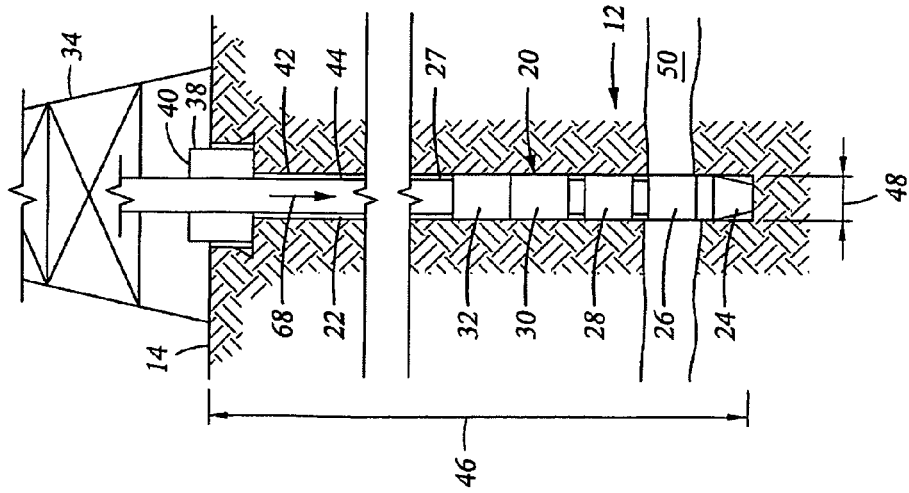

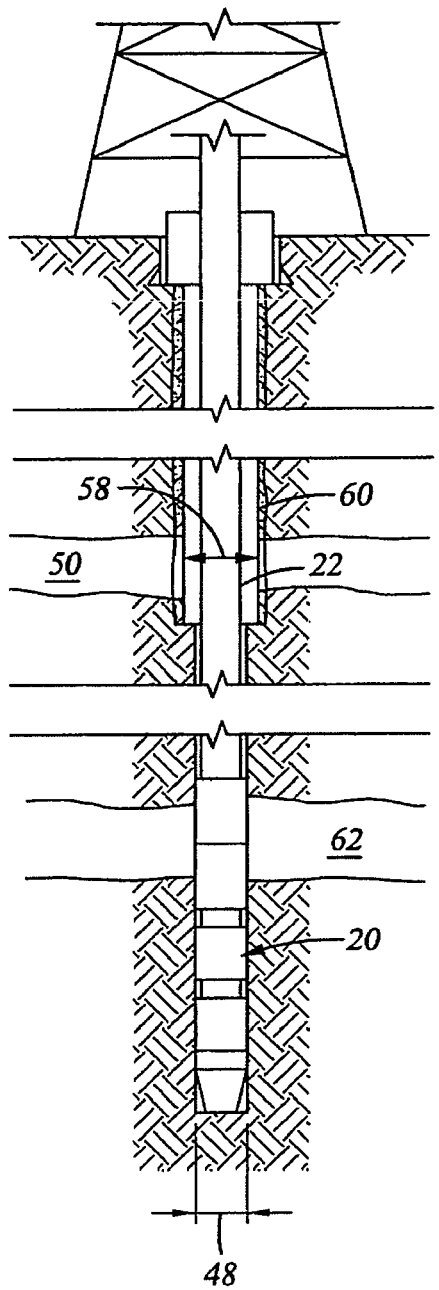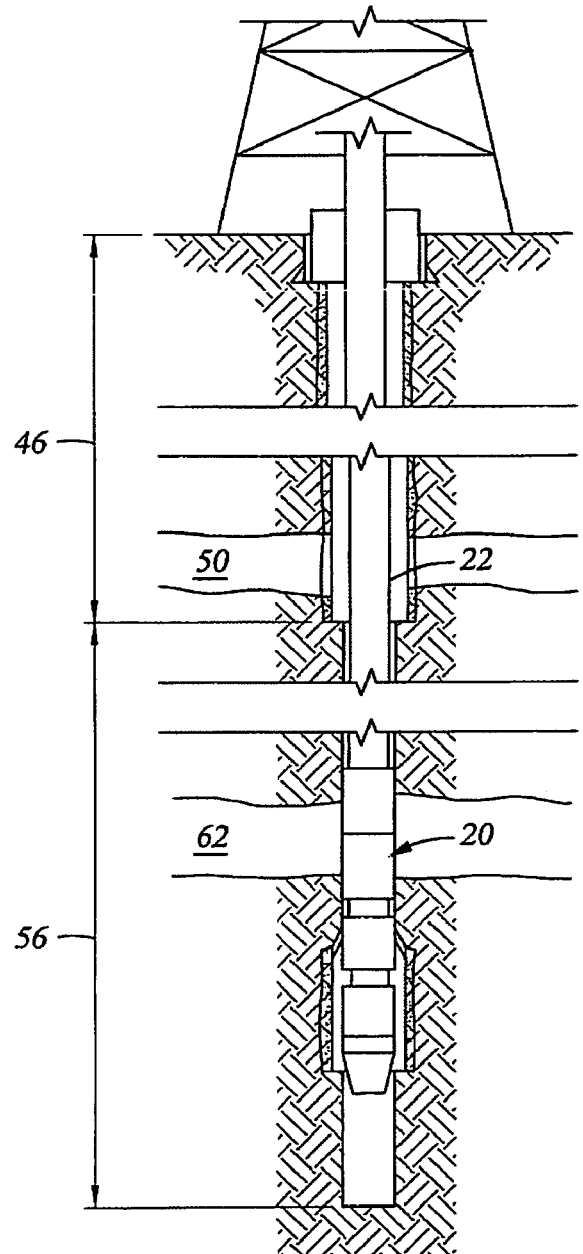
Fig. 9D
Fig. 9E

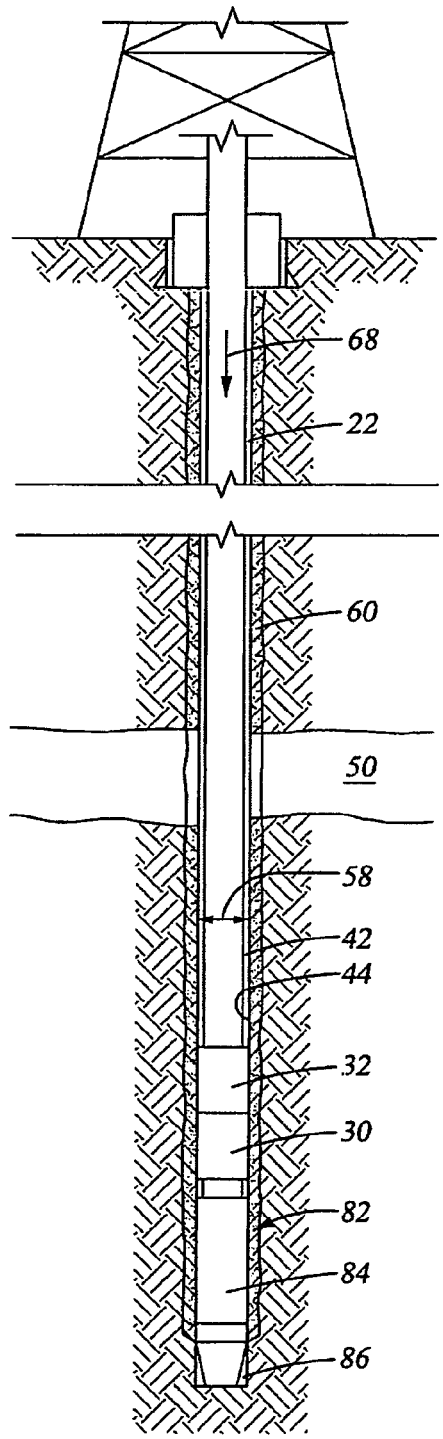
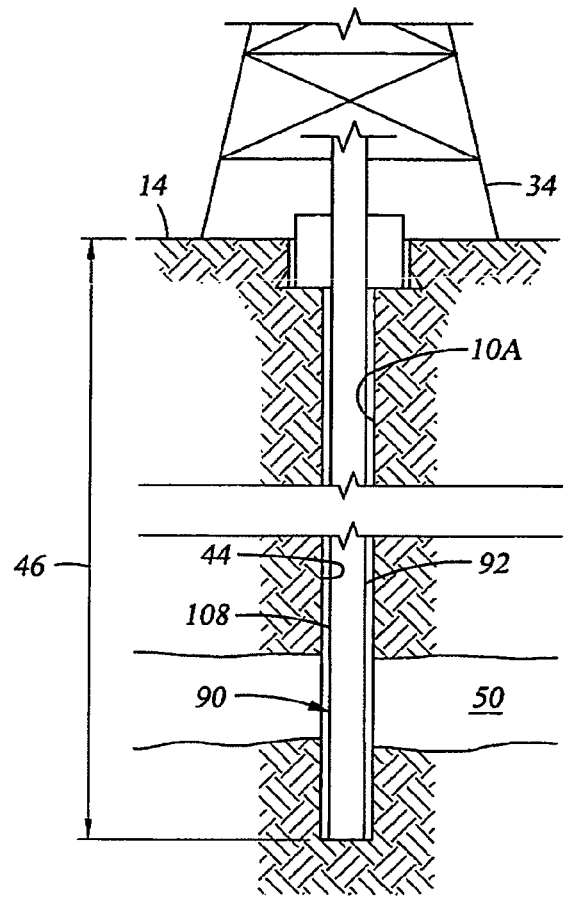
Fig. 13A
Fig. 12

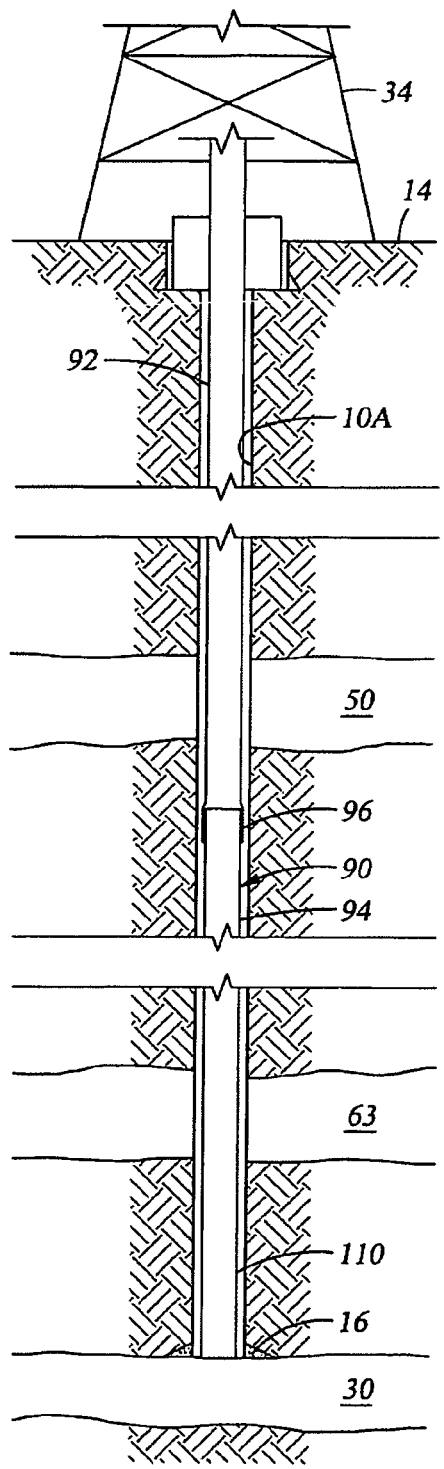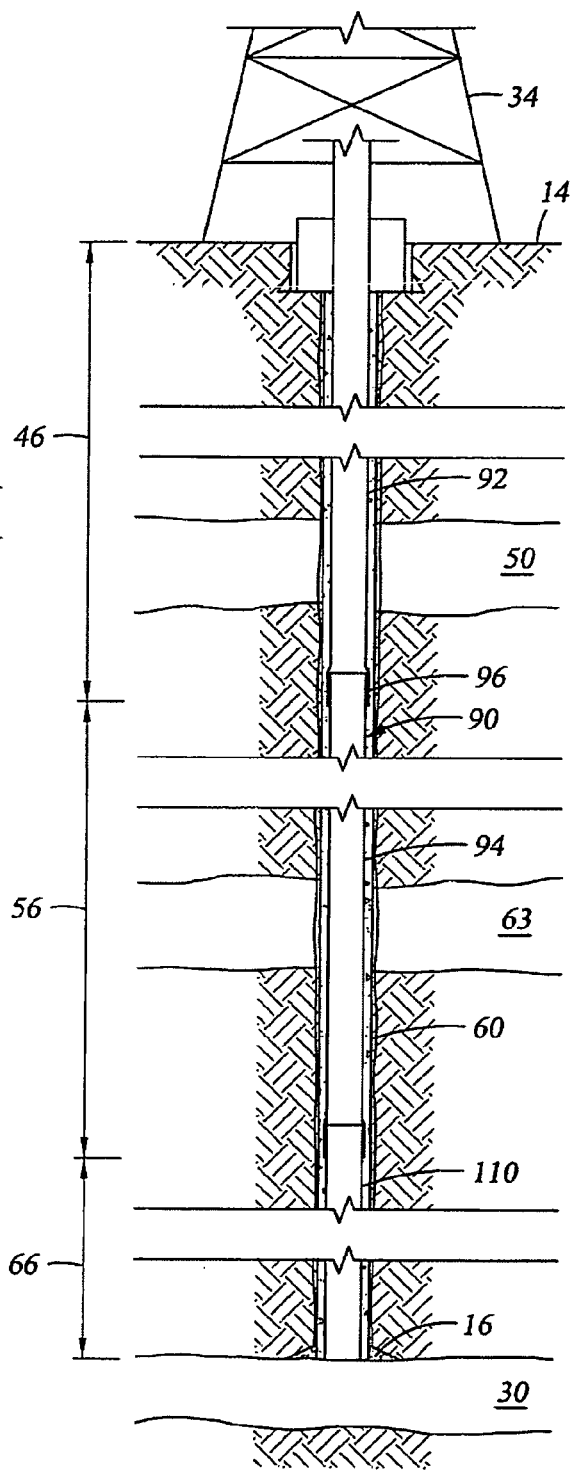
*Fig. 13E*     *Fig. 14*

METHOD AND APPARATUS FOR A MONODIAMETER WELLBORE, MONODIAMETER CASING, MONOBORE, AND/OR MONOWELL

CROSS-REFERENCE TO RELATED APPLICATIONS

The present application is a divisional of U.S. patent application Ser. No. 11/153,046 filed Jun. 15, 2005 now U.S. Pat. No. 7,225,879 entitled Method and Apparatus for a Monodiameter Wellbore, Monodiameter Casing, Monobore, and/or Monowell, which is a continuation of U.S. application Ser. No. 10/293,013 filed Nov. 13, 2002 U.S. Pat. No. 7,066,284 and entitled Method and Apparatus for a Monodiameter Wellbore, Monodiameter Casing and Monobore and further claims the benefit of 35 U.S.C. 119(e) of U.S. provisional application Ser. No. 60/335,132 filed Nov. 14, 2001 and entitled Monodiameter Well Architecture and Construction and U.S. provisional patent application Ser. No. 60/414,517, filed Sep. 27, 2002 and entitled Method and Apparatus for a Monodiameter Wellbore, Monodiameter Casing and Monobore, all hereby incorporated herein by reference in their entirety. The present application is related to U.S. patent application Ser. No. 10/170,400 filed Jun. 13, 2002 and entitled Methods of Consolidating Formations or Forming Chemical Casing or Both While Drilling, now U.S. Pat. No. 6,702,044; U.S. patent application Ser. No. 10/006, 109 filed Dec. 4, 2001 entitled Resilient Cement, now U.S. Pat. No. 6,668,928; U.S. patent application Ser. No. 10/177, 568 filed Jun. 21, 2002 entitled Methods of Sealing Expandable Pipe in Well bores and Sealing Compositions, now U.S. Pat. No. 6,722,433; U.S. patent application Ser. No. 10/243, 001 filed Sep. 13, 2002 entitled Methods and Compositions for Sealing An Expandable Tubular in A Well Bore; now U.S. Pat. No. 7,040,404; all hereby incorporated herein by reference.

BACKGROUND OF THE INVENTION

The present invention relates to constructing a MONOWELL and more particularly to apparatus and methods for constructing a monodiameter wellbore for a monodiameter casing and a monobore production delivery system and still more particularly to drilling and completing a well using apparatus and methods to achieve a monodiameter wellbore, installing monodiameter casing and liners and installing a fullbore production delivery system.

Traditional well construction, such as the drilling of an oil or gas well, includes a wellbore or borehole being drilled through a series of formations. Each formation, through which the well passes, must be sealed so as to avoid an undesirable passage of formation fluids, gases or materials out of the formation and into the borehole or from the borehole into the formation. In addition, it is commonly desired to isolate both producing and non-producing formations from each other so as to avoid contaminating one formation with the fluids from another formation.

As the well is drilled deeper, conventional well architecture includes casing the borehole to isolate or seal each formation. The formation may also be cased for borehole stability due to the geo-mechanics of the formation such as compaction forces, seismic forces and tectonic forces. The casings prevent the collapse of the borehole wall and prevent the undesired outflow of drilling fluids into the formation or the inflow of fluids from the formation into the borehole. The borehole may need to be cased due to equivalent circulating density and hydraulics reaching or exceeding the formation pore pressure or exceeding the fracture gradient pressure thus allowing fluids or gases to transfer between formations and borehole. If the formations are non-producing, or not of the desired producing interval, (some intervals are producing but at low levels) the formations can be cased together. If shallow water flows (where water flows several hundred feet below the seabed floor), or if there is potential communication among formations, then the formation is cased. The casings extend downhole and are sequentially placed across the formations through which the wellbore or borehole passes. The casings may be liners which do not extend to the surface of the wellbore. Traditionally steel casing has been used to case off formations.

In standard practice, each succeeding casing placed in the wellbore has an outside diameter significantly reduced in size when compared to the casing previously installed, particularly to accommodate hangers for the inner strings, and may be described as a series of nested casing strings. The borehole is drilled in intervals whereby a casing, which is to be installed in a lower borehole interval, is lowered through a previously installed casing of an upper borehole interval. As a consequence of this procedure, the casing of the lower interval has a smaller diameter than the casing of the upper interval. Thus, the casings are in a nested arrangement with casing diameters decreasing in the downward direction.

The use of a series of casings, which have sequentially reduced diameters is derived from long experience. The number of casings required to reach a given target depth is determined principally by the properties of the formations penetrated and by the pressures of the fluids contained in the formations. If the driller encounters an extended series of high pressure/low pressure intervals, the number of liners required under such circumstances may be such that the well cannot usefully be completed because of the continued reduction of the casing diameters required. Along with the downsize serial casing operations, the production tubulars may have to be downsized as well further reducing the delivery capacity of the well.

If the borehole extends through a formation that tends to cave in and thus causes the borehole to be very unstable, casing inserts must be installed to keep the borehole open. A casing insert is a type of emergency casing string which shores up an unstable formation and is an additional section of casing that is set through this unstable portion of the borehole. By requiring a casing insert for this unstable formation, an even smaller size casing than was planned is then required to complete the well. This reduces the diameter of the well and thus the ultimate internal diameter available for the production tubulars. The casing insert may not be possible, requiring that the well be sidetracked, resulting in a substantial reduced diameter wellbore.

The disadvantages of nesting casing and liners is apparent in slim-hole drilling. A slim-hole well is one in which 90% or more of the length of the well is drilled with bits smaller than 7 inches in diameter. See SPE 19525: An Innovative Approach to Exploration and Exploitation Drilling: The Slim-Hole High-Speed Drilling System by Walker and Millheim, September 1990. Slim hole drilling focuses on starting with a small borehole and finishing with an even smaller borehole for production.

The casing is fixed in the borehole by a cement layer between the outer wall of the casing and the wall of the borehole. During the drilling of the wellbore, annuli are provided between the outer surfaces of the casings and the borehole wall and a composition, sometimes referred to as "oil field" cement, is introduced in the annulus for cementing the casing within the wellbore. The casing is commonly cemented in place after the installation of each casing. When the casing is located in its desired position in the well, a cement slurry is pumped via the interior of the casing and around the lower end of the casing and upwards into the annulus, thereby causing the cement slurry to drive the drilling fluid upward in the annulus. As soon as the annulus around the casing is sufficiently filled with the cement slurry, injection of cement into the well is stopped and the cement slurry is allowed to harden. The cement sets up in the annulus, supporting and positioning the casing and forming a substantially impermeable barrier which divides the well bore into subterranean zones.

Ultimately the borehole reaches the target and is drilled through a hydrocarbon-containing formation or reservoir to produce hydrocarbons. The borehole may not be cased through the hydrocarbon-containing reservoir to allow substantially unrestricted influx of fluids from the formation into the borehole. When the formation is so weak that it will collapse, the uncased borehole section is completed with a liner. It is common practice to install a liner in the reservoir by suspending the liner in the borehole through the reservoir and then pumping a cement slurry into the annulus. After the cement has set to a hardened mass, perforations are extended through the liner and the cement body into the hydrocarbon-containing formation around the well in order to allow in-flow of reservoir hydrocarbon fluids, such as oil or gas, into the well.

The liner may be provided with slots to allow fluid influx into the borehole. The liner is usually secured at its upper end to the lower end of the non-productive barrier casing previously installed in the borehole. Because the slotted liner must pass through the previously set casing, it must have an outer diameter which is less than the inner diameter of the cased section. Over time, the formation may collapse and settle against the outer wall of the liner so that the area around the liner gets filled with particulates. U.S. Pat. Nos. 5,366,012 and 5,667,011 teach an expandable liner which is expanded by an expansion mandrel by moving the mandrel through the liner to radially expand the liner to a larger diameter in the borehole.

The purpose of the cement body around the casing is to fix the casing in the well and to seal the borehole around the casing in order to prevent vertical flow of fluid alongside the casing towards other formation layers or even to the earth's surface. Casing is traditionally cemented in place for two main reasons. (i) one to seal off and prevent leak paths between permeable zones and/or surface, and (ii) to give support and stability to the casings. The cement prevents fluid exchange between or among formation layers through which the wellbore passes, and prevents the undesirable migration of fluids between zones or gas from rising up the wellbore. It is important that there is no gas or fluid leakage after the cement has set and the well is completed.

A problem generally encountered during cementation of the casing is, that due to various factors, such as the existence of varying pressure and temperature gradients along the length of the casing and shrinkage of the cement body during hardening thereof, relative displacements occur between the casing and the hardened cement mass which may result in poor bonding or cracking between the cement body and the casing. Poor bonding may result in the presence of a so-called micro-annuli between the casing and cement body, micro-annuli may extend along a substantial part of the length of the casing. The occurrence of a micro-annuli is particularly dangerous in gas wells as substantial amounts of gas might escape to the surface. In some cases hydrogen sulfide or natural gas can escape into the atmosphere. This condition may also lead to surface or ground water contamination. The resulting problems are very expensive to correct.

The poor bonding of the cement may be attributed to drilling fluid contamination or to bonding of the cement to the casing after the cement has set and/or oil or mill finish contamination on the surface of the casing or it can be attributed to aggressive drilling or aggressive pressure subjection and large pressure differs prior to it hardening and during the operation. As is well known in the art, hardening of cement causes generally a slight reduction of the volume of the cement. A more fundamental cause is the loss of hydrostatic head during the curing of the cement such that the formation pressure exceeds the annulus pressure and gas migration occurs causing channeling of the cement and subsequent leakage. Various additives and application techniques relative to the cement have been used in order to reduce the occurrence of this problem. During cementing operations, it is common to both reciprocate and rotate the casing during the cement pumping operation to break up or close any cement channels around the casing. Also compressible cement slurries have additives that entrain gas, which during the cement pumping operation, are compressed and as the hydrostatic head is lost during curing of the cement, the entrained gas subsequently expands and prevents loss of the pore pressure such that formation gas is prevented from migrating into the annulus. This technique, however, results in a lower strength cement. Thixotropic cement slurries depend on the cement achieving high gel strengths in very short time periods. If there is a rapid static gel strength obtained, gas migration and channeling are reduced or prevented. These specialized cement additives are expensive and require specific operational techniques. Thus, it is essential that a good bonding be created between the cement body and both the casing and the borehole wall.

There are various types of wells such as land based wells and offshore wells. Well applies to anything that produces oil, gas, water, or hydrates. Offshore wells may be shallow or deep water wells. A shallow offshore well is typically drilled from a platform that is in water up to 3,000 feet in depth. A deep water well is drilled from a floating platform or vessel with a riser extending from the sea floor to the platform or submersible rig. Any water deeper than 5,000 feet requires a drilling vessel, typically a drill ship.

Various types of casing may be installed in the well including conductor casing, surface casing, intermediate or production casing and production liners. Typically a land based well starts with a 20"/18-⅝" or larger diameter casing and telescopes down through two or three intermediate casings, to a final casing size of typically 6-⅜" with a 5" production liner installed. Each casing is secured in place with cement filling an annulus having a size typically varying from 1 to 10 inches over the length of the casing and may be as much as 14 to 21 inches or greater at a wash out in the borehole wall.

FIG. 1 is a schematic of a conventional deep water well completion. The size and number of casing and tubing strings will increase or decrease depending upon the well plan based upon, for example, the depth of the well, the production tubing delivery size, the structural support and the seabed formation support. If the seabed formation is unconsolidated and has little support, then the structural or conductor casing is larger and is set deeper. If the initial conductor casing is in rock, then it can be smaller with substantially less depth. For example, initially a structural or conductor casing and riser are lowered from a drilling platform and driven, drilled or jetted into the sea floor to provide support for a surface casing. The structural or conductor casing may or may not be cemented.

FIG. 1 illustrates a 36 inch by 16 inch by 10-3/4 inch by 7 inch casing program with the addition of one or more tubing strings. After the 36 inch conductor casing is set, one or more surface casings is installed. A borehole is drilled for a 20 inch surface casing which is lowered into place with a 21" surface casing riser attached thereto. A subsea wellhead with blowout prevention equipment, such as an 18-3/4 inch blowout preventer, is installed on the surface casing. The subsea wellhead may be supported by a structural casing.

Further, a borehole may be drilled through the riser and wellhead and through a problematic formation to extend a structural casing through the problem formation. For example, there are salt formations in the deepwater of the Gulf of Mexico. The structural casing forms a barrier across the formation while also supporting the wellhead. The structural casing has a thicker wall and provides a stable support frame for and can carry the load on the subsea wellhead. A 16 inch structural casing may be drilled, installed and cemented through a salt formation to seal off the salt formation from the wellbore being drilled. It should be appreciated that if there is no problematic formation, such as a salt zone, a shallow water flow zone, loss circulation zone, or other problem zone, then a structural casing is not needed to seal off the problematic area but it will support the subsea or platform wellhead, depending on well type.

Another borehole is then drilled for a 13-3/8 inch intermediate casing string which is lowered into the borehole, attached to another riser, and cemented in place. Next a borehole may be drilled for another intermediate casing, such as a 11-7/8 inch casing, and cemented in place. The borehole for the production casing string, such as a 9-5/8 inch casing, is drilled and the production string is landed. It may or may not be cemented in place. The drilling is performed through blowout prevention equipment.

Subsequently, a production tubing is installed and is supported within the wellhead on a tubing hanger, a hanger system or anchor system. The production tubing is typically 3-1/2 inch tubing but may be as small as 1-1/2 inches or as large as 12 inches. After the tubing hanger seals have been tested, the blowout prevention equipment is removed and a Christmas tree or subsea tree is installed. If the well is land based or being drilled from a platform, the blowout prevention equipment is at the surface. If the well is a subsea well, the blowout prevention equipment and tree are installed subsea. Also, the tubing can be installed through the subsea tree or subsea template. Thus, conventional techniques use a plurality of concentric casing strings with varying diameter and do not have a monodiameter architecture. It should be appreciated that conventional well architectures may vary depending upon the geological or drilling conditions.

As a consequence of the nested arrangement of the casings, a relatively large diameter borehole is required at the upper part of the borehole. Because the upper casing(s) has to be larger than the lower casing(s) for the lower casing(s) to pass through the upper casing(s), the upper portion of the borehole typically has a much larger diameter than the intended ultimate diameter at the bottom of the borehole. Large boreholes are disadvantageous in that they generate large amounts of cuttings and require increased volumes of drilling fluid and cement. In the standard well casing configuration, large volumes of cuttings are produced initially and heavy logistics are required during early phases of drilling. Generally speaking, larger borehole sizes take longer to drill than smaller diameter boreholes at equivalent depth. For example, increased drilling rig time is involved due to required cement pumping and cement hardening. Further, a large borehole diameter often takes larger fluid and horsepower capacity rigs generating increased costs due to heavy casing handling equipment and large drill bits. Thus conventional equipment results in larger boreholes drilled for each formation, larger sized equipment, greater fluid volumes, and larger casing strings than is absolutely required to provide a borehole for a well, for an injecting or producing or monitoring.

Utilizing a large borehole often causes the usage of a wide variety of equipment and fluids that might not achieve maximum efficiency for the drilled borehole. If problems arise, additional fluids must be pumped and additional cement must be used to cement the formation to overcome the variances encountered during conventional well construction, otherwise a side track must be performed.

Conventional well architecture, engineering, and planning accounts for potential problem migration, well plan variance, and contingency. Therefore, large tolerances in equipment and procedures are provided in anticipation of variances in the length and/or composition of the formations, geomechanics, and growth/loading design. Compensation in the well architecture, engineering, and planning must be included in the well plan for contingency due to such large tolerances, including drilling for additional casing strings for geomechanical problems and sidetracks and re-drills for the installation of casing inserts prior to reaching the reservoir formation.

It can be appreciated that the problems with conventional well architecture are exacerbated in a deepwater well. In addition to the larger boreholes to be drilled, the larger sized completion equipment, the greater fluid volumes, and the larger casing strings, a deepwater well also requires large risers extending to the water's surface. The risers require the use of additional large fluid volumes, such as for drilling fluids and cement, to drill and cement the casing strings. Further, the large risers add substantial expense and additional large sized completion equipment.

It has long been an objective to achieve a monodiameter well where the wellbore is drilled from spud to total depth using one borehole size. For example the monodiameter well might be spudded with a driven conductor 7-5/8" to 9-5/8" in diameter. Thereafter, a borehole is drilled for each borehole section, perhaps a 7" diameter. The borehole is then cased or lined with expandable casing or liners. Cement or some other innovative sealing composition is then used for the annular pressure seal. The next section of borehole is drilled using the same sized overgauge hole drilling and then cased or lined again with the same size expandable casing or liner. The process is repeated to target depth. See SPE 65184: "Towards a Mono-Diameter Well—Advances in Expanding Tubing Technology" by Benzie, Burge, and Dobson presented at the SPE European Program Committee Conference held Oct. 24-25, 2000.

The monodiameter well is designed based on the borehole size required across the reservoir. Rig capacity and all the drilling and completion equipment for the entire well is sized to the reservoir borehole size. Upon the advent of the monodiameter well, the telescoping well design with all its associated and myriad selection of drilling and completions equipment will become obsolete. The monodiameter well will achieve dramatic reductions in well construction costs. The challenge to the industry is to develop the full suite of enabling and complimentary technologies that will be required to drill and complete a monodiameter well. This suite of equipment will include drilling equipment, reaming while drilling (RWD), bi-center bits, energy balanced bits, near bit reamers, open hole annular sealing, well control procedures, well control equipment, and wellheads among others.

Expandable tubulars are being developed whereby casings and liners are expanded diametrically after they are placed in wellbores. The ultimate use of expanded tubulars is in a monodiameter well, whereby the entire well is drilled and cased using effectively one hole size. A solid steel tubular can be readily expanded using forces, either mechanical or hydraulic, available on most drilling and workover rigs. Expandable tubulars can be used in open hole either as a temporary drilling liner or as a permanent liner tied back to the previous casing string. See SPE 54508: "The Reeled Monodiameter Well" by Pointing, Betts, Bijleveld, and Al-Rawahi, presented at the 1999 SPE/CoTA Coiled Tubing Roundtable, May 25-26, 1999, and SPE 65184: "Towards a Mono-Diameter Well—Advances in Expanding Tubing Technology" by Benzie, Burge, and Dobson, presented at the SPE European Petroleum Conference, Oct. 24-25, 2000.

The concept of expanding a solid tube is relatively simple. A mandrel or "pig" whose outside diameter is greater than the tube's inside diameter is forced through the tube, thereby plastically deforming the tubing material to a larger diameter size. A solid tubular can be expanded using a cone of ceramic, tungsten carbide or hardened steel that is either mechanically pulled through the tubular or hydraulically pushed. The solid tubular can be expanded to around 30%-40%, although a range from 10%-20% will probably be more typical. The combination of expansion cone radius, material characteristics, expansion ratio, annular seal material, and gauge tolerance of the open borehole or casing within which the tubular is to be expanded, all determine the expansion forces and the tolerances or fit of the final expanded tubular in the wellbore. During the expansion process, the tubular strength increases since the expansion process is a cold working of the material. However, the collapse strength of a post expanded tubular is less than that of the pre-expanded tubular but it is within the design limits expected for the required borehole pressures.

One of the requirements of expandable casing/liners is to run a drill bit through the casing and drill a hole of a greater diameter than the previous casing. The next section of casing will then be run through the previous one and expanded against it. Thus, an enlarged wellbore having a diameter greater than the external diameter of the preceding installed casing must be drilled such as by "overgauge hole drilling" which encompasses the use of expandable bits, bi-center or eccentric bits or equivalent, reaming while drilling (RWD), under-reamers or similar tools and other novel drilling methods known to those skilled in the art, such as expandable/retractable stabilizers. Typical bits for overgauge hole drilling include bi-center bits and eccentric bits. A bi-center bit has a well-defined pilot bit section and an eccentric wing mounted further back on the bit body. An eccentric bit resembles more of a conventional bit, but a flank on the high-lobe side has a longer profile than on the other side. Eccentric bits are generally used in softer formations whereas bi-center bits are more commonly used in harder formations. The major difference of both bi-center and eccentric bits over under-reamers is that a section of borehole can be drilled to the required size in one run. However, an under-reamer provides a smoother and more diametric borehole wall.

At a desired depth, or when it is otherwise decided to case or line and cement the wellbore, an expandable casing or liner, whose greatest external (outside) diameter approximates, i.e., is only slightly smaller than the internal diameter of the casing or liner previously installed, is lowered through the previously installed casings or liners and into the newly drilled open enlarged borehole. The lowered casing or liner is a tubular made of a deformable material. The deformable casing/liner may have a decreased wall thickness. The lowered casing/liner is positioned in relation to the wellbore so that the upper end of the lowered casing/liner overlaps the lower end of the previously installed casing.

In expanding the expandable casing/liner, a die member, such as a mandrel or cone, is drawn or pumped through the length of the lowered casing to expand the casing in-situ. The die member has a suitable shape and composition, such as hardened steel, and is adapted or sized and shaped to expand the liner to the diameter of the previously installed casing. The die member is shaped or designed to provide at least substantially uniform expanded or deformed liner segment of circular or approximately circular periphery.

The upper end of the die member is connected to a running string and is pulled through the casing. Further, the die member may have a fluid tight seal, such as a cupseal, for sealing the die member within the casing and allowing sufficient fluid pressure to produce movement of the die member. Any suitable wellbore fluid or liquid available can be used for displacing the die member. To ease the expansion process, the inside diameter of the casing may be lubricated to allow the die member or expansion cone to move smoothly through the casing. The rate of upward adjustment or movement of the die member by upward movement of the running string and the application of pressure below the die member may be correlated so as to reduce movement of the die member up through the casing with concurrent gradual deformation and expansion of the casing, providing an expansion achieving an external diameter equal to or approximating, preferably slightly greater or larger than, that of the previously installed casing.

Threaded connections of lengths of expandable casing or liner remain the primary connection of choice. However, the connection has to be internally flush to allow the die member to pass through the connection, and externally flush to allow expansion to occur with constant expansion force. SPE 54508: "The Reeled Monodiameter Well" by Pointing, Betts, Bijleveld, and Al-Rawahi, presented at the 1999 SPE/CoTA Coiled Tubing Roundtable, May 25-26, 1999, discloses using coiled casing that maintains a single diameter of well bore throughout. Coiled casing can be used in the production of a monodiameter wellbore as well as tubular jointed expandable casing. Coiled casing can be expanded or installed non-expanded. A reeled monodiameter casing or liner has the same throughbore.

The expansion causes a virtual forced fit at the overlap of the upper end of the expanded lower casing/liner into the lower end of the previously installed casing. Thus, hangers are not required since the casing/liner is supported by the previously installed string. A constant through-bore is maintained at the overlap. The well is then subsequently completed by internally cladding the last casing string. Cladding the overlapped portions of the adjacent casings allows the lower casing to be supported at the cladding by the upper casing and allows the upper and lower casings to be pressure sealed at the overlap. The pipe over the area (overlap) to be cladded may include a corrosion resistant coating. One type of expandable tubular is disclosed in U.S. Pat. No. 6,085,838, hereby incorporated herein by reference.

The new well concept of using expandable casing and liners necessitates a narrow annuli in the range of 3 to 4 inches on diameter or less between the casing/liners and the borehole wall. Thus a quality borehole and optimum borehole size are required. The wellbore or borehole must have diametric efficiency. Diametric efficiency is the maintenance of the optimum hole size regardless of other well construction requirements or constraints. Preferably diametric efficiency maintains the optimum borehole size from the surface through the producing reservoir. The use of expandable casing/liners requires the maintenance of diametric efficiency to achieve a monodiameter well. Diametric solutions that maintain or improve diametric efficiency in a range of applications from multilaterals, high pressure/high temperature (HPHT), extended reach, horizontals and deepwater environments and remedial applications (i.e. side tracks) must be developed to use expandables.

Referring now to FIG. 2, there is shown a bell-end design disclosed in the SPE 54508 article. The annulus is split up into two parts: (i) where the liner is expanded against the previous casing/liner, either full length or overlap, and (ii) where the casing is expanded over the open borehole section.

The annular clearances between the casing/liner and borehole wall must allow cement slurries to displace the drilling fluid effectively. The interface or overlap between casing/liner strings must have the mechanical ability of the interface to hold axial loads and must have the hydraulic ability to form a pressure tight seal between the two casing/liner strings.

A simple expansion of metal against metal does not provide a reliable seal. Elastomeric seals are used to provide a pressure seal between the overlapped casing ends. Inside a previous casing or a gunbarrel hole through hard formations, a polymer or an elastic rubber coating may be applied externally to the casing/liner. This can deform elastically with the expansion of the casing/liner and form a seal between the casing/liner and/or formation.

A thicker layer of heat softening rubber, which can be coated on the outside of the expandable pipe, may be used in slightly overgauge boreholes. The thermal plastic rubber is reformed in-situ to its final shape by performing the casing/liner expansion process at a more elevated temperature, achievable by heating the well either before or during the expansion process.

Previously, a variety of cement compositions have been used for cementing in open hole applications. However, cement is undesirable for use with expandable casing. Oilfield cement or hydraulic cement compositions are incompressible and tend to resist the expansion of the casing or liner making the expansion more difficult. Thus, expansion of the casing/liner can lead to the crushing of the cement, and consequent loss of effectiveness regarding the zones. This problem is exacerbated by the small annular clearance associated with expandable casing/liners. With the new well concepts as described and the narrow annuli created in the range of 3 to 4 inches on diameter or less, other isolation materials must now be considered. Isolation materials must be ductile in order to form an appropriate seal. Conventional cement will be particularly brittle and weak in such thin sheaths or thicknesses and is hence an inappropriate sealing medium. Therefore, a composition with comparable strength to cement, but with greater elasticity and compressibility is required for cementing expandable casing.

Other problems may be encountered using oilfield cement or hydraulic cement as the sealing composition for expandable casing/liners. If the cement composition gels or sets prior to accomplishing the expansion, the cement composition is crushed in the annular space between the walls of the well and the expandable casing or liner whereby it does not function to seal the expanded casing or liner in the wellbore.

A conventional cement sealant composition under expansion conditions, with appropriate cement recipe to prevent the pre-maturely setting of the cement, may be used. Sealant compositions are required for sealing expandable casings or liners in well bores. Such compositions are compressible and maintain the properties required to provide a seal between the walls of the wellbore and the expanded casings or liners. Several types of sealants materials have been tested. Two materials are silicon gel and a two-component silicon rubber. Suitable wetting agents may be used such as barite or iron micropellets. The silicon gel is a highly viscous material. The two-component silicon rubber consists of two materials mixed in equal volume and weight. The mixture will automatically set, but a retarder may be added to control setting times. Silicon gels or rubbers are very ductile.

Prior to the expansion, the sealant material may be pumped into the annulus between the walls of the well bore and the unexpanded casing or liner in a similar manner to conventional cementing techniques. Once in place, the casing is expanded and the material allowed to set. In a severely washed out borehole, such as soft formations with wash outs and ledges, the sealant material may not be adequate.

In the traditional well, the wellbore may be open 3 to 5 days before stability of the borehole wall becomes a problem. After that, portions of the borehole wall may start to fall into the borehole. In using expandable casing/liners, longer intervals are going to be drilled thus leaving the borehole open for longer than 3 to 5 days. Thus there is a much longer time period than in conventional drilling during which the borehole wall is unsupported by casing during drilling. It is important that the borehole wall remain stable for these longer periods of time. Therefore, special drilling fluids must be used to drill the enlarged boreholes for expandable casing/liners to ensure the stability of the borehole over longer time periods.

Drilling fluid is circulated downwardly through the drill string, through the drill bit and upwardly in the annulus between the walls of the well bore and the drill string. The drilling fluid functions to remove cuttings from the well bore and to form a filter cake on the borehole wall. As the drilling fluid is circulated, a filter cake of solids from the drilling fluid forms on the walls of the well bore. The filter cake build-up is a result of initial fluid loss into permeable formations and zones penetrated by the well bore. The presence of the filter cake reduces additional fluid loss as the well is drilled.

In addition to removing cuttings from the well bore and forming filter cake on the well bore, the drilling fluid cools and lubricates the drill bit and maintains a hydrostatic pressure against the well bore walls to prevent blow-outs, i.e., to prevent pressurized formation fluids from flowing into the well bore when formations containing the pressurized fluids are penetrated. The hydrostatic pressure created by the drilling fluid in the well bore may fracture low mechanical strength formations penetrated by the well bore which allows drilling fluid to be lost into the formations. When this occurs, the drilling of the well bore must be stopped and remedial steps taken to seal the fractures. Such remedial actions are time consuming and expensive.

It is preferred to drill as long an interval as possible without having to stop drilling and case the borehole. However, in order to insure that fracturing of low mechanical strength formations penetrated by the well bore and other similar problems do not occur, it may become necessary to case and cement the borehole. As previously discussed, it is preferred to avoid frequently installing and cementing casing because drilling must be stopped and frequent casing of the borehole may cause a reduction in the producing borehole diameter.

Another problem that occurs in the drilling and completion of well bores is that when the well bore is drilled into and through unconsolidated weak zones or formations. Unstable materials such as clays, shales, sand stone and the like make up a high percentage of the formations in which wells are drilled, and a majority of well bore problems are a result of the instability of such materials, particularly shale instability. Shales are sedimentary rocks that contain a variety of clays. Shales containing montmorillonite, often referred to as smectite clays, swell and disperse when contacted by water. Shales which swell upon contacting water are often referred to as heaving or sloughing shales. Such shales upon contact with aqueous drilling fluids swell and fracture rendering the well bore wall unstable. In such cases, the well bore wall sloughs into the well bore. Sloughing of shale and other similar unstable materials into the well bore can cause the drill string to become stuck and can enlarge the well bore resulting in large subterranean cavities. Additionally, when sloughing occurs while the drill bit is being changed at the surface, the well bore fills up and must be cleared before drilling can proceed.

Furthermore, the heaving unstable material suspended in the drilling fluid increases its solid content, and as a result, the viscosity of the drilling fluid increases to the point where the drilling fluid must be chemically treated to reduce its viscosity or it must be diluted followed by the addition of weighting material to maintain its mud weight. The instability of clays, shales, sand stone and the like is also caused by hydraulic pressure differential leading to fluid transport and by pressure changes near the well bore as the drilling fluid compresses pore fluid and diffuses a pressure front into the formation.

Consolidating unconsolidated weak zones or formations formed of clays, shales, sand stone and the like while drilling a well bore prevents sloughing of the clays, shales, sand stone and the like into the well bore and prevents the need for implementing time consuming and costly remedial steps. It is preferred to increase the mechanical strength of the well bore whereby hydrostatic pressure exerted on the well bore by the drilling fluid does not cause fractures or the like to occur in the well bore. Such fractures cause drilling fluid to be lost and also require stoppage of the drilling operation and costly remedial steps to be taken.

Another significant advantage of increasing the mechanical strength of the well bore is the reduction or elimination of casing intervals at which casing or liners are cemented in the well bore which reduces or eliminates the overall time and cost of cementing the well. An additional advantage is that the well bore has a larger diameter in the production zone, due to fewer casing intervals, which increases productivity.

A monobore is a term used in the industry for a fullbore production delivery system. OTC 8585: "Case History, Well Completion and Servicing Strategies for the Hibernia Field" by Wylie, Maier, Shamloo, Huffman, and Downton presented at the 1998 Offshore Technology Conference, May 4-7, 1998, defines a monobore. To address overall completion criteria, a monobore design was chosen for the Hibernia Field for the initial completions. This design allowed flowbore access across the well's pay zone without diameter restrictions (not necessarily constant diameter).

In conventional completions, there are internal valves and gauges which project into the bore of the completion tubular. These narrow the inside diameter of the completion tubulars. Each restriction in the completion tubulars causes a pressure drop across that point causing scale and corrosion to occur at these points. The narrowing of the completion tubulars also reduces flow and therefore production.

The present invention overcomes the deficiencies of the prior art

SUMMARY OF THE PREFERRED EMBODIMENTS

The present application is directed to a system to achieve a MONOWELL and provides a total solutions approach to the well construction of a monodiameter wellbore and MONOWELL. The assembly and methods of the present invention construct a MONOWELL having monodiameter casing and monobore throughput. The monodiameter casing is disposed in a monodiameter wellbore having diametric efficiency. The monobore is a fullbore production delivery system which either extends through the monodiameter casing from the surface to the formation barrier or extends through the monodiameter casing from the surface and through the producing formation. A full bore production delivery system will have the same nominal internal diameter throughout the production conduit no matter whether the well is an injection well or a producing well. Full bore production delivery is typically provided by production tubing. While a well may have a monodiameter architecture, it may or may not have a full bore production delivery system. Thus the assembly and methods may include or exclude a fullbore production delivery system. If the well has both characteristics of a monodiameter casing and monobore production delivery system either extending to the formation barrier or through the producing formation, then the well design may be called a "MONOWELL". A MONOWELL well has both monodiameter characteristics and full delivery characteristics. Any combination of the different embodiments between the monodiameter and fullbore production delivery system can made up a MONOWELL. "Monodiameter" means that the borehole forming the wellbore has a substantially common diameter along its entire length, i.e. from surface to either the reservoir barrier or bottom of the well. The monodiameter wellbore extends from the surface to at least the reservoir barrier and may extend to the bottom of the wellbore.

The assembly and methods of the present invention are equally applicable to land wells or offshore wells where the rig is land based or on an offshore platform or vessel, respectively. Although the monodiameter wellbore may have any depth, such as 100 feet or more, the monodiameter wellbore is particularly advantageous in a deep well, such as a well having a depth greater than 1000 meters. The assembly and methods may be used for producer and injector well architectures or any combination thereof.

Preferably the monodiameter wellbore has a minimized architecture with at least one nominal casing string extending from the top of the well to the top of the reservoir and may be constructed in sections or as one unit. The casing may be chemical casing, expandable casing, including metallic, composites, fiberglass, or a combination thereof. Chemical casing and/or expandable casing permit the drilling of a large borehole diameter that extends across all of the non-producing formations and achieves a common inner casing extending the entire length of the borehole. This produces a monodiameter wellbore or borehole diameter with a substantially monodiameter casing and replaces conventional multiple strings of concentric casing with different borehole diameters.

An assembly for constructing a monodiameter wellbore includes a bottomhole assembly having an overgauge hole drilling member and/or an energy balanced extended gauge bit drilling member, a directional steering assembly, a measurement while drilling tool, and a logging while drilling tool; a work string attached to the bottomhole assembly and extending to the surface; drilling fluids flowing through the work string and bottomhole assembly; chemical casing disposed in the borehole; expandable casing disposed in the wellbore; and a sealing composition disposed between the expandable casing and the wellbore wall.

A method for drilling a monodiameter borehole includes drilling an initial portion of the borehole with a drilling assembly having a bit, downhole motor and reamer; applying a catalyst base material to the borehole wall during drilling; back reaming the borehole as the drilling assembly is raised through the initial borehole portion; applying a set up material to the borehole wall as the borehole is back reamed; forming a chemical casing by reacting the set up material with the catalyst material; repeating the above steps by drilling additional borehole portions until the borehole is drilled; and installing a string of casing in the borehole.

A preferred method of forming the monodiameter wellbore includes drilling a monodiameter borehole from the surface to the top of the producing formation and applying a chemical casing to the borehole wall. Preferably the monodiameter wellbore is then cased with expandable casing upon the completion of the drilling of the wellbore. It is advantageous to drill one wellbore from the surface down to the top of the reservoir barrier with one casing string installed throughout the wellbore. In a second phase, the borehole is drilled across the reservoir using temporary sealing, under-balanced, over-balanced or special drilling fluids. Alternatively, sections of the borehole forming the wellbore may be cased with expandable casing after each borehole section has been drilled thereby maintaining a monodiameter casing.

The present invention achieves design optimization and efficiencies by reducing borehole size utilizing expandable casing and/or chemical casing. The use of expandable casing and/or chemical casing reduces the number and size of casing strings thereby reducing the materials required to drill and complete a monodiameter well. Also the number and size of high pressure risers may be reduced in a deep water well. Expandable casing also permits cladding or sealing, and chemical casing permits the use of sealants. The expandable casing allows the consolidation of conventional casings strings and operations. By utilizing expandable casing, additional borehole size is not reduced which otherwise would be required for casing hangers, annular spacing between casing strings, and float shoes. Still further, the cladding of the adjacent sections of expandable casing eliminates large bulky liner hangers, which otherwise require additional borehole diameter utilization. Expandable liner hangers can be utilized. The monodiameter well architecture, however, will not require the liner to have a larger diameter supporting. Of course, larger diameter casing requires not only a greater amount of drilling fluid to drill the borehole but also a larger amount of cement to cement the casing in the borehole.

The MONOWELL architecture has several unique features and advantages over the traditional well construction architecture. The methods and apparatus of the present invention form a monodiameter wellbore in the well reducing overall borehole dimensions. Thus the MONOWELL minimizes fluid requirements and volumes, equipment size/volumes, and materials required in the hydrocarbon, gas, water businesses, and/or any other drilling and production business. It utilizes less drilling fluids and cement. The drilling fluids and cement required for the well are reduced because large diameter boreholes and large diameter casing are not required. These are particularly advantageous in deep water wells where equipment size and fluid volumes must be optimized due to high cost. It reduces the amount of earth cut and thus reduces the cuttings generated. It has less environmental impact than a conventional wellbore by reducing the materials utilized, the earth contacted, the materials disposed, and the energy consumed during the well construction process.

Reducing the materials provides many advantages. Less drilling fluid and cement are required, drilling time is reduced, and smaller fluid volume and horsepower capacity rigs may be used. Still further, bulk storage on location is eliminated and horse power requirements are substantially reduced.

In reducing overall borehole dimensions, conventional casings, liners and tubing, as well as risers in subsea wells, are reduced in size or are eliminated. The monodiameter casing eliminates the series of nested different diameter casings. In a subsea well, instead of having a 36 inch conductor casing, the conductor casing may be 17 to 18 inches. The drilling blowout preventer is reduced from the standard 18-¾ inch BOP to a 13-⅝ inch BOP. The diameter of the riser extending from the ocean floor to the surface is also reduced. The number and size of surface and intermediate casings and high pressure risers may be reduced in a deep water well. The size of the hangers are reduced. It utilizes a smaller wellhead, casing, and risers for the final reservoir penetration.

MONOWELL architecture also allows the reduction in equipment size permitting the use of a small drilling rig, workover rig, or well intervention device. The methods and apparatus of the present invention allow the use such that a smaller, less sophisticated offshore rig, such as a second or third generation rig, may be used to drill the well rather than a fifth or sixth generation rig that handles larger boreholes and casing in the case of deepwater operations. Smaller land rigs may also be used particularly in horizontal and long extended reach wells.

Other objects and advantages of the invention will appear from the following description.

BRIEF DESCRIPTION OF THE DRAWINGS

For a detailed description of a preferred monodiameter embodiments of the invention, reference will now be made to the accompanying drawings wherein:

FIG. 9A is a schematic elevation view of an initial section of non-producing borehole for a monodiameter wellbore being drilling with a slickbore bit;

FIG. 9B is a schematic elevation view of the borehole section of FIG. 9A with a near bit reamer enlarging the borehole section;

FIG. 9C is a schematic elevation view of the borehole section of FIG. 9B cased with chemical casing;

FIG. 9D is a schematic elevation view of another section of non-producing borehole for a monodiameter wellbore being drilling with a slickbore bit;

FIG. 9E is a schematic elevation view of the another borehole section of FIG. 9D with a near bit reamer enlarging the another borehole section;

FIG. 12 is a schematic elevation view of a non-producing borehole being drilled with a standard bit and the chemical casing mixed with the drilling mud;

FIG. 13A is a schematic elevation view of an initial section of non-producing borehole for a monodiameter wellbore having been drilled and an initial section of expandable casing installed in the borehole with no chemical casing;

FIG. 13E is a schematic elevation view of the non-producing borehole for the monodiameter wellbore with a plurality of sections of expandable casing installed;

FIG. 14 is a schematic elevation view of a monodiameter wellbore having both chemical casing and expandable casing;

Figure 1:
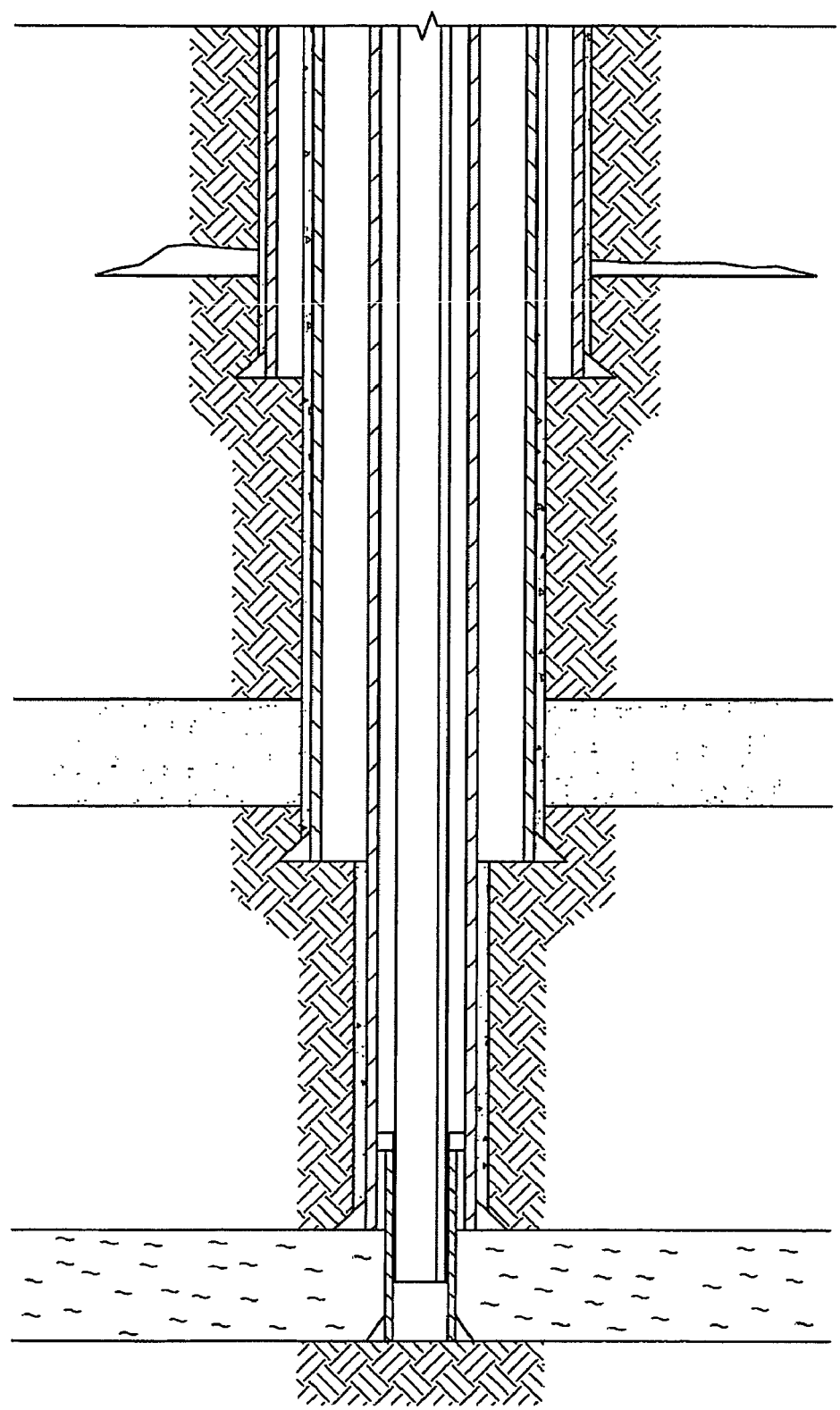
FIG. 1 is a schematic view of a conventional deepwater well.
Figure 2:
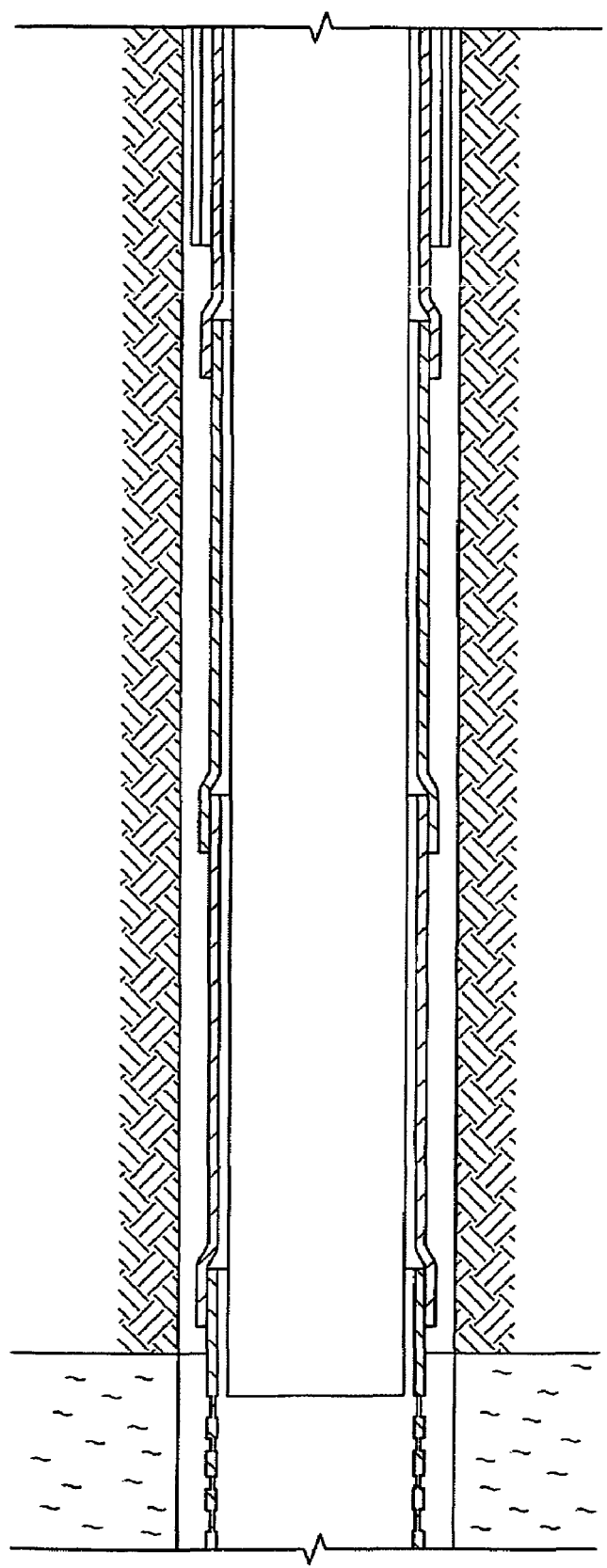
FIG. 2 is a schematic elevation view of a prior art bell end system using expandable casing.

While the invention is susceptible to various modifications and alternative forms, specific embodiments thereof are shown by way of example in the drawings and will herein be described in detail. It should be understood, however, that the drawings and detailed description thereof are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

The assembly and methods of the present invention construct a MONOWELL (a coined term) having a monodiameter and monobore. The monodiameter is a monodiameter casing disposed in a monodiameter wellbore having diametric efficiency. The monobore is a nominal fullbore production delivery system. A MONOWELL extends from the surface to at least the reservoir barrier and may extend to the bottom of the wellbore.

A monodiameter casing is a casing which has a substantially consistent outer nominal diameter, e.g., whose outer diameter varies less than a nominal three inches and preferably less than one inch, from the surface to the formation barrier. The monodiameter casing may be expandable casing and/or chemical casing.

A monobore is a nominal fullbore production delivery system, such as a production tubular, which either extends through the monodiameter casing from the tubing hanger to the formation barrier or extends through the monodiameter casing from the surface and through the producing formation. In a preferred case, the monobore extends from the tubing hanger down through the producing formation. A full bore production delivery system includes a tubular string or continuous tubing, together with all production components in the string or tubing, having a full production bore, i.e., the same nominal internal diameter throughout the conduit no matter whether the well is an injection well or producing well. There are no neck downs in the production conduit and all production components in the production conduit are full bore including downhole safety valves, nipples, and pressure/temperature gauges, for example. While a well may have a monodiameter architecture, it may or may not have a full bore production delivery system. Thus the assembly and methods of the present invention may include or exclude a fullbore production delivery system. For example, hydrocarbons may be produced through the production casing and liner where the production casing and liner are protected from corrosion such as by a corrosion inhibitor coating.

If the well has both the characteristics of a monodiameter casing and a monobore production delivery system either extending to the formation barrier or through the producing formation, then the well design may be called a "MONOWELL". A MONOWELL well has both monodiameter characteristics and full delivery characteristics. Any combination of the different embodiments between the monodiameter and fullbore production delivery system can made up a MONOWELL.

If the well has all the characteristics as described above for the monodiameter architecture from the reservoir barrier to surface, plus at a minimum, a common uniform nominal inner diameter conduit from the reservoir barrier to the surface, normally called tubing and associated completion equipment such as safety valves, and etc. Then the well is a MONOWELL.

"Monodiameter" means a substantially common diameter. For example, a "monodiameter casing" is a casing having a substantially common nominal outer diameter along its entire length. Preferably the monodiameter casing also has a substantially common nominal inner diameter along its entire length, although not required. A "monodiameter wellbore" is a borehole forming the wellbore having a substantially common diameter along its entire length. The monodiameter wellbore extends from the surface to at least the reservoir barrier and may extend to the bottom of the wellbore. Although the monodiameter wellbore may have any depth, such as 100 feet or more, the monodiameter wellbore is particularly advantageous in a deep well, such as a well having a depth greater than 1000 meters.

The present invention relates to methods and apparatus for drilling a monodiameter wellbore for receiving a monodiameter casing which in turn may receive a monobore production delivery system in constructing a MONOWELL. A MONOWELL may or may not have a monodiameter borehole which will depend upon the formation.

The present invention will be described for use in the oil and gas exploration and development business. The invention, however, can be applied to any and all penetrations in the earth including the mining industry, water industry, and other industries that involve drilling a borehole.

The present invention is also directed to simple and complex well structures including multi-lateral, concentric or multi-formation, complex or artificial lift wells where fluids may be injected and/or produced at the same time all within the same wellbore. The injection may occur down through the flowbore of the work string and production then passes up the annulus or in the reverse.

There are shown specific embodiments of the present invention with the understanding that the present disclosure is to be considered an exemplification of the principles of the invention, and is not intended to limit the invention to that illustrated and described herein. Various dimensions, sizes, quantities, volumes, rates, and other numerical parameters and numbers have been used for purposes of illustration and exemplification of the principles of the invention, and is not intended to limit the invention to the numerical parameters and numbers illustrated, described or otherwise stated herein.

In particular, various embodiments of the present invention provide a number of different constructions, apparatus and methods of drilling, casing, and completing a MONOWELL, each of which may be used to drill, case, and complete a MONOWELL for a land or subsea well including a new borehole, a vertical borehole, a straight borehole, an extended reach borehole, extending an existing borehole, a sidetracked borehole, a horizontal well, a deviated borehole, a multi-lateral borehole, and other types of boreholes for drilling and completing one or more production zones. Further the present invention relates to both producing wells and injection wells. Still further, the present invention relates not only to new wells but to existing wells. The embodiments of the present invention also provide a plurality of methods for drilling, casing, and completing a monodiameter wellbore. All the above is applicable to the MONOWELL architecture as well. In other cases, in general, it means, full conduit delivery means from the reservoir (producing formation) to the wellhead.

The monodiameter can apply to all multi-laterals including the primary wellbore or individual lateral wellbores. The monobore can apply above the junction of the laterals, i.e., the fillbore delivery system having an inner conduit with a fullbore diameter extending above the joining of the laterals. The laterals may or may not be expandable casing or screens and may have a diameter equal to or less than the monodiameter casing.

The different teachings of the embodiments discussed below may be employed separately or in any suitable combination to produce desired results.

The following definitions will be followed in the specification. As used herein, the term "enlarged wellbore" refers to a wellbore or borehole having a diameter greater than that of the internal diameter of the preceding casing or liner, preferably greater than the external diameter of the preceding casing or liner, such a wellbore being provided or drilled in a manner known to those skilled in the art, as described more fully hereinafter. As used herein, the term "work string or drill string" is understood to include a string of tubular members, such as casing, tubing, jointed drill pipe, metal coiled tubing, composite coiled tubing, drill collars, subs and other drill or tool members, extending between the surface and on the lower end of the work string, a tool normally utilized in wellbore operations. A work string or drill string may be used for drilling and be a drill string or installation means. It should be appreciated that the work or drill string may be made of steel, a steel alloy, a composite, fiberglass, or other suitable material. As will be understood by those skilled in the art, a "casing" is a string of tubulars extending from the surface down into the wellbore and a "liner" is a string of tubulars extending from the lower end of a casing string and down into the wellbore. Liners may be disposed within casing. Casing and liners are typically composed of pipe segments or sections assembled and coupled by suitable means, such as by threading. "Casing" may be used generically and also include liners. Reference to up or down will be made for purposes of description with the terms "above", "up", "upward", or "upper" meaning away from the bottom of the wellbore and "below", "down", "downward", or "lower" meaning toward the bottom of the wellbore. An "upper borehole", "non-producing borehole or wellbore" or a "non-producing formation" is defined as any formation above the "lower borehole", "producing borehole or wellbore", "producing zone", "reservoir" or "producing formation," i.e., the target formation with the desired production or injection zone or reservoir. Some non-producing formations may be hydrocarbon bearing. The desired production zone is sometimes referred to as the target zone for producing either oil, gas or water, or for injecting water, steam, gas, carbon dioxide or other fluids. "Geo-mechanical forces" are forces on the formations, such as compaction forces, seismic forces, tectonic forces, or other forces relating to borehole stability.

A trip into the well may be defined as the operation of lowering or running a tool into the well on a work string. A trip includes lowering and retrieving the tool on the work/drill string. In a drilling operation, the tool will include a bit, typically part of a bottom hole assembly (BHA).

In the description which follows, like parts are marked throughout the specification and drawings with the same reference numerals, respectively. The drawing figures are not necessarily to scale. Certain features of the invention may be shown in exaggerated scale or in schematic form and some details of conventional elements may not be shown in the interest of clarity and conciseness.

Figure 3:
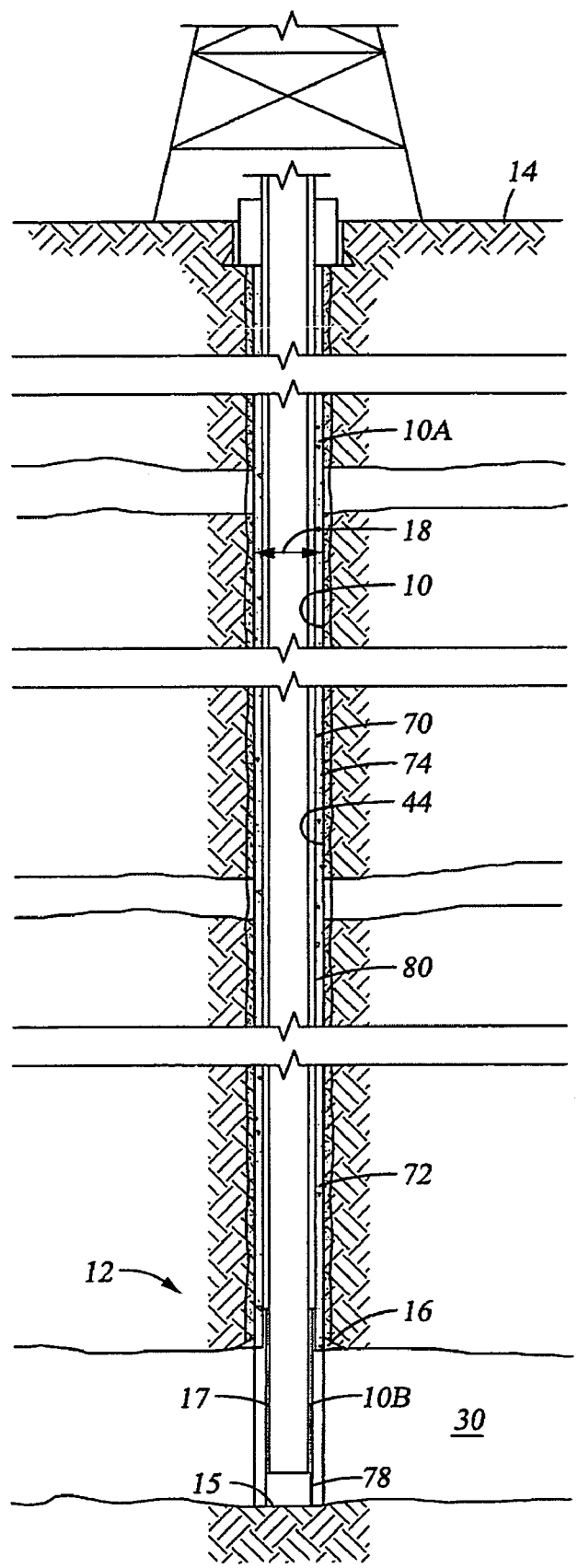
FIG. 3 is a schematic elevation view of both the non-producing borehole and producing borehole having been drilled and cased with production tubing installed.

Referring initially to FIG. 3, there is shown schematically a MONOWELL 12 with a monodiameter wellbore 10 extending from the surface 14 to the bottom 15 of the well 12 within producing reservoir 30. Monodiameter wellbore 10 includes at least a monodiameter borehole 10A extending from the surface 14 to the top of the reservoir, i.e. reservoir barrier 16, hereinafter referred to as the "upper borehole", "non-producing borehole or wellbore" or "non-producing formation", and a borehole 10B extending across or through the reservoir 30 from the reservoir barrier 16 to the bottom of the well 15, hereinafter referred to as the "lower borehole", "producing borehole or wellbore", "producing formation", or "reservoir". Producing wellbore 10B may or may not be a part of the monodiameter wellbore 10. It should be appreciated that the non-producing wellbore may extend across a secondary producing zone as distinguished from the conventional producing wellbore which extends across the target producing zone. A monodiameter wellbore is a single borehole extending from the surface to at least the reservoir barrier and may extend to the target depth of the well. The monodiameter borehole forming the wellbore 10 has a substantially common nominal diameter along its entire length, i.e. from surface 14 to top of the reservoir barrier 16, as distinguished from the conventional plurality of boreholes having different diameters as shown in prior art FIG. 1. The monodiameter wellbore 10 may or may not extend to the target depth of the well. Although the monodiameter wellbore 10 may have any depth, such as 100 feet or more, the monodiameter wellbore 10 is preferably for a deep well such as a well having a depth greater than 1000 meters from surface 14 to bottom 15. It should be appreciated that the monodiameter wellbore 10 will have a predetermined outer diameter 18 as set forth in the well and engineering plan. A monodiameter is just one borehole extending from the top to the bottom of the well. A higher level of engineering and technological precision is needed to deliver the monodiameter well architecture compared to traditional well construction processes. When a monodiameter is drilled, increased precision and attention is applied.

The monodiameter non-producing wellbore 10A is cased to form a monodiameter casing extending from the top to the bottom of the well. Although casing 70 may be conventional casing extending from the surface 14 to the reservoir barrier 16, it is most preferred for the casing to be expandable casing. Once the casing is in place, it is then cemented into upper wellbore 10A by flowing cement 72 into the annulus 74 formed between casing 70 and wellbore wall 44. Although a metal casing is preferred for casing 70, it should be appreciated that casing 70 may be made of a composite, or fiberglass or other non-metal material. Further, it should be appreciated that the casing may be chemical casing, hereinafter described, or a combination of the above.

The outer diameter of the casing 70 has a substantially common dimension from surface 14 to the formation barrier 16. The casing 70 has a substantially consistent nominal outer diameter along its entire length, not varying over three inches and preferably not varying over one inch. Although it is preferred that casing 70 have a consistent inner diameter from surface 14 to the formation barrier 16, casing 70 does not have to have a consistent inner diameter. The set of casings 70 preferably have a smaller diameter which extends from the surface 14 to the formation barrier 16 which is smaller than that of the series of conventional casings. If the production tubular passing through the producing formation has the same inside diameter as the completion tubular 80 extending from the formation barrier 16 to the surface 14, then it is a monobore. Normally a liner 17 is set near the bottom of the completion tubular 80. The completion tubular 80 is preferably stung into the liner and expansion cladding can occur for them to form a conduit or the liner can be hung off using a liner hanger, preferably an expandable liner hanger.

One objective is to reduce the overall diameter of the wellbore and it is preferred not to drill a borehole diameter any greater than necessary. The larger the diameter of the borehole, the larger the required drilling equipment, the larger the rig, and the more power required to drill the borehole. A larger diameter borehole also requires a larger casing. Further, there is more earth to move in a larger diameter borehole and more cement is required to fill the larger annulus. Another reason for maintaining a small borehole diameter is to reduce the volume of fluids required to complete the well. This includes drilling fluids as well as cement. Thus, the entire operation for a larger diameter borehole becomes more costly.

Figures 4, 5:
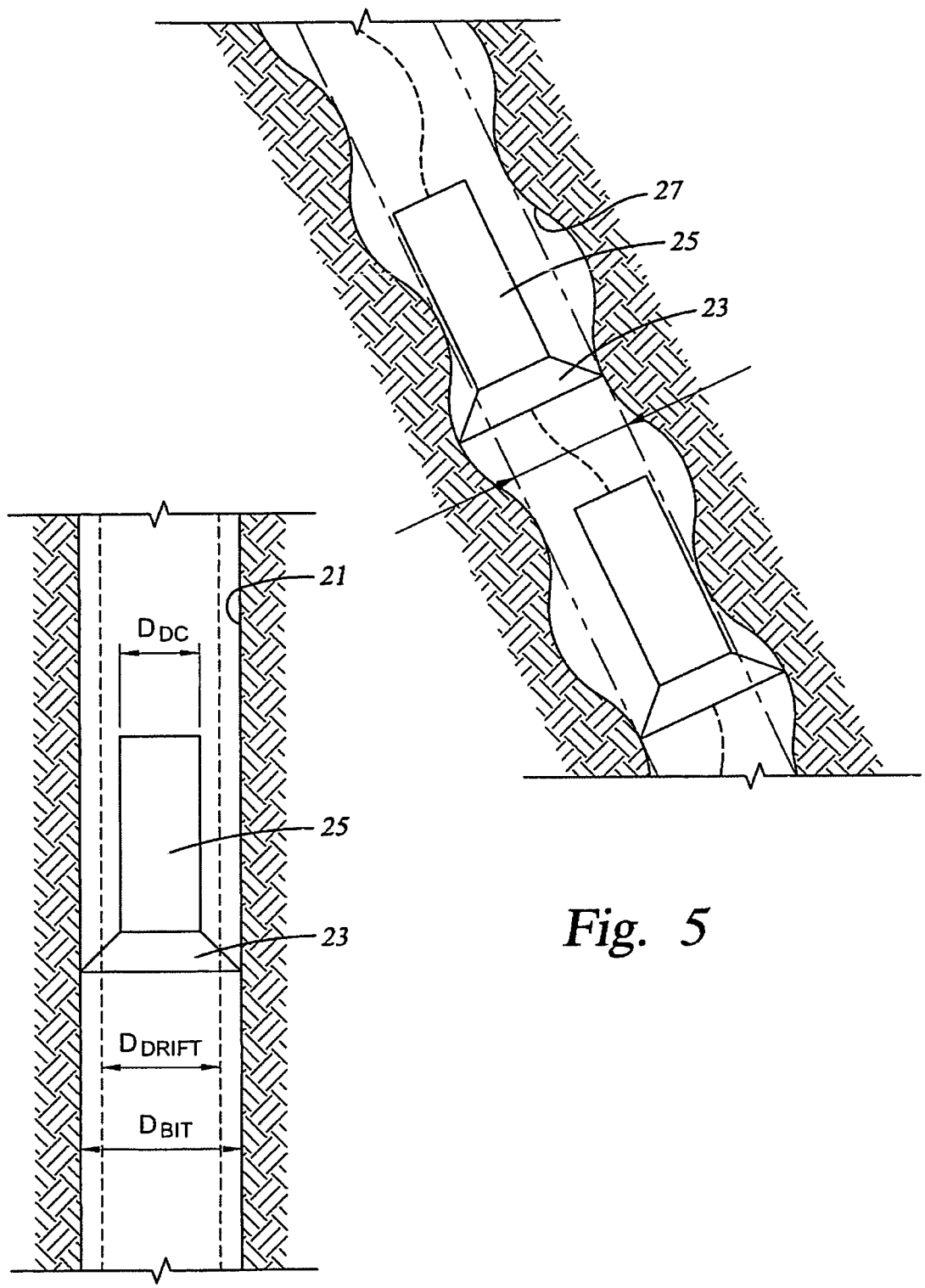
FIG. 4 is a schematic of the drift diameter for a bit and drill collar in a straight borehole.
FIG. 5 is a schematic of the drift diameter for a bit and drill collar in a spiraling borehole.

Referring now to FIGS. 4 and 5, there is shown in FIG. 4, a straight borehole 21 drilled by a bit 23 having a diameter $D_{bit}$ supported by a drill string having a drill collar 25 with a diameter $D_{DC}$. The reduced wellbore pass-through area or "drift" has a diameter $D_{Drift}$. The formula for calculating drift diameter is bit diameter+drill collar diameter divided by 2. For example, in a hole drilled with a 12-¼ inch bit and an 8 inch drill collar, the largest diameter tubular that could be guaranteed to run through this wellbore would be 10-⅛ inches. FIG. 5 illustrates the drift diameter of a spiral wellbore 27. The pass-through area or drift is shown by the dotted lines between the arrows. Thus it is apparent that spiraling is undesirable since it reduces the drift diameter.

The casing must extend through the drift diameter. The gap or clearance between the outer diameter of the expandable casing and the inner diameter of the borehole wall preferably is one inch and may be as great as 3 or 4 inches. This gap or clearance is required for the cementing operation, preferably a one inch clearance. With these smaller clearances, the borehole can not be a spiral. In using conventional casing, the clearance may be anywhere from approximately 6 to 10 inches. A wash out for conventional casing, for example, may be anywhere from 6 to 36 inches or greater.

The preferred borehole has a diameter which is the minimum required to install the desired sized casing. This of course minimizes the clearance between the casing and the borehole wall, i.e. the annulus. Therefore, to install a monodiameter casing, the wellbore must be a quality borehole. Another objective is to achieve an open borehole which will allow the use of a monodiameter casing such as expandable casing, i.e., the wellbore has a diametric efficiency which will receive and cement a monodiameter casing and allow the use of expandable casing. Thus the new well concepts, as described for the installation of expandable casing, will require narrow annuli, such as annuli up to approximately 3 to 4 inches on diameter.

A quality borehole is required to achieve the MONOWELL. A high-quality wellbore is generally considered to have (1) a gauge hole, (2) a smooth wellbore, and (3) a wellbore with minimum tortuosity. Spiraling is the primary contributor to poor borehole quality and almost every well contains some degree of spiraling unless specific actions are taken to prevent it. A diametric efficient borehole includes the qualities of a high quality borehole and preferably includes a smooth cylindrical borehole wall, a borehole diameter which is only slightly greater than the outer diameter of the expandable casing, and a straight borehole. A straight borehole means no tortuosity in the borehole, i.e., no spiraling of the borehole. Conventionally, the torque on the drilling assembly causes a reverse spiral in the direction of drilling whereby the drilling assembly drills a spiral borehole. The spiraling borehole can sometimes reduce or increase the diameter of the borehole through which the casing can pass. Thus, spiraling must be minimized.

Tortuosity occurs when a well deviates from a straight hole. "Micro-tortuosity" is where the hole axis is a spiral instead of a straight line, i.e., the borehole has a spiral pitch. Friction factors and tortuosity index may be used to quantify the effect of tortuosity on the torque and drag. Although an MWD tool routinely records the inclination and direction of the wellbore, typically the MWD tool is 30 feet long and therefore can not detect a tight spiral because the MWD tool spans several pitches of spiral and cancels them out. The MWD tool can not detect hole spiral because it measures the inclination and direction of the drift, not of the wellbore itself. Micro-tortuosity is defined as small scale borehole spiraling where the hole axis becomes a helix instead of a straight line. The only way micro-tortuosity can be detected is by advanced wireline survey techniques, MWD acoustic caliber tools, or by the interpretation of back calculated friction factors.

For example, in a conventional well, a 12-¼ inch borehole will accommodate a 9-⅝ inch casing. The 9-⅝ inch casing will receive an 8-½ inch bit for installing a 7 inch casing. The 7 inch casing will receive a 6-½ inch bit. If the wellbore had diametric efficiency, the 12-¼ inch casing would accommodate a 10-¾ inch casing. The 10-¾ inch casing would receive a 9-½ inch bit for installing an 8-¾ inch casing. The 8-¾ inch casing would receive a 7-½ inch bit. Thus the diametric efficient wellbore increases the diameter of the wellbore by at least an inch.

It is preferred that the casing OD be very close to the borehole ID. The reason for the close tolerance between the borehole wall and casing is because of the expandable casing. Expandable casing requires a better precision borehole than conventional casing. The expandable casing with appropriate expandable casing cement, forms a unique sealing and support system. The borehole wall also serves as partial support for the expandable casing.

It is more critical that the expandable casing be sealed with the borehole wall than in a conventional installation. For example, if expandable casing is installed, and a portion of the expandable casing is not sealed with the borehole wall, then it becomes necessary to install an additional expandable casing or use extra sealant materials to fill voids in the unsealed portion.

The failure to have proper seal and support of the cement is aggravated when expandable casing is used. The problem is caused by the fact that the expandable casing is expanded outward toward the borehole wall unsupported. The cementing operation occurs before the expandable casing is expanded. In the expansion of the expandable casing, the cement is compressed. The cement for expandable casing does not set until after the expandable casing is expanded. The expandable casing cement takes longer to set and may include a retardant to delay the setting time. The expandable casing must be expanded into the cement so as to create and establish a seal with the borehole wall. If the expandable casing is not properly sealed, then there may be channeling which will allow different formations to communicate which is against regulations or instability of the casing.

If a large borehole is drilled, then large wash outs may be caused in the borehole wall. That portion of the expandable casing adjacent to the wash outs will not be sealed at the borehole wall. If the borehole has a wash out, and the expandable casing is not properly sealed or supported, then the MONOWELL may have a shorter life.

A special cement is required to avoid a micro fracture. The cement for expandable casing is more of a sealant than it is a conventional cement for conventional casing. The expandable casing cement has got a silicant in it.

Diametric efficiency is the maintenance of the optimum hole size through to the reservoir regardless of other well construction requirements or constraints. Expandable solutions that maintain or improve diametric efficiency in a range of applications from multilaterals, horizontals, extended reach, high pressure high temperature (HPHT), and deepwater environments will encourage the use expandables. The maintenance of diametric efficiency through the use of expandable casing is a significant step towards the MONOWELL. To achieve a diametric efficient borehole, components for drilling the borehole must be optimized including the type of wellbore delivered by the bit, the directional tools, the drilling fluids, casing, expandable casing sealing composition, formation sealing methods, among others.

A higher level of engineering and technological precision are needed to deliver the monodiameter well architecture compared to traditional well construction processes. When a monodiameter upper borehole is drilled, increased precision and attention is to be applied to the following areas: a clear understanding of the formation to be drilled and being drilled; borehole stability; drilling hydraulics; effective management of equivalent circulating density (ECD); borehole quality; method of strengthening the borehole (borehole management); well-life integrity; reliability and run life of the bottomhole assembly with bottomhole assembly components; longer cementing and casing execution intervals; borehole structural support; and the life, i.e., time element, of the open borehole. See SPE 77628: "Well Construction Efficiency Processes Yielding a Significant Step Change" by Wylie, Zamora, Terry, and Murali to be presented at the SPE Annual Technical Conference and Exhibition on Sep. 29, 2002 to Oct. 2, 2002.

The common inner diameter or width, i.e., monobore, will extend across the reservoir in most MONOWELLs. If this is the case, increased engineering precision compared to traditional well completion engineering will be applied in the following areas: completion, beginning with drilling of the reservoir barrier; borehole quality; borehole stability across the reservoir; reservoir evaluation; reservoir productivity; and formation damage minimization.

To be successful, the monodiameter wellbore and MONOWELL require a higher level of precision in all areas including seismic interpretation, reservoir modeling, planned well path, and individual drilling component designs. Historical information from drilling the surrounding wells, along with seismic and geomechanical analyses, provides valuable insight into the well path and borehole stability management. In exploration areas, this information is limited, but similar formation information can be used as well as real-time information.

Well planning is conducted in the selection of the apparatus and methods of the present invention required for constructing a monodiameter wellbore at a particular location. Components may be included as conditions warrant. Greater well planning is preferred for a monodiameter wellbore to avoid geological incidents and/or engineering mistakes. In a conventional well, if a geological incident occurs, another string of casing is installed into the well. In a monodiameter wellbore, the wellbore already has been reduced so that there is minimal space in the annulus to correct any geological or mechanical incidents. Mistakes may cause a reduction in the planned diameter for the well. Another expandable may be inserted and expanded inside an existing monodiameter casing. Another type of mistake includes drilling mistakes. Thus, advance well planning and engineering is important to avoid geological incidents or engineering mistakes. It is not necessary that all of the analyses described below be made for the well planning and engineering but should be investigated and considered for each well.

Various information is needed in planning and constructing a monodiameter wellbore. Seismic analyses is useful in determining potential formation depths and breaks. Geomechanical analyses is utilized to determine potential borehole stability issues from all formations throughout the wellbore. It is also useful in drilling fluid formulations, drilling bit designs, well path trajectories, and completion design for extending the well's life. It is further useful in determining potential tectonic stresses, potential compaction and possible shallow water flows. Geomechanical models and analysis are available, such as from Baroid, Geomechanics International, Sperry Sun, and Landmark, which take into account both chemical and mechanical borehole stability issues and can analyze the borehole stability from a mechanical standpoint. Tools are in the development stages which can determine seismic and borehole stability ahead of the bit. Geological analyses, logging and seismic are utilized to determine what type of formation structure, pressures, and lithology make-ups are present. This allows one to formulate the sealants, chemical casing, settable spots, cements and drilling mud compositions, and fluid volumes to hold back the formation(s).

Loading and growth of casing during well life is considered in the monodiameter wellbore engineering plan. This includes detailed loading and growth analyses which take into account the reduced tolerance, reduced spacing, and dependence of one casing section upon another casing string in a monodiameter well architecture.

The reduced diameter of the monodiameter wellbore requires that increased attention be placed on casing wear considerations, particularly in the expandable casing scenario where the pipe has been placed in cold work form upon installation and expansion in the wellbore.

Hydraulics analyses is required for bits, drilling fluids and cementing. It is critical to determine the correct flow rates to determine bit cooling, cutting transport, as for example, as inaccurate results will lead to stuck pipe or a well control situation with a resulting re-drill or sidetrack. Various computer programs, such as from Security DBS, Sperry Sun, Baroid and Landmark, provide cementing analysis from the viewpoints of placement, hydraulics, and composition.

A monodiameter well can be constructed by placing nested expandables in the same casing intervals where conventional casing would have been set. An improvement is to reduce as many casing intervals as possible and place the well accurately across the reservoir. This action requires real-time information. Integrating the efficiency improvements in the well-construction process can result in a large efficiency step change.

In many respects, well design is largely dictated by pore pressure and fracture pressure information. To extend hole intervals and optimize placement, real-time operations that involve collecting, analyzing, and interpreting data should be available. Visualization models can help interpretation. Real-time information that updates the seismic, reservoir, geomechanical, and drilling models (including 3D and 4D visualization models) allow updates and directives to be given to the bottomhole assembly so that immediate drilling actions can be taken.

Means, such as Landmark Graphic's 3D Drill View and 3D DRILL VIEW KM (Knowledge Management), allow the operator to visualize, analyze and interpret MWD/LWD and drilling operational data in real-time. The 3D visualization of real-time data, together with the pre-planned earth model, enables the operator to make more rapid decisions. The 3D Drill View has the capability to display and manipulate (rotate, translate, zoom) geoscience earth model data objects together with drilling engineering and operations data for integrated knowledge management and real-time decision making and offers integration and collaboration between drilling rig and operator with the capability for each site to visually manage data and improve decisions for the entire operation.

The well-construction process becomes more efficient and long-term well productivity is improved by accurate placement of the well and completion design. For example, the following help extend hole intervals: (1) real-time feedback on actual vs. predicted pore pressure and fracture gradient, (2) real-time methods to influence or manage pore pressure or fracture gradient, and (3) real time downhole drilling fluid rheology, viscosity and physical condition including percent of solids.

Real-time pore-pressure prediction and mechanical properties for fracture gradient and borehole stability can be used to adjust the mud system, cement formulations, or other specialty fluids for enhancing the mechanical strength of the formation while drilling. Also, pore pressure and fracture gradient information can be used in mechanical casing interval placement decisions. The real-time information might dictate shorter or longer intervals than planned. However, the primary aim is to lengthen actual cut intervals for as long as possible. Real-time time-lapse resistivity can show permeable zones in the upper borehole that might cause borehole stability issues. Across the reservoir, the information can help in designing the optimum completion design for both short and long term.

Drilling long, openhole sections with the potential for increased openhole exposure requires many considerations. The mud system must be chosen with consideration to penetration rate and borehole cleaning in addition to the previous discussed borehole stability. Chemical solutions and techniques help extend casing setting lengths. Using expandable tubulars as the mechanical support in combination with chemical solutions can result in fewer multi-diameter "nesting" sections. The use of chemical solutions with non-expanded casing can increase the length of traditional casing lengths that can be run as well.

It is preferred that equipment and principles, such as those previously described, be used such that the well construction process is rapid and not delay any operational changes as the well is drilled. Thus, there is a need for real time data collection and analyses. The data collected at the bit is networked and integrated at the rig for analyses employed by INSITE ANYWHERE. Real time operations are preferred but not essential. A gamma ray device is preferred and can be powered by a battery with the data collected after the gamma ray device is retrieved from the well. However, some major efficiencies are lost when the data is retrieved after the fact and one can experience well construction monodiameter difficulties in the delayed information. See U.S. patent application Ser. No. 60/209,488 filed Jun. 6, 2000 entitled Real Time Method for Maintaining Formation Stability and Monitoring Fluid-Formation Interaction, hereby incorporated herein by reference. U.S. provisional application Ser. No. 60/209,488 was converted to U.S. patent application Ser. No. 09/874,806 filed Jul. 5, 2001, now U.S. Pat. No. 6,609,067. The benefits of real time operations are noted in this application.

Well path trajectory is a detailed torque and drag analysis that is required to determine the well path needed for the monodiameter wellbore to reach target depth. The optimum well path can be designed using Strata-steer, INSITE ANYWHERE, Resolution 3D, a directional drilling package, MWD measurement while drilling, and logging while drilling tools, which preferably includes a gamma assembly at a minimum. Look ahead of the bit devices can and should be included in the LWD tools within the BHA.

To achieve a quality borehole having diametric efficiency, the monodiameter wellbore should have minimal tortuosity. A continuous borehole wall is preferred with a constant diameter wellbore and therefore an oversized or "crooked" borehole is undesirable. A borehole with high tortuosity includes bends and curves that cause gaps and increased borehole diameter along the borehole. Further, tortuosity makes it very difficult to achieve a good cementing job because big washouts in the borehole cause the cement to collect in the gaps. Also, it is difficult to achieve a good cement job if there is not a smooth wellbore wall such that a constant annular area around the casing is achieved. A poor cement job also reduces the longevity of the well. Thus, although the monodiameter wellbore may be achieved, a quality cement job is important across the production interval to avoid a big washout, poor production, erosion and early water or gas breakthrough.

A resulting high borehole quality can provide the following monodiameter benefits: less vibration; smoother borehole; and improved logging tool response. Less vibration provides longer drilling tool reliability, better bit life, better toolface control, better weight transfer, and better cutter engagement to the formation. A smoother borehole is easier to clean, less torque and drag occurs on the bottomhole assembly, casing is easier to install, and the chance of extending the longer monodiameter casing interval depths are greater. With an improved logging tool response, the tools have less chance of getting stuck when a clean "gun barrel" borehole is provided, and better logging data can be collected.

Attributes of the monodiameter downhole assembly should include a high level of efficiency getting to the desired location; a high borehole quality; appropriate drilling hydraulics; and high reliability and extended tool life. The drilling hydraulics prevent big wash outs in the borehole.

Components are required to achieve a straight borehole which will allow a monodiameter casing preferably including expandable casing, chemical casing, bit and directional tools which will produce no tortuosity. The bit and directional tool preferably includes a full drift bit and a GEO-PILOT ("point the bit") directional system or SLICKBORE system. See U.S. Pat. No. 6,269,892; U.S. patent application Ser. No. 09/378,023, filed Aug. 21, 1999 entitled Improved Steerable Drilling System and Method, now U.S. Pat. No. 6,581,699; and U.S. patent application Ser. No. 10/230,709, filed Aug. 29, 2002 entitled Improved Steerable Drilling System and Method; all hereby incorporated herein by reference. See also "Halliburton New Technologies and General Capabilities" (5 pages). The bit preferably has an extended gauge and may be energy balanced which allows for equal volume cutting across the entire bit. An energy balanced bit is a bit where there is approximately the same loading on each of the cutting elements of the bit. This allows the bit to wear evenly and not have to be prematurely replaced or pulled prior to cutting the entire interval. See U.S. Pat. Nos. 6,095,262; 6,213,225; 6,401,839; and 6,412,577; all hereby incorporated herein by reference.

The best bit combination for drilling the monodiameter wellbore is an energy-balanced SLICKBORE bit with a near bit reamer. The bit is energy balanced with all cutters being cutting equal loads—resulting in longer drilling intervals. The near bit reamer in the drill string allows for enlarging/opening up of the wellbore, even to drill through cement float equipment. The design of the SLICKBORE extended gauge bit allows for the bit and motor or rotary steerable device to act in concert allowing for a much smoother wellbore. Rotary steerable technology is disclosed in U.S. Pat. Nos. 5,685,379; 5,706,905; 5,803,185; and 5,875,859, all hereby incorporated herein by reference, and Great Britain references 2,172,324; 2,172,325; and 2,307,533. U.S. patent application Ser. No. 09/253,599 filed Jul. 14, 1999 entitled Steerable Rotary Drilling Device and Directional Drilling Method, now U.S. Pat. No. 6,225,004, hereby incorporated herein by reference.

Friction factors have been used to take into account several different components which increase torque and drag in the wellbore which in turn cause spiraling. The most important factors are drilling fluid type and composition, total tortuosity, and formation type in the open hole section and casing condition in the cased hole section. The difference between the plan friction factors and the actual friction factors is called the tortuosity index. Wells drilled without spiraling have lower torque and drag. The average open hole friction factors are reduced from 0.27 to 0.21 in water-based mud, and from 0.12 to 0.1 in oil-based mud. Reduction of friction factors is believed to be the result of smoother wellbore.

The present invention reduces the tortuosity index, a measurement of how much tortuosity is in the wellbore, from 1.34 to 1.08. This suggests that absence of hole spiraling has a larger impact then the slide/rotate action (large scale tortuosity) from the steerable motors. The data suggests that spiraling is reduced by using extended gauge bits. The tortuosity index for conventionally drilled wells is 1.34 while the tortuosity index of a SLICKBORE drilled well is 1.08. Thus, the present invention achieves diametric efficiency, in part, by maintaining the tortuosity index below at least 1.10. For a detailed discussion see SPE 77617 entitled "Quantifying Tortuosities by Friction Factors in Torque and Drag Model" by Tom Gaynor, Doug Hamer, and David C-K Chen, dated September 29-Oct. 2, 2002.

Spiraling may be minimized by using either a steerable motor drilling system or a rotary steerable drilling system. The steerable motor drilling system deploys the extended-gauge bits and has especially designed mud motors with pin-down connections. The system is designed to eliminate spiraling. The extended-gauge bit prevents the bit from moving off center. See OTC 14277 "Hole Quality: Gateway to Efficient Drilling, by David C-K. Chen, Tom Gaynor, and Blaine Comeaux, dated May 6-9, 2002.

Figure 6:
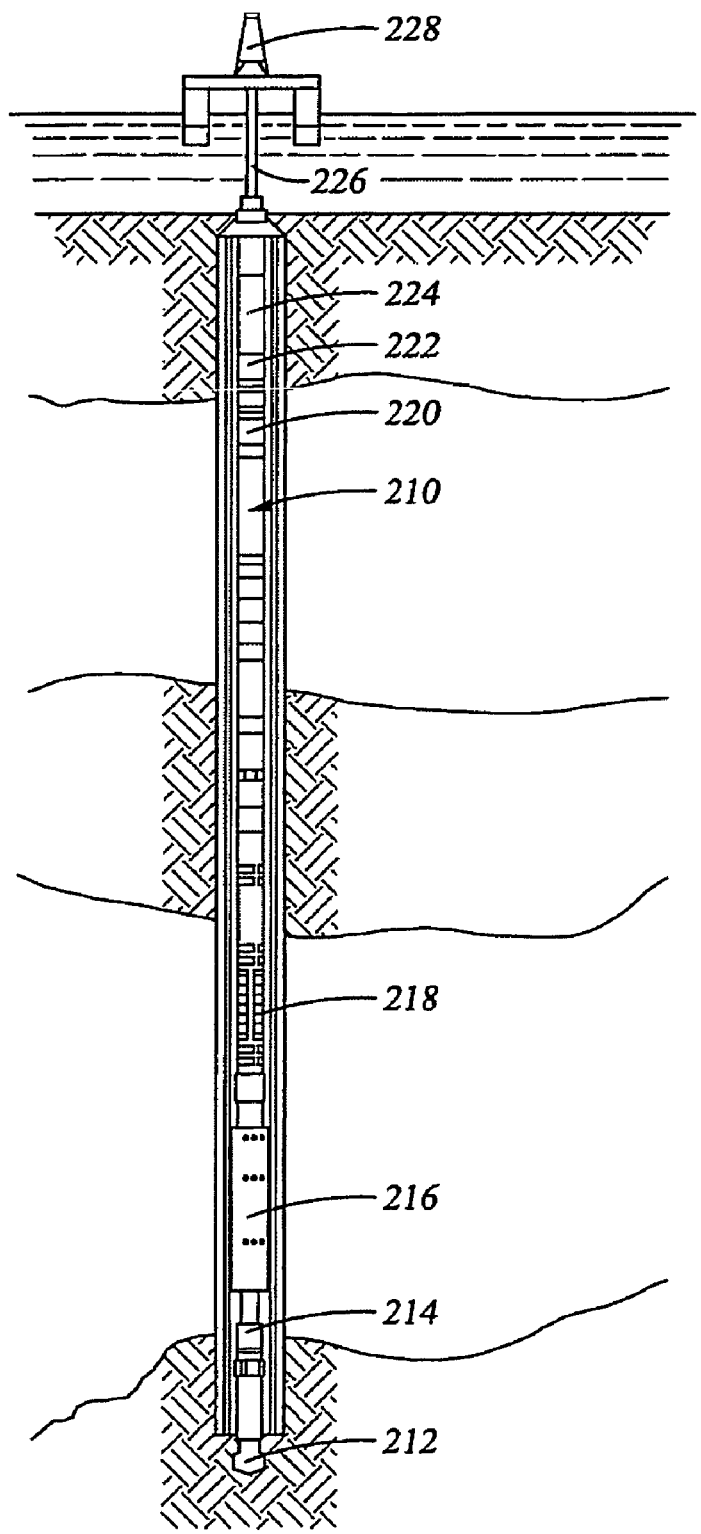
FIG. 6 is a schematic of a MONOWELL bottomhole assembly.

Referring now to FIG. 6, there is shown a preferred bottomhole assembly 210 including an extended gauge bit 212 with sensors, a GEO-PILOT steerable "point the bit" rotary steerable system 214, a combo tool 216, a rock mechanics compression and slow shear sonic tool 218, a magnetic resonance imaging tool 220, a near bit reamer 222, and a cutting removal device 224. The extended gauge bit 212 may be an energy balanced bit. The combo tool 216 may be a triple or quadruple combo tool. The bottomhole assembly 210 is connected to a work string 226 which extends to a second or third generation rig 228 or any land rig. A seismic or evaluation tool which investigates ahead of the bit may or may not be included.

The drilling systems for the monodiameter wellbore are preferably directional drilling systems that include devices that aid in drilling boreholes in accordance with the well plan. Such devices may or may not include, but are not limited to the real time point the bit rotary system 214 shown in FIG. 6, such devices as Halliburton's INSITE ANYWHERE, Landmark's 3D DRILLVIEW and Halliburton's GEO-PILOT Rotary Steerable System by Sperry Sun or other systems that assist in placing an accurate wellbore that provides a precise, real time wellbore placement with a clean conditioned wellbore.

A near-bit reamer 222, which enlarges the borehole, placed above the measurement while drilling/logging while drilling (MWD/LWD) tools can hold the bottomhole assembly 210 in the center of the borehole, causing equal cutting loading across the borehole. This centralization reduces overall vibration, fatigue, and MWDILWD failures. A near-bit reamer 222 provides a lower bend in dogleg severity, resulting in reduced slide times. Also, the near-bit reamer design minimizes vibrations, which results in a better quality borehole and better logging results.

The near bit reamer 222 is preferred over the bi-center bit in drilling the upper non-producing borehole. The near bit reamer permits drilling through the cement float shoe formed during the cementing operation of the previous installed casing. The near bit reamer can drill through the cement shoe and then continue on drilling the new borehole without having to be stopped. The near bit reamer helps to build a smooth borehole allowing for a better completion. The near bit reamer can be used in applying a formation compatible fluid and may be useful in applying chemical casing, cementing or improving the borehole quality as hereinafter described.

Although a near bit reamer 222 is shown in FIG. 6, various types of penetration members may be used to create the monodiameter wellbore 10. A particularly preferred bit is one that is energy balanced. However, any type of bit may be used with the present system. Depending on the formation, the following types of penetration members can be utilized in drilling a monodiameter well architecture: fixed cutter bits, roller cone bits, energy balance bits, anti-whirl three cone bits, hole openers, near bit reamers, and bi-center bits. Most of these components are manufactured by Security DBS. Although these bits have certain design features that contribute to a better monodiameter wellbore, over-gauge hole drilling is preferred. Bits utilized in drilling a monodiameter well, however, are not exclusive to these items.

It is preferred that the bit is "matched" to the directional steering assembly. One such assembly is the SLICKBORE Drilling System, employed by Sperry Sun, having a matched mud motor and bit system, which enhances directional control and improves hole quality. The SLICKBORE Drilling System includes an extended gauge bit, a downhole motor, and MWD and LWD tools, combined with a near bit reamer. Another system is the GEO-PILOT rotary steerable, point the bit, system 214 which includes a bit, a rotary system, a downhole turbine, and MWD and LWD tools combined with a near bit reamer. A drilling efficiency package (ADT™ Applied Drilling Technology Optimization Service) employed by Sperry Sun may be used with either the SLICKBORE or Geopilot drilling systems. ADT is a suite of tools, software, and services designed to reduce trouble time and optimize drilling practices by using critical data interpretation from a variety of downhole/surface sensors and specialized applications. The ADT adds sensors to the bottomhole assembly to provide real time measurements of various downhole parameters, such as hydraulics and borehole stability, which are transmitted to the operator or processors at the surface. These measurements are analyzed and processed at the surface and adjustments are then made to the drilling operating parameters to optimize the drilling of the borehole. This optimization allows the drilled borehole interval to be extended and for long borehole sections of various formations to be reliably drilled without changing out the drill string. These bits are extended gauge which reduces the flexing between the components and allows the bottom hole assembly components to act as one unit. An extended gauge bit or rotary steerable extended gauge bit may be used. The GEO-PILOT rotary steerable, point the bit, system 214 provides the most efficient means of reaching the target location if the well is extended reach, horizontal, or over 16,000 feet, for example. ADT applies wellbore integrity, hydraulics management, and drill string integrity to provide improved drilling efficiencies. See "Halliburton New Technologies and General Capabilities" (5 pages), hereby incorporated herein by reference.

Better borehole quality can be achieved by using a matched mud motor with a pin-down connection and extended-gauge PDC bit, i.e., SLICKBORE. This arrangement reduces the bit to bend distance by shortening the bearing section. Better borehole quality can also be achieved by directing the bit with a deflection of a shaft. See the discussion re rotary steerable assemblies. The extended gauge PDC bit keeps the bit from wobbling on the end of the drill string and limits hole spiraling. The extended gauge-bit direction is controlled by deflection of a shaft. Therefore, bit loading is axial, allowing efficient concentric cutting of the formation and leading to increased rate of penetration (ROP), increased bit life, and a regular hole geometry, which are critical factors in building a monodiameter well.

Reaching the desired location through the most efficient means is a desired attribute of the bottomhole assembly. Extending casing lengths requires the bottomhole assembly to drill longer and with more precision. Efficient concentric cutting of the formation, increased bit life, and a smooth hole geometry are qualities needed in a monodiameter borehole. The system is directed by comparing actual data to the requirements of the well plan through the real-time system that reads information from the lithology and inclination sensors at the bit. This method allows immediate changes in direction to be made to the steerable system rather than delayed corrections. Real-time information, along with the right directional tools, provides the most efficient way to get to the target location with the smoothest borehole.

Due to the narrow monodiameter wellbore and the various formations drilled, various tools may be used with the bottom hole assembly during drilling to detect the different formations through which the borehole will pass. For example, special MWD (Measurement While Drilling) and LWD (Logging While Drilling) equipment may be used to be run while drilling the well. This helps in monitoring fracture gradients, borehole stability issues, and stuck pipe issues. Formation conditions can change quickly and may not be expected. Other formation evaluation tools include, but are not limited to, pressure while drilling devices (PWD), such as those employed by Sperry Sun, to identify formation conditions, flow connection devices for detecting wellbore breathing, and bi-modal acoustic tool (BAT) employed by Sperry Sun, ahead of the bit and seismic tools. See U.S. Pat. Nos. 5,886,303; 5,899,958; 6,026,913; 6,102,152; 6,131,694; 6,151,554; 6,196,335; 6,478,107; and 6,400,646, all hereby incorporated herein by reference. It also includes LWD tools that help to collect data for doing geomechanical analyses at the bit and before the bit. The formation evaluation tools and the real time geomechanical analyses may indicate that a higher or lower weight mud system be used for a particular formation. The drilling mud, cement, chemical casing or expandable casing are then modified for the detected formations.

Borehole hydraulics are considered in the design of the bottomhole assembly. Potentially, the MONOWELL's upper borehole can be drilled with only one full trip because the drilling interval can be extended to the length of the well. Cutting beds can build up, causing possible trouble spots or a stuck bottomhole assembly. In-line turbulators (cuttings-bed impellers) 224 that disturb cuttings beds may be included in the drill string to help clean out the wellbore, particularly in the tangent sections (if drilling a directional hole). The cuttings bed impeller prevents build up and facilitates cuttings bed removal, reducing stuck pipe situations and drill string torque. The present embodiments are not limited to any particular well tools. For example, the well tools are not be limited to a MWD and LWD tool. Any MWD or LWD tools may be used.

Finally, reliability and run life of the bottomhole assembly can be extended by modeling and measuring vibration, pressure, and lithology from downhole, and reporting them to the surface. Adjustments can then be made at the surface to accommodate occurrences downhole. These adjustments can result in a longer run life for the bottomhole assembly.

In the traditional well, the wellbore may be open 3 to 5 days before stability of the borehole wall becomes a problem. After that portions may start to fall into the borehole. In the present invention, longer intervals are going to be drilled thus leaving the borehole open for longer than 3 to 5 days. Thus there is an extended time in which the borehole wall is unsupported by casing during drilling. Thus, the borehole wall must remain stable for a longer period of time than in conventional drilling. This longer time element is due to drilling longer intervals. To achieve this, the drilling fluid system must be working properly. The bit and directional tools must be matched and in alignment.

More open hole is left open and for longer periods than in conventional drilling thus allowing greater time for reactions between the drilling fluids, formation fluids and formation lithology to occur. One can not have aggressive, unstabilizing chemical reactions or mechanical reactions because these reactions are destructive. These reactions can occur along the shale layers and sand. Chemicals, such as chlorides and bromides, may be used to delay these reactions to reduce their destruction.

Borehole stability is a requirement of a monodiameter wellbore. If any portion of the borehole wall falls into the wellbore, it is difficult to achieve a monodiameter wellbore. This is prevented through the drilling fluid system. Borehole stability is achieved by the type of drilling fluid used, the geo-mechanics, the bit, the directional tool, all of these come into play. Chemical casing may also be used to achieve borehole stability rather than having to set a new casing string. Traditionally, some type of metal casing had to be set. However, setting additional metal casing causes the borehole to be reduced in diameter thus ultimately reducing the production flowbore diameter. This then reduces the reservoir production. Thus, expandables are preferred to reduce the loss of borehole diameter.

The monodiameter's fluid system must meet more and tighter parameters than average wells, including: borehole stability in a wide variation of formation lithologies and with increased time exposure and temperature variations due to increased lengths to be drilled across multiple formations; ability to drill with narrower bands of equivalent circulating densities and fracture gradient parameters; increased efficiency of borehole cleaning and hydraulics due to longer lengths and smaller diameters being drilled, along with reduced friction between the drill string and borehole through the use of a more lubricious drilling fluid; bottomhole assembly cooling for the longer intervals to be drilled; and environmental performance for the best overall well-construction efficiencies and regulatory compliance.

Borehole stability in a wide variety of formation lithologies with increased time exposure and temperature variation are addressed in the monodiameter method. Borehole stability is required to be able to drill in narrower bands of equivalent circulating densities with respect to fracture gradient parameters. Coals, shales, sand stringers, carbonates, reactive clays (gumbo), and more may be drilled from the surface to the reservoir barrier. The primary problems to be addressed when selecting a drilling fluid for the monodiameter well include bit balling, hole enlargement, reactive shale, and formation creep. Several of these problems result from mud pressure penetration. Invasion of mud filtrate and the resultant interaction with formation clays may result in borehole instability. Therefore, the mud system must produce a mud cake that can effectively control hydraulic pressure, chemical differences, and electrical differences, in a longer time-exposure environment than traditional drilling operations. Mud systems, such as oil-based and synthetic-based systems, can provide this mud cake. However, traditional water-based mud systems cannot control hydraulic pressure, chemical difference and electrical differences in shales for long periods of time. A specialty non-traditional water base mud system is required. Non-traditional water-based membrane mud systems can help prevent ion exchange between the water in the drilling fluid and shale. Ensuring the shale pore radius and drilling mud hydrated ions radius are equivalent and the chemical potentials of the drilling fluid and shale are the same, can help achieve these goals. Tests show pore pressure differentials and chemical differentials have greater membrane efficiencies and less osmotic exchanges. Understanding pore pressure changes from the membrane mud system developments address the potential wellbore instability problems related to longer time exposures. These issues must be addressed when drilling from surface casing to extended casing lengths (possibly to the reservoir barrier) for the monodiameter well.

Borehole cleaning and hydraulics are essential to drilling deviated wells with long, extended casing intervals. Smaller cuttings in a turbulent flow regime can allow the hole to be cleaned more easily in a smaller borehole (depending on effective annular spacing) vs. in larger-diameter casing intervals that provide lower annular velocities seen in traditional well-construction designs. Synthetic and water-based mud systems, along with a properly designed bit and bottomhole devices such as turbulators, provide efficient borehole cleanout depending on the formation requirements.

Borehole hydraulics are considered during well planning and during the drilling of the well. During initial monodiameter installations, the monodiameter well is not expected to be in an exploration area until more history is gained on the technology. Historical bit and fluid hydraulics information used with actual well surface (cuttings) information from previous wells can be valuable when planning the mud velocities required for the monodiameter well-construction program. The historical hydraulics are compared to the real-time well hydraulics formation and directional information so that the maximum length possible interval can be drilled with few difficulties.

Additionally, real-time information ahead of the bit and pressure at the bit can help the mud engineer manage the ECDs, including the fracture gradient because the engineer can apply the properly designed drilling fluid formulations. The real-time information is shared with the cementing engineer, who can then manage those zones effectively without major losses, or the zones can be handled through a chemical casing application, hereinafter described.

Friction between the borehole and drill string is minimized for the long monodiameter borehole. While synthetics and oil-based systems have a high degree of lubricity, water-based systems generally do not. In a water-based system, lubricant additives can help minimize friction and assist in keeping the bottomhole assembly clean, allowing more efficient weight at the bit by reducing torque and drag.

The capability of the bottomhole assembly to run greater casing lengths (i.e. the entire length from surface casing to the top of the reservoir) will require the drilling fluid (mud) system to assist in cooling the bit. If bit cooling is the only characteristic considered, a water-based mud system will not retain heat as much as a synthetic-based mud system or oil-based mud system. Water-based mud additives that enhance wall cake and filter loss may not be as stable as other synthetics or oil-based systems at higher temperatures. Temperature plays a role in the design of water-based additives for drilling longer casing intervals.

While the monodiameter well is being drilled, lost circulation can occur and fracture pressure can be exceeded. Real-time surface and formation monitoring can help determine if these problems are occurring. To maintain the monodiameter well design, minor lost circulation problems are resolved by incorporating lost circulation materials in the mud, or by using chemicals such as neat resins or resins incorporated in muds or lost circulation pills. If more serious lost circulation occurs, expandable casing can help seal the zone. Using the nested monodiameter expandable casing system allows for shorter or longer intervals than planned without a major impact on the monodiameter overall design or savings.

Environmental acceptance may not be considered a unique characteristic specific to the monodiameter fluid system. However, if the drilling fluid system best achieves the well construction, but the overall cost of cuttings handling, cleaning, and transport is too high, then the primary purpose of the monodiameter well, to reduce well construction costs, is not fulfilled. The overall cost and benefits of the drilling fluid system must be compared from a holistic standpoint—before, during, and after drilling. A water-based mud system results in fewer oily cuttings, less transportation, and less overall environmental impact.

Drilling fluid systems that meet the monodiameter design requirements include diesel, synthetic and water based systems or a blend of these. Synthetic systems include vegetable ester, internal olefin based systems, minerals, or a blend of any of the above. Example synthetics include linear alpha olefins, internal olefins, paraffins, vegetable esters and the like. Water base systems include muds containing polymeric viscosifiers, commercial clays, silicates, membrane efficient, or brine based systems. Examples include sodium chloride, potassium chloride, bromides or formates. However, individual formations, regions, well objectives, and environments are considered when choosing the optimum drilling fluid system for the individual monodiameter well.

Since the monodiameter wellbore has basically one diameter from the surface to the reservoir barrier but may continue on to the bottom of the wellbore across the producing reservoir zone, the drilling fluids are preferably "matched" to the formations that are being drilled. If the formations are a water-sensitive clay or shale, the formation can slough into the wellbore if a water base fluid has been used that is not an inhibitive mud system or a oil base or synthetic base system has been used. This situation causes large erosional sections to occur in some formations if the drilling fluids do not meet the formation borehole stability requirements.

Figure 7:
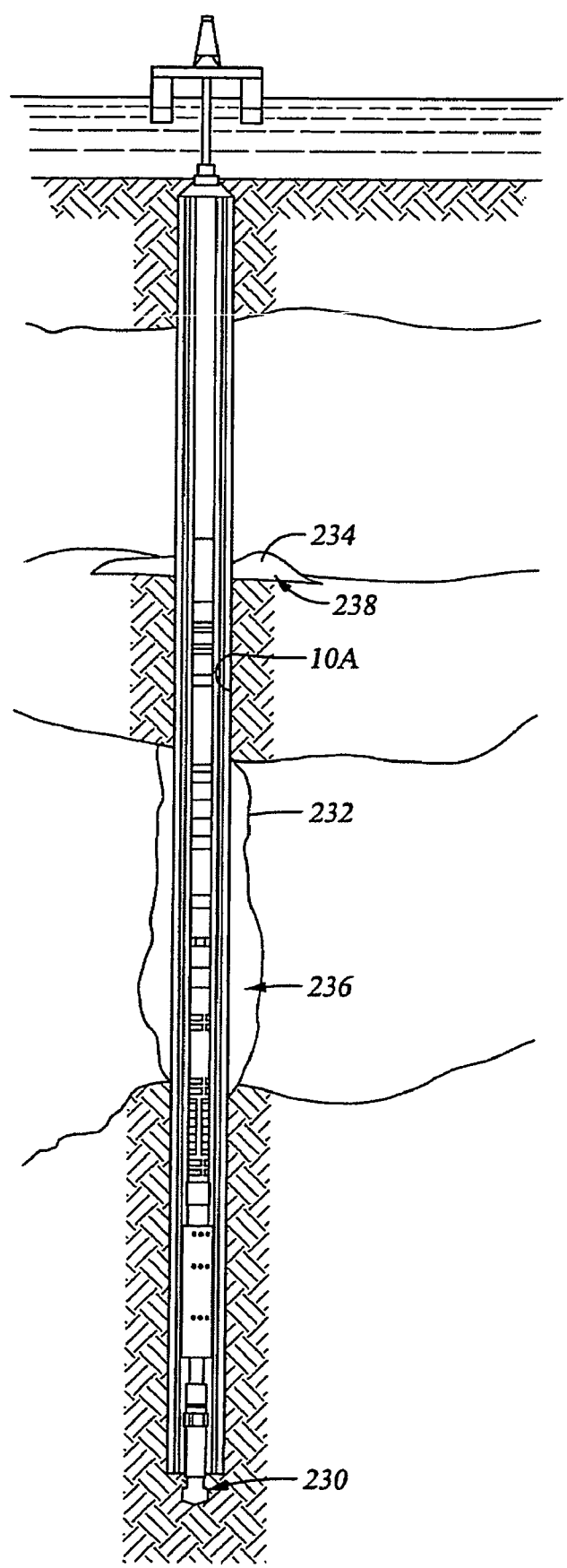
FIG. 7 is a schematic of a MONOWELL illustrating chemical solutions for the wellbore.

Referring now to FIG. 7, the system includes drilling fluids, such as water or synthetics, using a membrane efficient mud system 230 which allows the drilling of a consistent tight borehole, i.e., a generally cylindrical borehole not given to borehole failures. The mud system produces a mud cake that can effectively control hydraulic pressure, chemical differences, and electrical differences, in a longer time-exposure environment than traditional drilling operations. Drilling fluid systems, such as oil-based and synthetic-based systems, can provide this mud cake. However, traditional water damage based mud system can not provide these requirements in shales for long periods of time. New water-based membrane drilling fluid systems can help prevent ion exchange between the water and the drilling fluid and shale depending on the drilling time and on the drilling fluid and completion utilized.

The ability to drill with a narrow band of equivalent circulating density and fracture gradient is required to be able to deliver a smooth borehole for the monodiameter casing to be installed. Other desirable characteristics include resistance to contamination, ability to reduce high pressure—high temperature (HPHT) fluid loss and increased rhelogy. A vegetable ester and internal olefin based synthetic drilling fluid system, such as ACCOLADE, can provide these characteristics. ACCOLADE is described in U.S. patent application Ser. No. 09/929,465 filed Aug. 14, 2001, Publication No. US 2003/0036484, hereby incorporated herein by reference, and International Patent Application Nos. PCT/US00/35609, Publication No. WO 02/053675, and PCT/US00/35610 Publication No. WO 02/053676, both filed Dec. 29, 2000 entitled Method of Formulating and Using a Drilling Mud with Fragile Gels. PCT/US00/35609 was published as Publication No. WO 02/053675 and PCT/US00/35610 was published as Publication No. WO 02/053676.

Depending on the formation, oil, synthetic, or water base fluids may be utilized for drilling the monodiameter wellbore. Some of these fluid types include ACCOLADE—a vegetable ester and internal olefin based fluid system; BAR-OMEGA—a membrane efficient water base fluid system; HYDRO-GUARD—an inhibitive water-based fluid; calcium chloride base systems that have internal breakers N-FLOW, PETROFREE LV, an ester based drilling fluid; BRINEDRIL N, a calcium chloride based system; aldehyde based drilling fluids; drilling fluids containing calcium chloride or potassium chloride; or formate mud systems. All of the drilling fluids referred to are Halliburton drilling fluids. ACCOLADE, BAR-OMEGA, HYDRO-GUARD, BRINEDRIL N, and N-FLOW are products of Baroid. All of these drilling fluids interact with the formations to make a consistent tight borehole that does not have large erosional zones throughout the formation's sections. The mentioned drilling fluids minimize those erosional zones to provide a consistent tight borehole around the drill string. This type borehole minimizes the large washouts and permits better cementing of the casing which allows for better stability. BAR-OMEGA is described in International Patent Application No. PCT/US00/35686 filed Dec. 30, 2000, Publication No. WO 02/053873, entitled Novel Compounds and Associated Mechanisms for Generating a Highly Efficient Membrane in Water-Based Drilling Fluids. HYDRO-GUARD is described in "Halliburton New Technologies and General Capabilities" (5 pages).

PETROFREE, PETROFREE LV and other drilling fluids are described in U.S. Pat. Nos. 6,422,325 and 6,290,001; U.S. patent application Ser. No. 09/887,138 filed Jun. 22, 2001 and entitled Methods of Using Reversible Phase Oil Based Drilling Fluid, now U.S. Pat. No. 6,806,233; U.S. patent application Ser. No. 09/929,465 filed Aug. 14, 2001 and entitled Blends of Esters with Isomerized Olefins and Other Hydrocarbons as Base Oils for Invert Emulsion Oil Muds, Publication No. US2003/0036484; U.S. patent application Ser. No. 09/939,990 filed Aug. 27, 2001 and entitled Electrically Conductive Oil-Based Mud, now U.S. Pat. No. 6,691,805; U.S. patent application Ser. No. 09/999,799 filed Aug. 31, 2001 and entitled Additive for Oil-Based Mud, now U.S. Pat. No. 6,620,770; U.S. patent application Ser. No. 10/151,260 filed May 20, 2002 and entitled Methods and Composition for Delaying the Crosslinking of Crosslinkable Polysaccharide-Based Lost Circulation Materials now U.S. Pat. No. 6,932,428; U.S. patent application Ser. No. 10/175,272 filed Jun. 19, 2002 and entitled Method of Formulating and Using a Drilling Mud with Fragile Gels, Publication No. US2005/0146179; all hereby incorporated herein by reference.

For additional information on other drilling fluids see U.S. Pat. No. 5,925,598 entitled Water-Based Drilling Fluid for Use In Shale Formations; U.S. Pat. No. 5,869,434 entitled Free-Flowing Borehole Servicing Preparations Containing Linear a-Olefins, More Particularly Corresponding Drilling Fluids; U.S. Pat. Re. 36,066 entitled Use of Selected Ester Oils In Drilling Fluids and Muds; U.S. Pat. No. 5,555,937 entitled Method and Combination of Materials for Releasing a Stuck Pipe; U.S. Pat. No. 5,252,554 entitled Drilling Fluids and Muds Containing Selected Ester Oils; U.S. Pat. No. 5,252,554 entitled Drilling Fluids and Muds Containing Selected Ester Oils; U.S. Pat. No. 5,232,910 entitled Use of Selected Ester Oils in Drilling Fluids and Muds; U.S. Pat. No. 4,758,357 entitled Dispersible Hydrophilic Polymer Compositions for Use In Viscosifying Heavy Brines, all hereby incorporated herein by reference.

Specialized sweeps may be run in conjunction with the drilling fluids to provide both additional hole cleaning and lost circulation mitigation. These sweeps can be formulated containing a variety of materials, such as Sweep-Wate manufactured by Halliburton. See U.S. Pat. No. 6,290,001, hereby incorporated herein by reference, and "Halliburton New Technologies and General Capabilities" (5 pages). A sweep is performed after or during the drilling phase. A sweep is used to clean up the borehole due to an accumulation of cuttings which require that the borehole be cleaned during the drilling operation. The sweep is particularly necessary during extended reach wells which are wells that are more horizontal thereby causing the cuttings to tend to collect.

Various techniques are used to incorporate chemical materials in the borehole to reduce the number of casing strings, which is one of the primary goals of the MONOWELL, and to provide a diametric efficient borehole wall. During the drilling of a monodiameter borehole, chemicals may be employed when encountering low mechanical-strength formations, unconsolidated weak zones, or abnormal geopressure profiles that will allow extending the casing length.

Referring again to FIG. 7, problems may arise during the drilling of various formations. There are shown wash out areas 232, 234 in the borehole which substantially reduce diametric efficiency. If large wash outs do occur during the drilling, it may be necessary to fill in the borehole wash out areas prior to casing the borehole. Cuttings, salts, shales, excessive mud cake buildup, and washouts can result in a non-quality, non-smooth (high tortuosity) borehole. These problematic situations conventionally require a casing string to seal the formation. In a conventional drilling process, drilling is stopped while the casing string or liner is set, an expensive procedure that consumes rig time and expensive materials. Additionally, the wellbore diameter is reduced with the installation of each traditional mechanical casing string. In the MONOWELL, the interval length to be drilled is extended. An expanded casing is applied over the problem area and the serious size reduction does not occur.

Wash outs and voids can be remedied using various chemical solutions that can be applied to the borehole which allow extending the monodiameter casing length. Such solutions include settable spotting materials or adhesives when the wellbore might be giving way to stresses. Settable spotting materials are materials that are pressed into the formation that then set up. The materials and adhesives will act to stabilize the wellbore and obtain a smooth borehole so that permanent casing or expandable casing can be run in the monodiameter wellbore. Chemicals can be utilized during drilling to strengthen formation areas. The chemicals penetrate into the formation and yield a compressive strength to strengthen the area so as to support setting metallic or nonmetallic (composite) casing strings. A settable spot material, such as chemical casing thixotropic material, FLO-STOP, CHANNEL SEAL or a resin may be spotted in the washed out areas or other voids.

A tough chemical casing material 236 is one solution that may be employed in these situations. Chemical casing may be used to address weak formations that may not allow casings to be set or have integrity. The chemical casing can increase the mechanical pressure integrity and consolidate and isolate zones to prevent fluid migration. One form of chemical casing is used in strengthening the formation. The chemical casing may also be used to strengthen a weakened casing by building a chemical casing behind an existing mechanical casing.

There are several chemical casing delivery systems. One delivery system is a spotting system where the borehole is filled with chemical casing, allowed to solidify, and then a borehole is drilled through it. A preferred delivery system includes putting a catalyst in the drilling fluids and then later circulating a set up material to cause the chemical casing to set up. The set up material and the catalyst reacts to cause the chemical casing to solidify. Another delivery system includes mixing the chemical casing with the drilling mud.

Still another delivery system is using the chemical casing itself as the drilling mud. See U.S. patent application Ser. No. 10/170,400 filed Jun. 13, 2002 and entitled Methods of Consolidating Formations or Forming Chemical Casing or Both While Drilling, now U.S. Pat. No. 6,702,044, hereby incorporated herein by reference. Adhesives may also be included in the drilling fluids.

In spotting the chemical casing across the problem formation, the bottomhole assembly is either removed from the borehole or raised to a depth above that section of the borehole wall to be chemically cased. The drill string may or may not be removed. In one embodiment, the drill string may be left in the borehole and be expanded to serve as a casing. A catalytic base material and set-up material are mixed and the mixture is pumped down the upper bore hole 10A and caused to permeate the formation around borehole wall. The mixture is then left in the borehole 10A for a specific period of time. For the chemical casing to set up as a solid, it is necessary to wait a substantial period of time for the chemical casing to completely solidify. Catalyst activators can be added to the mixture to speed up the solidification of the chemical casing. After waiting a few hours, the residue chemical casing is drilled out, such as with a drilling mud, leaving the remainder of the mixture permeating into the borehole wall and leaving a chemical casing face on the bore hole wall to form the chemical casing. Thus, the process includes drilling through one of multiple formations, chemically casing that formation, and then continuing the drilling of the borehole.

Alternatively the chemical casing solution can be applied in a two-phase process. First, drilling fluid acts as a carrier for a catalyst capable of chemically adsorbing onto the weak or unconsolidated formations and forms a filter cake. Then, a water-soluble or dispersible resin-type material, with or without filter-cake forming solids, is circulated across the treated formations. The previously adsorbed catalyst cures the resin to strengthen or consolidate the formations, and forms a cured chemical casing or seal.

Since the monodiameter wellbore has basically one diameter from the surface to the reservoir barrier, but may continue on to the bottom of the wellbore across the producing reservoir zone, the chemical casing is preferably "matched" to the formations that are being drilled.

A first preferred method utilizes a single chemical casing fluid for drilling the well bore and simultaneously consolidating weak zones or formations at locations where it is known that unconsolidated weak zones and formations will be encountered. A second preferred method utilizes both a drilling fluid and a treating fluid in drilling applications where it is unknown if unconsolidated weak zones or formations will be encountered. In the another method, if unconsolidated weak zones or formations are not encountered, the treating fluid step is not required and the time and expense required for performing the treating fluid step will be saved.

The first preferred method for consolidating unconsolidated weak zones comprises drilling the well bore with a drilling fluid having a pH in the range of from about 6 to about 10, preferably about 8. The drilling fluid is comprised of water, a polymeric cationic catalyst capable of accepting and donating protons which is adsorbed on the unconsolidated formation, a water soluble or dispersible polymer which is cross-linkable by a thermoset resin and causes the resin to be hard and tough when cured, and a water soluble or dispersible thermoset resin which cross-links the polymer, is catalyzed and cured by the catalyst and consolidates the weak zones or formations.

The water utilized to form the drilling fluid can be fresh water, unsaturated salt solutions or saturated salt solutions, including brine and seawater. Generally, water from any source can be utilized so long as it does not adversely react with components of the drilling fluid.

Examples of polymeric cationic catalysts capable of accepting and donating protons which are adsorbed on the formation include, but are not limited to, polyethyleneimine, poly(dimethylaminoethylmethacrylate) and poly(dimethylaminopropylmethacrylate). Of these, polyethyleneimine is preferred. The polymeric cationic catalyst is generally included in the drilling fluid in an amount in the range of from about 1% to about 15% by weight of water in the drilling fluid, more preferably in an amount in the range of from about 2% to about 10% by weight of the water and most preferably in an amount of about 6%.

The water soluble or dispersible polymers which are cross-linked by the thermoset resins utilized in accordance with this invention are polymers containing one or more of hydroxyl, amide, carboxyl and epoxy functional groups. Examples of such polymers include, but are not limited to, acrylic latexes, polyvinylalcohol, polyvinylbutyral, polyesters, polyalkylacrylic acids, polyurethanes, acrylamide polymers, proteins, polyols and polysaccharides such as chitosan, hydroxyethylcellulose, carboxymethylhydroxyethylcellulose, water soluble starches, guar gum, xanthan gum, welan gum, carragenan gum and arabic gum. Of these, polysaccharides are preferred. The water soluble or dispersible polymer which is cross-linked by thermoset resins is generally included in the drilling fluid in an amount in the range of from about 0.5% to about 20% by weight of water in the drilling fluid, more preferably in an amount in the range of from about 1% to about 10% by weight of the water and most preferably in an amount of about 3%.

The water soluble or dispersible thermoset resins (including particulate solid thermoset resins having a particle size in the range of from about 50 to about 1000) utilized in accordance with this invention are selected from melamine-formaldehyde type resins, i.e., amino resins made from melamine and formaldehyde, urea-formaldehyde type resins, i.e., amino resins made from urea and formaldehyde and phenol-formaldehyde type resins, i.e., synthetic thermoset resins made from phenol and formaldehyde. More preferably, the thermoset resins utilized are selected from alkyl ethers of melamine-formaldehyde resins and alkyl ethers of urea-formaldehyde resins. Of these, alkyl ethers of melamine-formaldehyde resins are preferred. An alkyl ether of melamine-formaldehyde resin which is particularly suitable is commercially available under the tradename "ASTRO MEL CR1™" from Borden Chemical of Springfield, Oreg., USA. The water soluble or dispersible thermoset resin utilized in the above described method is generally present in the drilling fluid in an amount in the range of from about 5% to about 80% by weight of water in the drilling fluid, more preferably in an amount in the range of from about 20% to about 70% by weight of water and most preferably in an amount of about 50%.

The thermoset resins described above, when catalyzed by heat, catalysts or other means, form substantially infusible or insoluble materials which do not soften on reheating. When cross-linked and cured, the thermoset polymers are strong, hard and tough.

As will be understood by those skilled in the art, the drilling fluids can include other conventional components such as weighting materials, viscosifiers, dispersants and fluid loss control agents.

The second preferred method for consolidating unconsolidated weak zones or formations is comprised of the following steps. The well bore is drilled with a drilling fluid having a pH in the range of from about 6 to about 10, preferably 8, and is comprised of water and a polymeric cationic catalyst capable of accepting and donating protons which is adsorbed on the formation. Thereafter, the well bore is contacted with a treating fluid having a pH in the range of from about 6 to about 10, preferably 8, and comprised of water, a water soluble or dispersible polymer which is cross-linkable by a thermoset resin and causes the resin to be hard and tough when cured and a water soluble or dispersible thermoset resin which cross-links the polymer, is catalyzed and cured by the catalyst and consolidates the weak zones or formations so that sloughing is prevented.

The components of the drilling fluid and treating fluid of the above described method, i.e., the water, the polymeric cationic catalyst, the water soluble or dispersible polymer which is cross-linkable by a thermoset resin and the water soluble or dispersible thermoset resin are the same as those previously described.

The polymeric cationic catalyst is present in the drilling fluid in a general amount in the range of from about 1% to about 15% by weight of water in the drilling fluid, more preferably in an amount in the range of from about 2% to about 10% by weight of the water and most preferably in an amount of about 6%.

The water soluble or dispersible polymer which is cross-linked by a thermoset resin is present in the treating fluid in a general amount in the range of from about 0.5% to about 20% by weight of water in the treating fluid, more preferably in an amount in the range of from about 1% to about 10% of the water and most preferably in an amount of about 3%. The water soluble or dispersible thermoset resin is present in the treating fluid in a general amount in the range of from about 5% to about 80% by weight of the water and most preferably in an amount of about 50%.

The drilling fluid as well as the treating fluid can also include other additives which are well known to those skilled in the art such as weighting materials, viscosifiers, dispersants and fluid loss control agents.

The drill ahead process using drill ahead material 238 is another method that employs field-proven chemical techniques to reach the producing objective and eliminates the need for setting a casing string or liner. This process is performed when the drilling pressure window narrows between hole-collapse pressure, pore pressure, and fracture-pressure profiles. The process incorporates a series of pump-in and shut-in stages with a chemical treatment that enters the vugs, natural fractures, or permeability of the formation. This series of pump-in and shut-in stages is commonly referred to as leakoff tests (LOT). The treatments may be designed to consolidate weak zones, install protective barriers in water sensitive formations, isolate high pore pressures, increase wellbore pressure containment, or any combination of these factors. Isolating high pore pressure provides kick control when using lower drilling mud weights. Alternatively, increasing wellbore pressure containment may allow the operator to mud up and reach the objective producing zone without setting a liner or casing string. The drill ahead process may also be used to correct a weak cement shoe or a weak place in the casing and strengthen the formation around the weakness.

If the formation has shallow water flows and does not allow the formation to be open long enough for an interval to be drilled completely prior to the borehole collapsing, then other types of settable stop materials may be used such as FLO-STOP, FOAWMED SLAG, FLO-STOP 1 and FLO-STOP 5000 described in U.S. Pat. Nos. 5,588,489; 5,571,318; and 6,273,191, all hereby incorporated herein by reference.

CHANNEL SEAL is a settable spottable material and is a specialized type of cement. However, CHANNEL SEAL is not used as cement. CHANNEL SEAL is used to spot and consolidate the borehole wall. The CHANNEL SEAL is used to fill out the wash outs or voids for stabilizing the borehole prior to installing regular expandable casing. CHANNEL SEAL is a Halliburton product. CHANNEL SEAL can be used with expandable casing or regular casing or in other situations where stabilization needs to occur around the borehole for containment. It is preferred that CHANNEL SEAL not be used with chemical casing. CHANNEL SEAL is described in U.S. Pat. Nos. 6,138,759 and 6,315,042, both hereby incorporated herein by reference.

Other mechanical borehole supports may also be used in the nested expandables as well as in the chemical solution cases to reduce the number of casing strings. Traditional casing that is used as a second barrier to the chemical or expandable tubulars may be employed. See FIG. 17. Also, coiled tubing or continuous composite pipe may be used as a primary or secondary barrier. Coiled tubing or continuous composite tubing has fewer potential connection leaks and may be deployed by faster means. If real-time pore pressure and fracture gradient management can be achieved, longer casing intervals can result. Traditional casing can be used, but additional stress loadings are considered in the design based on the longer lengths, temperature variations, and pressure variations.

It should be appreciated that several casing types may be used with the present invention to provide mechanical support in the borehole. Various embodiments have described which include the use of conventional casing, chemical casing, and expandable casing. Traditional conventional well architecture utilizes hardened non-deformable ferrous alloy casing of a specific strength and grade for the individual formation sections. Preferably the present invention uses chemical casing and/or expandable casing. However, various casing methods may be utilized in a monodiameter wellbore. Casing materials may include steels and/or other metals, composites, plastics, chemicals, ferrous and non-ferrous materials or any other material having the characteristics required to form a casing wall. Casing materials may be coated with elastics, plastics, or teflon over metallics for corrosive purposes. The casing materials can be products of nanotechnology processes as well. The methods can also be combined or separated and be temporary or permanent.

Expandable casing may be used to address borehole stability issues. Expandable casing is used in the original permanent wellbore construction as permanent casing. It may also be utilized to case off a collapsed wellbore, or to help maintain the final wellbore penetration diameter when an additional casing might be required. For example, during the well construction process, the earth might collapse or casing wear may occur leaving a hole in the original permanent constructed barrier. A new barrier will be required. Expandable casing will allow the final diameter of the reservoir penetration to be maintained. If conventional casing is utilized, it is unlikely the final penetration diameter can be maintained across the reservoir.

Casing methods also include mechanical casing while drilling which may or may not include the expansion of casing during or after drilling. Further, composite tubulars may be used as the casing, which may or may not be expanded during the well construction process. Composite tubulars are made by Fiber-Spar and Wellstream, but may be made by others. Thus, composite tubulars may be expanded across a formation. Still further, the borehole wall may be cased by fusion, such as lasers, during or after drilling. Still another method includes drilling with casing that includes the use of drill string as casing, which may or may not be expanded during the construction process. A further method includes the use of extrusion materials where the wellbore may be lined with extruded material during the well construction process. The extruded material may remain permanently in the wellbore. Another method includes the use of telescoping lining materials resulting in a tapered wellbore. The tapered wellbore, however, still maintains the nominal limits of a monodiameter wellbore. Telescoping liners are a series of liners each with a slightly smaller inner diameter. Expandable liner hangers may be used to help with the telescoping.

It should also be appreciated that the casing may be installed in one of several ways. For example, the casing may be run utilizing a drilling rig. It may also be installed using detachable conductor pipe in a ratchetable configuration. The casing may also be installed by drill and case methods employed by Sperry and Halliburton. Also, casing may be driven down into the formation or may be washed down. The casing may also be deployed utilizing a propulsion system. See U.S. Pat. No. 6,003,606 and U.S. patent application Ser. No. 10/265,786 filed Oct. 7, 2002 entitled Well System now U.S. Pat. No. 6,923,273, both hereby incorporated herein by reference. Casing can be installed using coiled tubing, a workover unit, a hydraulic workover, for example. Casing may be installed by using a suction embodiment device, which may include a detachable conductor pipe in a ratchetable configuration. See U.S. patent application Ser. No. 10/193,609 filed Jul. 11, 2002 and entitled Retrievable Suction Embedment Chamber Assembly, now U.S. Pat. No. 6,659,182, hereby incorporated herein by reference.

Other equipment used with the present invention includes a wellhead to support and hang off subsea/surface tubulars, provide structural support, support casing, and support tubing. Due to the small diameter annulus and the reduced number of annuli by the longer length drilled well section, the casing hangoffs and tubing hanger may be expanded or specially machined. The wellhead also may be reduced in size reducing the required rig load capacity. Traditional wellhead equipment might be utilized as well. An expandable tubing hanger may be used but is not necessarily preferred.

Expandable casing may be installed within the wellbore by cladding and may not necessarily be cemented in place. If the expandable casing has a constant diameter outer borehole, it will still constitute a monodiameter wellbore.

The narrow annuli for expandable casing/liners require that other sealing compositions or isolation materials be used. Such compositions and materials must be ductile in order to form an appropriate seal. It is preferred that conventional cement is not used with expandable casing as micro annuli can develop, allowing for gas migration and poor isolation. Oil field cement will be particularly brittle and weak in such thin sheaths and is hence an inappropriate sealing medium. The formulation for the expandable casing cement is different from regular cement.

Cementing of the casing may be achieved by various methods including the use of sealants, settable spot technology, conventional primary cementing, resins, foam cement, latex, and mud to cement formulations. These materials may be dispensed through the drill bit, an activated sub, an applicator, or a brush system.

Several considerations are made when cementing the longer upper interval(s) in the MONOWELL, including: What will the well (and cement barrier) have to endure during its lifetime? What effect will the increased length and temperature variations have on cementing stress loading and integrity? What cement chemical formulations characteristics are required? What execution practices may be applied that reduce flat time? The specific goal for the MONOWELL is to reduce lifetime cost per equivalent unit of oil or gas by increasing efficiencies. To achieve this goal, the entire well construction and long-term production/injection is considered.

Longer casing and cementing intervals have to endure temperature and pressure variations, including shrinkage and expansion, as well as bonding to varied formations and different mechanical and chemical structural supports. Cements with a high Young's Modulus are more susceptible to damage from pressure and temperature changes. The Young's Modulus may also be important in cases where sealants may be applied. Foamed cements have good elastic behavior. Mechanical responses have been modeled, including bonding, cracking, plastic deformations, shrinkage and expansion. A finite elemental analysis and design procedure are performed in the MONOWELL cementing program to estimate risk of cement failure as a function of formation properties, cement sheath, and well stress loading, but various formations, temperatures, pressures, loadings, mechanical/chemical bondings, and well functions must be accounted for in the finite elemental analyses. This approach best helps operators determine optimum MONOWELL cement formulation that transverses across multi-formations and longer lengths.

Due to the consistent wellbore for the monodiameter architecture, several factors are considered in the cementing analyses: the cementing will be conducted in smaller annuli spacing; the cementing will experience more rapid thermal cycling; and the cement composition will have to be geared more to a "life of the well approach" in a more severe exposed condition. All of these factors have to be taken into account during the engineering and design process.

Cement slurry density is often greater than the density of the drilling fluids (mud) used to drill the interval. Longer casing string intervals can further increase ECDs during cementing because of increased hydrostatic column height. In many cases, the performance properties required for a specific application can be achieved with lightweight slurries. High compressive strength, often achieved with higher-density slurries, may not always be the primary consideration.

The type of structural mechanical support will be relevant when cement formulations are selected. In the expandable tubular case, cementing will have to endure compression forces and not be so hardened that induced long-term cracking occurs. Therefore, cement slurries should be designed to match the formation and mechanical support in achieving a desired Young's Modulus and bond.

In either case, bonding at the varying formations to the cement interface, and cement to mechanical (or chemical) structural support interfaces, must be considered. Whether a single base cement with varying additives can be formulated to handle the various formations are determined for the specific well and location.

Further, it is preferred that the drilling fluid is an easy-to-displace type fluid for displacement to occur through the narrower annulus. This will permit wellbore displacement from drilling fluids to cement fluids to occur. In an unconsolidated formation, areas of the drilled borehole may expand to a diameter of 18 to 36 inches, as for example. It is preferred that the borehole for the present invention not have a diameter greater than about 12 to 13 inches for 10-¾ inch casing. Thus the drilling fluid needs to be easy to move through the annulus but still maintain the properties of being able to maintain well control, keep borehole stability, for example.

Also, a drilling fluid that generates a thin filter cake is required. If a thick filter cake is developed, it will slough off resulting in large erosional holes that are difficult or impossible to cement uniformly. Because it is difficult to move fluid through the annulus, the most movable or flowable drilling fluid is preferred so that it will pass and flow through all of the annular areas and gaps around the drill string. Displacement from drilling fluids to cement will require a "clean" differential phase between the two fluids to get a smooth clean displacement. While displacement normally occurs going down the drill string and back up the annulus in a typical well, displacement for the monodiameter well can occur traditionally or by the reverse circulation method, i.e., down the annulus and returns back up the drill string, particularly where there are excessively long intervals to cement.

Cementing execution for the longer cementing interval preferably starts with a chemical spacer that has been designed specifically to efficiently clean the hole of the specialized drilling fluid and displace the borehole for the new cement. Incorrect displacement or incompatibilities of the drilling fluid and cement can result in a costly, poor cement job.

The spacers provide a barrier between the drilling fluids and the cement so that the cement does not contaminate the drilling fluid. While flowing drilling fluid, channels or stringers of the drilling fluid and cement can mix together due to turbulent flows. Stringers between the drilling fluid and cement will result in the cement having poor compressive strength or poor integrity. To avoid this mixing, a spacer is run between the drilling fluid and the cement serving as a barrier between the two fluids. The spacer is a differentiating fluid, which, as it is pumped through the annulus, pushes the drilling fluids, pushes the spacer and displaces with the cement or sealant composition or material. This ensures that the cement is clean as it passes up or down the annulus.

The drilling fluid is then circulated out of the annulus followed by the cement. Some cement can be a foam that is light. It may be lighter than the drilling fluid. Thus the drilling fluid will tend to remain in the annulus since it is a heavier fluid then the foam cement. A spacer is preferably used to separate the drilling fluids from the foam cement.

Reverse circulating the cement slurry (reverse circulation) is an alternative method for placing cement in the MONOWELL. This technique is employed when (1) ECDs need to be reduced to prevent formation breakdown or (2) long intervals of casing require cement with significant temperature differences from bottom to top of cement. Reverse circulating displacement mechanics of velocity and slurry rheology are maximized due to the hydraulics from the hydrostatic pressure of the cement slurry. The reverse circulating cement does not subject the entire slurry system to bottomhole circulating temperatures. Therefore, this technique maximizes the ability to place cement slurries designed for the specific formation's mechanical characteristics and temperature profiles.

The monodiameter well architecture presents specific challenges to cementing a wellbore. There will be longer cementing sections since there may be as much as two or three formation sections in the wellbore. The annulus between the casing and borehole wall will be narrow for pumping the cement between the casing and the wellbore resulting in sometimes slower pump rates and limited pressures. High pump rates can result in high equivalent circulating density (ECD) that overpressurizes the fracture gradient when pumping the cement into the formation. Slow pump rates may be required due to the narrow annulus. A slow pump rate requires special retarders so the cement will not set up or become hard while it is being pumped. The retarders must allow the cement to be pumped but also must allow for the cement's compressive strength to develop after the cement has arrived at its permanent location in the annulus. Further, the standoff from the wellbore and centralization may or may not be possible due to the annulus spacing. Conventional cement relies upon hydraulics to flow the cement through the annulus. The sealing composition of the present invention is a fluid which flows to any gaps between the expandable casing and borehole wall. A spottable material such as CHANNEL SEAL is used prior to cementing to close any wash-outs in the borehole wall.

Extended reach and horizontal wells may require the casing to be floated in using a buoyancy system. One might consider the BACE system (a balanced buoyancy system), U.S. patent application Ser. No. 09/655,623 filed Aug. 31, 2000 and entitled Methods and Apparatus for Creating a Downhole Buoyant Casing Chamber, now U.S. Pat. No. 6,505,685, hereby incorporated herein by reference. A float and buoyancy system may be utilized and may be made of a composite material.

In using expandable casing, compressing the metallic casing across the cement can create the problem of microfracturing the cement and incomplete cement integrity in some cases if the cement formulation does not allow for delayed setting, resistance, and elasticity. Sealants may be utilized in some cases. The cement formulations must thus be specific for expandable casing operations including the narrower annulus that will be in a monodiameter well.

Figure 8:
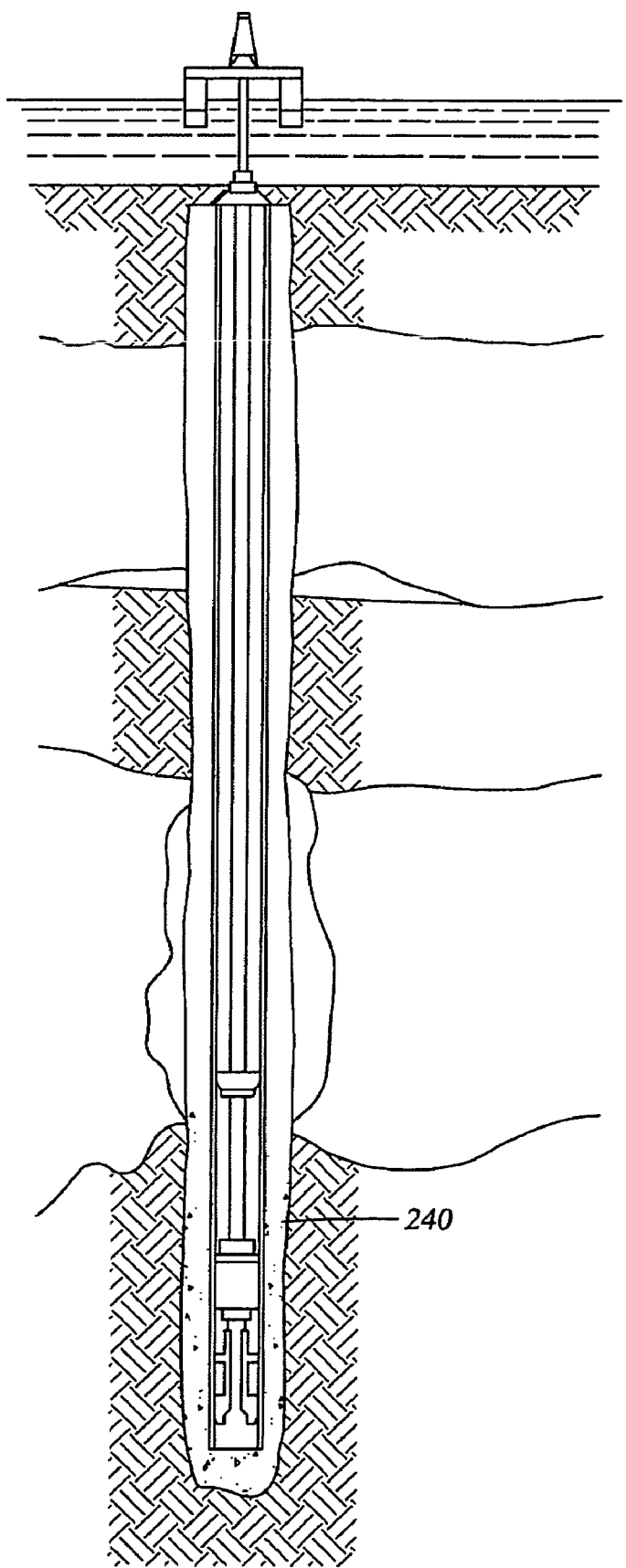
FIG. 8 is a schematic of lengths of casing being extended through the chemical solutions shown in FIG. 7.

Referring now to FIG. 8, one preferred sealing composition 240 for expandable casing/liners is described in U.S. patent application Ser. No. 10/006,109 filed Dec. 4, 2001 entitled Resilient Cement, now U.S. Pat. No. 6,668,928; U.S. patent application Ser. No. 10/243,001 filed Sep. 13, 2002 entitled Methods and Compositions for Sealing An Expandable Tubular in A Well Bore now U.S. Pat. No. 7,050,404; both hereby incorporated herein by reference. The sealing composition comprises a mixture of latex, dithio carbamate, zinc oxide, and sulfur, for sealing a subterranean zone penetrated by a well bore. The sulfur containing component vulcanizes the latex to form a solid. The latex preferably includes a styrene/butadiene copolymer latex emulsion prepared by emulsion polymerization. The ratio of styrene to butadiene in the latex can range from 10:90 to 90:10. The emulsion is a colloidal dispersion of the copolymer. The colloidal dispersion includes water from about 40-70% by weight of the emulsion. In addition to the dispersed copolymer, the latex often includes small quantities of an emulsifier, polymerization catalysts, chain modifying agents and the like. Also, styrene/butadiene latexes are often commercially produced as ter-polymer latexes which include up to about 3% by weight of a third monomer to assist in stabilizing the latex emulsions. The latex may be of any variety of well known rubber materials commercially available which contain unsaturation in the backbone of the polymer. Non-ionic groups which exhibit stearic effects and which contain long ethoxylate or hydrocarbon tails can also be present. The sealing composition may further comprise stearic acid. The weighting agent may be silica flour or alternatively manganese oxide weighting additive or still further alternatively crystalline silica. The sealing composition may further comprise acetylenic alcohol for defoaming.

In another embodiment disclosed in U.S. patent application Ser. No. 10/006,109, now U.S. Pat. No. 6,668,928, the sealing composition includes a mixture of latex, dithio carbamate, zinc oxide, sulfur, and a foaming agent, wherein the mixture is foamed. Further, the composition may comprise a weighting agent. The sealing composition is compressible in its set state when placed against a porous geological formation, and the alternative embodiment of the sealing composition is compressible in both set and unset states when placed in a sealed system.

In another embodiment disclosed in U.S. patent application Ser. No. 10/243,001, a sealing composition according to the present embodiment basically comprises a polymer and metal containing compound. A particularly preferred sealing composition comprises a mixture of latex, dithio carbamate, zinc oxide, and sulfur, for sealing a subterranean zone penetrated by a wellbore. The sulfur containing component vulcanizes the latex to form a solid mass which seals the zone. Preferred polymeric sealing compositions of the present invention are resilient with comparable strength to cement but have greater elasticity and compressibility for use in cementing expandable casing.

As will be understood by those skilled in the art, polymeric sealing compositions of the present invention may include any of a variety of well known polymers including, but not limited to, copolymers, terpolymers and interpolymers. Latex is preferably used for either embodiment and may be any of a variety of well known rubber materials commercially available which contain unsaturation in the backbone of the polymer. These include natural rubber (c is 1,4-polyisoprene), modified types thereof, synthetic polymers, and blends of the foregoing. The synthetic polymers include styrene/butadiene rubber, polybutadiene rubber, neoprene rubber, acrylonitrilelbutadiene rubber, polyisoprene rubber, isobutylene/isoprene rubber, and ethylene/propylene rubber. Additional polymers suitable for either embodiment include an ethylene propylene diene polymer, an isobutylene-isoprene copolymer, halogenated derivatives of an isobutylene-isoprene copolymer, a butadiene-isoprene copolymer, a poly(isobutylene-costyrene) polymer, halogenated derivatives of a poly(isobutylene-co-styrene) polymer, a poly(isobutylene-co-alkyl styrene) polymer, halogenated derivatives of a poly(isobutylene-co-alkyl styrene) polymer, a poly(isobutylene-co-haloalkyl styrene) polymer and halogenated derivatives of a poly(isobutylene-co-haloalkyl styrene) polymer. Preferably, the halogenated derivatives are halogenated with chlorine or bromine.

The metal containing compounds of the present invention may comprise zinc, tin, iron, selenium magnesium, chromium, nickel, or cadmium. Further, the compounds may be in the form of an oxide, carboxylic acid salt, a complex with a dithiocarbamate ligand, or a complex with a mercaptobenzothiazole ligand.

The methods of the present invention for sealing an expandable tubular such as a pipe, pipe string, casing, liner or the like in a wellbore in a subterranean formation basically comprise placing the expandable tubular in the wellbore, placing a sealing composition as described herein into the wellbore, expanding the expandable tubular, and allowing the sealing composition to set in the wellbore. The methods may optionally comprise the step of foaming the sealant composition using a gas such as nitrogen or air. In performing the described methods, the step of placing the expandable tubular in the wellbore may be performed before or after the step of placing the sealing composition into the wellbore. The step of expanding the expandable tubular may also be performed before or after the step of placing the sealing composition into the wellbore. Furthermore, the expandable tubular may be expanded before, after or during the set of the sealing composition. Where the tubular is expanded during or after the set of the sealing composition, preferred resilient compositions of the present invention will remain competent due to their elasticity and compressibility.

In addition to the foregoing methods, the wellbore may extend or be additionally extended into the subterranean formation below the first tubular wherein a second tubular, such as a pipe, pipe string, casing, liner or the like, is placed in the wellbore below the first tubular such that a portion of the second tubular extends into the first tubular. A second sealing composition, in accordance to the embodiments described herein, is placed in the wellbore located below the first tubular and the second tubular is expanded in the wellbore. The step of placing the second tubular in the wellbore may be performed before or after the step of placing the second sealing composition into the wellbore and the step of expanding the second tubular may also be performed before or after the step of placing the second sealing composition into the wellbore. The second tubular may also be expanded before, after or during the set of the either sealing composition. Furthermore, although the first and second tubulars may be expanded at the same time, when the second tubular is expanded inside the previously expanded first tubular, the second tubular may provide additional expansion to an overlapping portion of the first tubular whereby the sealing composition located behind that overlapping portion of the first tubular is further compressed thereby but remains competent due to its elasticity and compressibility.

Methods for sealing expandable pipe are disclosed in U.S. patent application Ser. No. 10/177,568 filed Jun. 21, 2002 entitled Methods of Sealing Expandable Pipe in Well bores and Sealing Compositions, now U.S. Pat. No. 6,722,433, hereby incorporated herein by reference. One preferred method for sealing an expandable pipe, such as a casing or liner in a wellbore, includes first placing the expandable pipe in the wellbore and then flowing a compressible hydraulic cement sealant composition, which remains competent when compressed, through the annulus between the well bore and the pipe. The sealant composition is allowed to harden into an impermeable mass and thereafter, the expandable pipe is expanded whereby the hardened sealant composition is compressed.

In another method disclosed in U.S. patent application Ser. No. 10/177,568, now U.S. Pat. No. 6,722,433, an expandable casing is placed in the well bore. A compressible foamed sealant composition, comprised of a hydraulic cement, a rubber latex, a rubber latex stabilizer, a gas and a mixture of foaming and foam stabilizing surfactants, is then placed in the annulus between the well bore and the casing. The expandable casing is expanded and the foam sealant composition is compressed upon the expansion of the expandable casing.

Examples of the hydraulic cement that can be utilized in the above methods include, but are not limited to, calcium aluminate cement, Portland cement, and Portland blast furnace cement. Of these, calcium aluminate cement is preferred. A variety of well known rubber latexes can be utilized including styrene/butadiene copolymer latex emulsion, polychloroprene emulsion, polyisoprene emulsion and acrylonitrilibutadiene emulsion. Of these, styrene/butadiene latex emulsion is preferred. In order to prevent the aqueous latex from prematurely coagulating and increasing the viscosity of the foamed sealant composition, an effective amount of latex stabilizing surfactant is included in the composition. The latex stabilizing surfactant utilized is included in the foamed sealant composition in the range from about 3% to 6% by weight of the rubber latex in the foamed sealant composition, preferably in an amount of 4%. The gas in the compressible foamed sealant composition can be air or nitrogen with nitrogen being preferred. Various mixtures of foam and foam stabilizing surfactants can be utilized in the compressible foamed sealant compositions. A mixture of ethoxylated alcohol ether sulfate surfactant, an alkyl or alkene amidopropyl betaine surfactant and an alkyl or alkene amidopropyl dimethyl amine oxide surfactant is preferred. The compressible foam sealant composition can also include a viscosity increasing agent for suspending particulate solids therein. A bentonite is preferred. The compressible foam sealant composition can also include a particulate solid density adjusting weighting material suspended therein. Iron oxide is preferred. The compressible foamed sealant composition can also include a set retarder. Citric acid is preferred. A variety of other conventional additives can also be utilized in the compressible foamed sealant composition including, but not limited to, fluid loss control additives, accelerators, dispersants, and lost circulation materials.

In the methods, the expansion of the expandable pipe compresses the gas in the foamed sealant composition but the composition maintains its competency, i.e., its integrity and sealing properties, whereby it prevents the undesirable migration of fluids between zones or formations penetrated by the wellbore and physically supports and positions the pipe in the well bore.

Sensors may be disposed in the annular area from and including the casing wall to the borehole wall for measuring and collecting data and information useful in the drilling, completion, production and workover of the well. For example sensors may be disposed in the casing/liner wall, on the exterior surface of the casing/liner, in the cement or sealing composition in the annulus, in the chemical casing, in the drilling fluid or in the chemical on or reacted to the well bore wall. The sensors may be within the metallurgy of the metal casing or embedded in the wall of composite casing. Sensors can be disposed in the chemical solutions for the borehole. Sensors also can be disposed in the cement or sealing composition as well as the chemical casing. The sensors may also be disposed on the outside of the monodiameter casing using a sheath. These sensors may be disposed either in the upper borehole section or in the lower borehole section extending through the producing formation.

The sensors may be of various types. One type of sensor may be made using nanotechnology. The sensors are not necessarily metallic sensors but may be a plasma, a fluid or chemical or particles or particulates. The sensors do not need to be electrical. The data or information from the sensors is acquired by various means such as using acoustics, vibration technology, broadband technology, radio frequency technology or the like. The sensors do not require wires or other conductors to transmit or store the data and information of the sensors.

The sensors may be used to gather any type of down hole parameters, reservoir or seimic or the condition of equipment installed or run in the wellbore. The sensors are disposed in the well during the drilling of the well. The signals being sent by the sensors during drilling would be propagated towards the surface or to another receiver for providing information during the drilling of a well. The sensors may be used to identify fractures or faults in the formation as well as seismic data of the formation. For example, a new well may be drilled adjacent an existing well. The sensors may be both in the existing well and in the well being drilled. The well being drilled is drilled by a bottom hole assembly having MWD and LWD tools which are able to receive the signals from the sensors in the adjacent well. The sensors may measure the speed of the transmission of waves or vibrations between the two wells. They also may detect a flood front propagating between the wells. For example, water may be injected in one well causing the water to flow to a producing well. The sensors are able to detect whether good sweep efficiencies are being achieved such as recovery sweeps. The sensors may also gather information relating to drilling. Also sensors will be useful where the well is in a highly corrosive area. The sensors may indicate whether the borehole is going to wash out or corrosion has occurred.

The above described methods and apparatus are utilized to drill and complete a monodiameter wellbore with a quality borehole which has diametric efficiency. The following describe various apparatus and methods of casing the monodiameter borehole with a monodiameter casing. Upon reaching the formation barrier, a monobore production delivery system may be used in the monodiameter casing to create a MONOWELL, as hereinafter described in detail.

FIGS. 3 and 9A-G illustrate the various stages of the drilling and completion method of one preferred embodiment of the present invention. FIGS. 9A-G and 3 show the sequential stages or steps in drilling and completing the well. FIGS. 3 and 9A-G are exemplary of one preferred method and apparatus of the present invention. Although the method and apparatus of the present invention are equally applicable to land wells where the rig is land based or to offshore wells where the rig is on an offshore platform or vessel, for purposes of description, FIGS. 3 and 9A-G illustrate an example of a land based well.

Integrated MONOWELL technologies can be deployed through a traditional offshore rig, traditional land rig, hydraulic workover, coiled tubing unit, or wired composite coiled tubing. In the traditional offshore and land rigs, the reduced mud volumes effectively decrease rig requirements. Drill-and-case systems can provide an added benefit to constructing the MONOWELL, such as reducing trips and drill pipe. The general principles of increasing well-construction efficiency are supported and are considered when designing a specific MONOWELL. While traditional rigs can be used to drill the MONOWELL reservoir sections, additional benefits are derived from using wired composite coiled tubing and underbalance techniques hereinafter described.

Figure 9F:
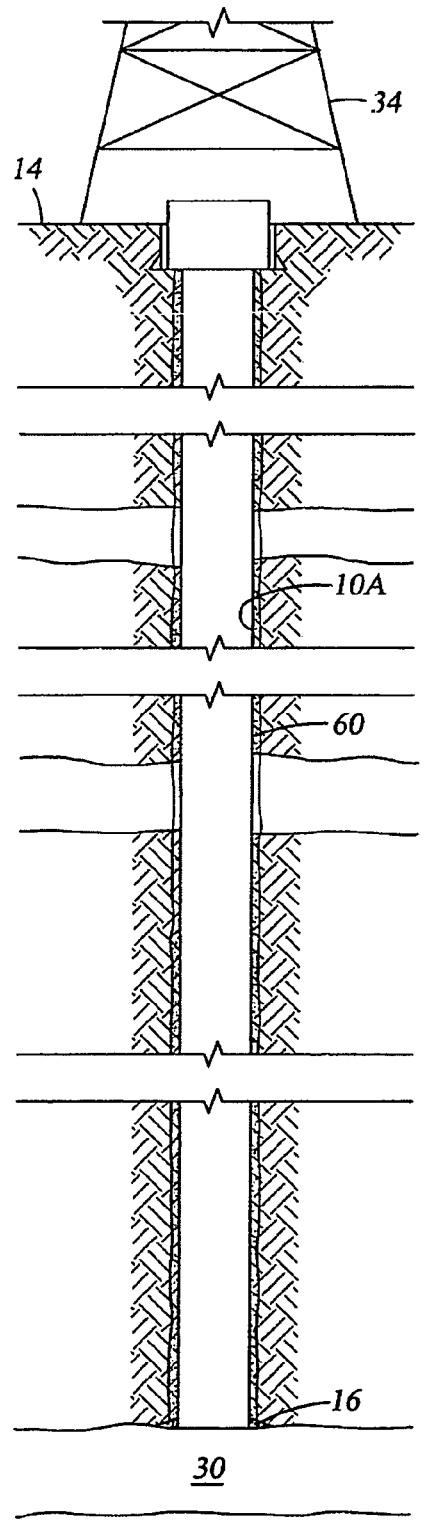
FIG. 9F is a schematic elevation view of the non-producing borehole for the monodiameter wellbore of FIGS. 9A-E after have been drilled, back reamed and chemical casing applied.

Although the well 12 may be formed using various drilling equipment and drilling techniques, FIGS. 3 and 9A-G illustrate a downhole assembly 20 disposed on the end of a work string 22. The work string 22, for example, may be jointed pipe 29 extending from the surface 14 from a rig 34, or a drill ship in the case of a subsea well. Referring particularly to FIG. 9A, the downhole assembly 20 may include directional drilling (i.e. mud motors), a GEO-PILOT or formation evaluation tools. Preferably downhole assembly 20 includes a bit 24, a downhole motor 26, a near bit reamer 28, a measurement while drilling assembly (MWD) 30, and a logging while drilling assembly 32 (LWD). It should be appreciated that the bit may be a ferrous or non-ferrous bit and it may or may not include sensors. MWD tools determine the location of the bit in relation to the depth and the LWD tools include logging tools for formation evaluation. The downhole assembly 20 may also include directional tools above or below the LWD assembly 32. It should also be appreciated that the downhole assembly 20 may include "ahead of the bit" technology of Halliburton where the MWD assembly 30 and LWD assembly 32 are measuring downhole parameters in advance of the bit such as by sending pulse waves into the formation ahead of the bit and measuring LWD and seismic parameters. The downhole assembly may include point the bit technology applied from theGEO-PILOT, rotary steerable device as well.

Although the near bit reamer 28 may be located between the bit 24 and the motor 26, it is preferably located above the motor 26. Although a near bit reamer is preferred, it is not required. One advantage of the near bit reamer 28 is that the near bit reamer allows the borehole to be back reamed while applying chemical casing, as hereinafter described, or it can be used during the drilling of the formation to clean out any excess formation damage or to smooth out an unsmooth borehole to make the borehole smoother for the expandable casing, expandable screen or completion to be applied.

It should be appreciated that chemical casing may be applied at any time during the drilling of the borehole as hereinafter explained.

Preferably the bit 24 and downhole motor 26 are a SLICKBORE bit, with matching mud motor assembly where the mud motor assembly 26 is attached directly to the bit 24. This combination minimizes tortuosity in the borehole 10 so that the borehole diameter can be consistent and smooth. A slick bore bit is preferred for the non-producing borehole 10A for the first 14,000 ft. A GEO-PILOT, rotary steerable device, with an extended long gauge bit, is preferred for longer depths.

Although not required for the non-producing borehole 10A, the slick bore bit 24, or Geo pilot/bit, is utilized when drilling the producing borehole 10B through the reservoir producing zone 30. The SLICKBORE System includes a bit 24 and mud motor 26, which are preferably matched units, to avoid the bit tending to drill in one direction while the motor tends to move in another direction introducing tortuosity into the borehole. The SLICKBORE System and the GeoPilot System are part of the full drift drilling systems that produce a quality borehole. Tortuosity creates pockets in the borehole wall allowing borehole washouts such that the casing is not properly supported in the borehole. Perfect cementing support is difficult to achieve where there is tortuosity.

Figure 10:
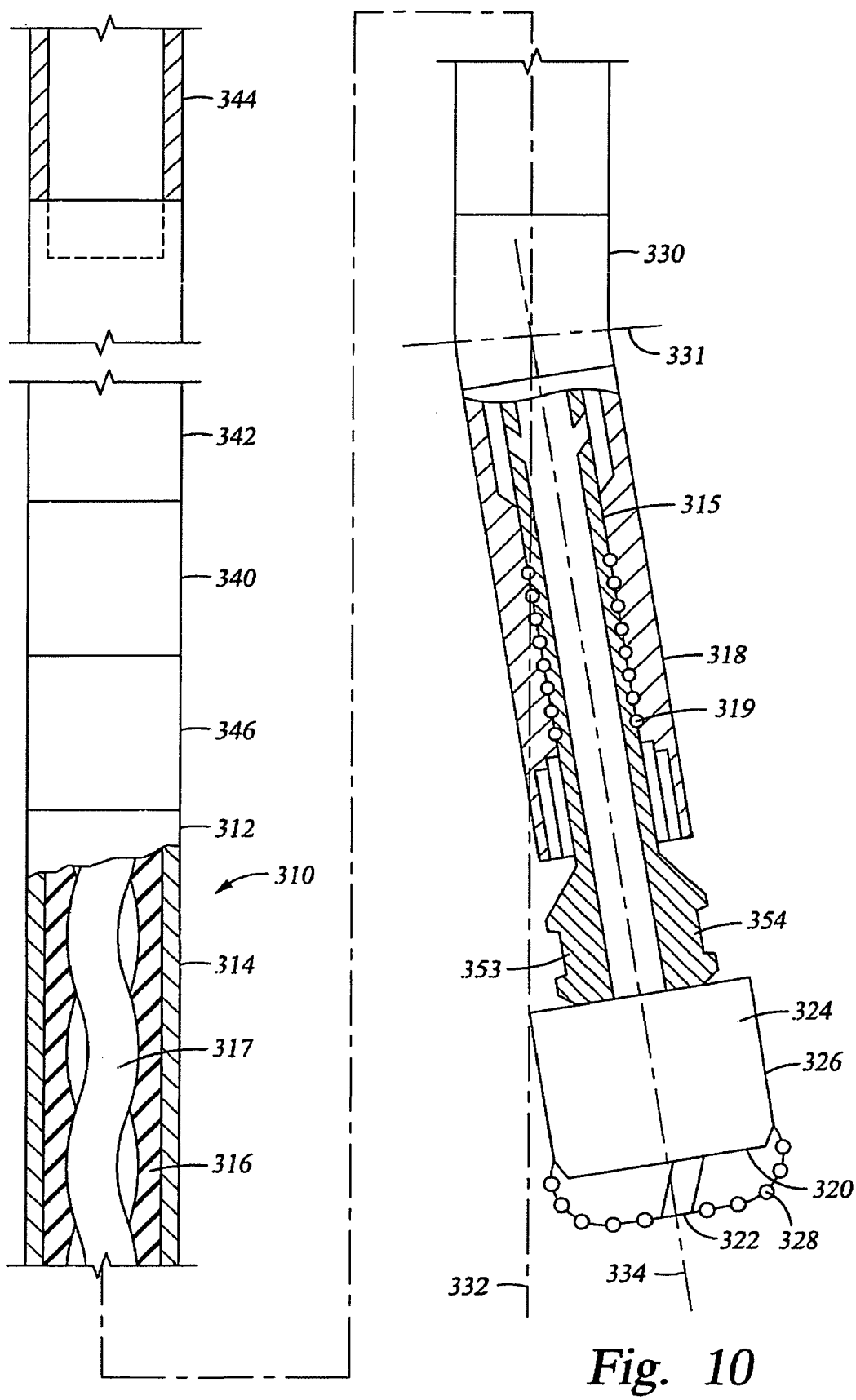
FIG. 10 is an elevation view, partly in cross section of a slickbore system.
Figure 11:
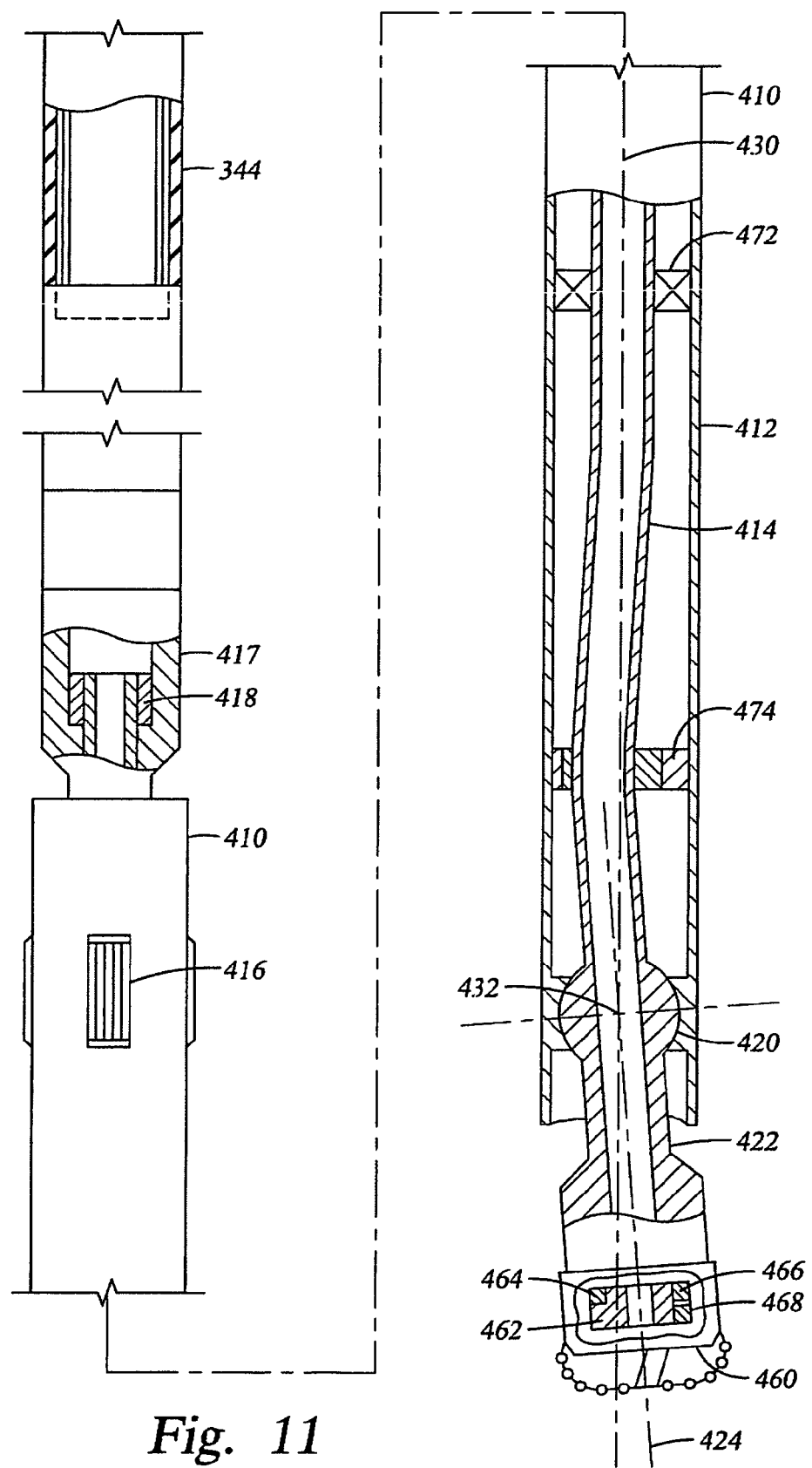
FIG. 11 is an elevation view partly in cross section of a slickbore system with a rotary drilling assembly.

Referring now to FIGS. 10 and 11, FIG. 10 shows a bottom hole assembly having a positive displacement motor (PDM) driven by pumping downhole fluid through the motor for rotating the bit, and FIG. 11 shows a BHA with a rotary steerable device (RSD) such that the bit is rotated by rotating the drill string at the surface. The BHA lower housing surrounding the rotating shaft is preferably "slick" in that it has a substantially uniform diameter housing outer surface without stabilizers extending radially therefrom. The housing on a PDM has a bend. The bend on a PDM occurs at the intersection of the power section central axis and the lower bearing section central axis. The bend angle on a PDM is the angle between these two axis. The housing on an RSD does not have a bend. The bend on an RSD occurs at the intersection of the housing central axis and the lower shaft central axis. The bend angle on an RSD is the angle between these two axes. The bottom hole assembly includes a long gauge bit, with the bit having a bit face having cutters thereon and defining a bit diameter. and a long cylindrical gauge section above the bit face. The total gauge length of the bit is at least 75% of the bit diameter. The total gauge length of a drill bit is the axial length from the point where the forward cutting structure reaches full diameter to the top of the gauge section. At least 50% of the total gauge length is substantially full gauge. Most importantly, the axial spacing between the bend and the bit face is controlled to less than twelve times the bit diameter.

Referring now to FIG. 10, there is shown a SLICKBORE system including a bottom hole assembly (BHA) 310 having a positive displacement motor (PDM) 312 which is conventionally suspended in the well from the threaded tubular string, such as a drill string 344, although alternatively the PDM 312 may be suspended in the well from coiled tubing. PDM 312 includes a motor shaft 354 and a motor housing 314 having a substantially cylindrical outer surface along at least substantially its entire length. The motor housing 314 includes radially opposing flats 353. The motor has an upper power section 316 which includes a conventional lobed rotor 317 for rotating the motor output shaft 315 in response to fluid being pumped through the power section 316. Fluid thus flows through the motor stator to rotate the axially curved or lobed rotor 317. A lower bearing housing 318 houses a bearing package assembly 319 which comprising both thrust bearings and radial bearings. Housing 318 is provided below bent housing 330, such that the power section central axis 332 is offset from the lower bearing section central axis 334 by the selected bend angle. This bend angle is exaggerated in FIG. 10 for clarity, and is less than about 1.5 degrees. FIG. 10 also simplistically illustrates the location of an MWD system 340 positioned above the motor 312. The MWD system 340 transmits signals to the surface of the well in real time. The BHA 310 also includes a drill collar assembly 342 providing the desired weight-on-bit (WOB) to the rotary bit and may include an orientation tool 346. The majority of the drill string 344 comprises lengths of metallic drill pipe, and various downhole tools, such as cross-over subs, stabilizer, jars, etc., may be included along the length of the drill string.

The term "motor housing" as used herein means the exterior component of the PDM 312 from at least the uppermost end of the power section 316 to the lowermost end of the lower bearing housing 318. The motor housing does not include stabilizers thereon, which are components extending radially outward from the otherwise cylindrical outer surface of a motor housing which engage the side walls of the borehole to stabilize the motor. These stabilizers functionally are part of the motor housing, and accordingly the term "motor housing" as used herein would include any radially extending components, such as stabilizers, which extend outward from the otherwise uniform diameter cylindrical outer surface of the motor housing for engagement with the borehole wall to stabilize the motor.

The bent housing 330 thus contains the bend 331 that occurs at the intersection of the power section central axis 332 and the lower bearing section central axis 334. The selected bend angle is the angle between these axes. In a preferred embodiment, the bent housing 330 is an adjustable bent housing so that the angle of the bend 331 may be selectively adjusted in the field by the drilling operator. Alternatively, the bent housing 330 could have a bend 331 with a fixed bend angle therein.

The BHA 310 also includes a rotary bit 320 having a bit end face 322. A bit 320 includes a long gauge section 324 with a substantially cylindrical outer surface 326 thereon. Fixed PDC cutters 328 are preferably positioned about the bit face 322. The bit face 322 is integral with the long gauge section 324. The total gauge length of the bit is at least 75% of the bit diameter as defined by the fullest diameter of the cutting end face 322, and preferably the total gauge length is at least 90% of the bit diameter. In many applications, the bit 320 will have a total gauge length from one to one and one-half times the bit diameter. The total gauge length of a drill bit is the axial length from the point where the forward cutting structure reaches full diameter to the top of the gauge section 324, which substantially uniform cylindrical outer surface 326 is parallel to the bit axis and acts to stabilize the cutting structure laterally. The long gauge section 324 of the bit may be slightly undersized compared to the bit diameter. The substantially uniform cylindrical surface 326 may be slightly tapered or stepped, to avoid the deleterious effects of tolerance stack up if the bit is assembled from one or more separately machined pieces, and still provide lateral stability to the cutting structure. To further provide lateral stability to the cutting structure, at least 50% of the total gauge length is considered substantially full gauge.

The preferred drill bit may be configured to account for the strength. abrasivity, plasticity and drillability of the particular rock being drilled in the deviated hole. Drilling analysis systems as disclosed in U.S. Pat. Nos. 5,704,436, 5,767,399 and 5,794,720, all hereby incorporated herein by reference, may be utilized so that the bit utilized, may be ideally suited for the rock type and drilling parameters intended. The long gauge bit acts like a near bit stabilizer which allows one to use lower bend angles and low WOB to achieve the same build rate.

Sensors may be preferably used when placed in a sealed hearing roller cone bit. Sensors that measure the temperature, pressure, and/or conductivity of the lubricating oil in the roller cone bearing chamber may be used to make measurements indicative of seal or bearing failure either having occurred or being imminent.

Referring now to FIG. 11, the driving source for rotating the bit is not a PDM motor, but instead a rotary steerable application, with the rotary steerable housing 412 receiving the shaft 414 which is rotated by rotating the drill string at the surface. Various bearing members 420, 474, 472 are axially positioned along the shaft 414. Again, those skilled in the art should understand that the rotary steerable mechanism shown in FIG. 11 is highly simplified. The bit 460 may include various sensors 466, 468 which may be mounted on an insert package 462 provided with a data port 464.

The slick bore concept may also be applied to rotary steerable applications. A rotary steerable device (RSD) is a device that tilts or applies an off-axis force to the bit in the desired direction in order to steer a directional well while the entire drill string is rotating. Typically, an RSD will replace a PDM in the BHA and the drill string will be rotated from surface to rotate the bit. There may be circumstances where a straight PDM may be placed above an RSD for several reasons: (1) to increase the rotary speed of the bit to be above the drill string rotary speed for a higher RQP; (ii) to provide a source of closely spaced torque and power to the bit; (iii) and to provide bit rotation and torque while drilling with coiled tubing.

FIG. 11 depicts an application using a rotary steerable device (RSD) 410 in place of the PDM. The RSD has a short bend to bit face length and a long gauge bit. While steering, directional control with the RSD is similar to directional control with the PDM. The primary benefits of the present invention may thus be applied while steering with the RSD.

An RSD allows the entire drill string to be rotated from surface to rotate the drill bit, even while steering a directional well. Thus an RSD allows the driller to maintain the desired toolface and bend angle, while maximizing drill string RPM and increasing ROP. Since there is no sliding involved with the RSD, the traditional problems related to sliding, such as discontinuous weight transfer, differential sticking, hole cleaning, and drag problems, are greatly reduced. With this technology, the well bore has a smooth profile as the operator changes course. Local doglegs are minimized and the effects of tortuosity and other hole problems are significantly reduced. With this system, one optimizes the ability to complete the well while improving the ROP and prolonging bit life.

FIG. 11 depicts a BHA for drilling a borehole in which the RSD 410 replaces the PDM 312. The RSD in FIG. 11 includes a continuous, hollow, rotating shaft 414 within a substantially non-rotating housing 412. Radial deflection of the rotating shaft within the housing by a double eccentric ring cam unit 474 causes the lower end 422 of the shaft 414 to pivot about a spherical bearing system 420. The intersection of the central axis of the housing 430 and the central axis 424 of the pivoted shaft below the spherical bearing system defines the bend 432 for directional drilling purposes. While steering, the bend 432 is maintained in a desired toolface and bend angle by the double eccentric cam unit 474. To drill straight, the double eccentric cams are arranged so that the deflection of the shaft is relieved and the central axis 424 of the shaft below the spherical bearing system is put in line with the central axis 430 of the housing 412. The features of this RSD are described below in further detail.

The RSD 410 in FIG. 11 includes a substantially non-rotating housing 412 and a rotating shaft 414. Housing rotation is limited by an anti-rotation device 416 mounted on the non-rotating housing 412. The rotating shaft 414 is attached to the rotary bit 460 at the bottom of the RSD 410 and to drive sub 417 located near the upper end of the RSD through mounting devices 418. A spherical bearing assembly 420 mounts the rotating shaft 414 to the non-rotating housing 412 near the lower end of the RSD. The spherical bearing assembly 420 constrains the rotating shaft 414 to the non-rotating housing 412 in the axial and radial directions while allowing the rotating shaft 414 to pivot with respect to the non-rotating housing 412.

While steering, directional control is achieved by radially deflecting the rotating shaft 414 in the desired direction and at the desired magnitude within the non-rotating housing 412 at a point above the spherical bearing assembly 420. Deflection may be achieved using a double eccentric ring cam unit 474.

The method of forming monodiameter wellbore 10 includes drilling a monodiameter non-producing borehole 10A from the surface 14 to the reservoir barrier 16, preferably in one trip into the well, using downhole assembly 20. After the non-producing wellbore 10A has been formed as shown in FIG. 3, the work string 22 and downhole assembly 20 are removed from non-producing wellbore 10A with a substantially common diameter 18 extending from the surface 14 to the top of the reservoir 30 of well 12. After the non-producing borehole 10A is drilled, a monodiameter producing borehole 10B is drilled from the reservoir barrier 16 and across or through the reservoir 30 to the bottom of the well 15. It should be appreciated that although FIGS. 9A-G and 3 illustrate a vertical well, the well may be on shore or offshore and may be a new borehole, a vertical borehole, a straight borehole, an extended reach borehole, extending an existing borehole, a sidetracked borehole, a horizontal well, a deviated borehole, a multi-lateral borehole, or other type of borehole for drilling and completing one or more production zones.

FIGS. 3 and 9A-G illustrate examples of the various stages of drilling of a monodiameter wellbore 10 using a preferred embodiment of the present invention. Referring particularly to FIG. 9A, a conductor casing 38 for supporting a wellhead 40 is installed into the earth's surface 14 such as by drilling, or in the case of a subsea well such as by jetting into the sea floor. Downhole assembly 20 on work string 22 drills an initial section 46 of borehole 10A with drilling fluid 68 passing through the work string to provide power to mud motor 26 and to remove cuttings up the annulus 42 formed by work string 22 and borehole wall 44. The drilling mud motor 26 in turn powers the full drift bit 24 producing a uniform diameter borehole 48. The bit may or may not be energy balanced. The first section 46 of borehole 12 is drilled down to and through a formation barrier 50 using drilling fluid 68. Certain characteristics of the drilling fluids support drilling the monodiameter wellbore as hereinafter discussed.

Formation barrier 50 may be any change in the formation. Shale is a typical formation barrier dividing different lithologies, pressure zones or equivalent circulating density (ECD) zones. Once the drilling reaches one of these types of barriers, then the borehole is cased either with chemical casing, expandable casing or a combination thereof.

In most wells, particularly deeper wells that pass through multiple formations, it is necessary to provide support for the formation around the monodiameter non-producing wellbore 10A and to contain formation fluids, earthen materials or solids that would otherwise mingle with the drilling mud and/or the produced fluids. In more permeable formations, it is also necessary to seal the borehole to prevent fluid loss into the formation. Each of these functions can be provided by casing the non-producing wellbore 10A either by chemical casing or cladding by expandable casing or cladding casing with normal casing after various chemical solutions have been used across the formation barrier 50.

Referring now to FIG. 9B, once downhole assembly 20 drills down through barrier 50, the arms 52 with rotary cutters 54 on near bit reamer 28 are expanded to ream borehole section 46 as the near bit reamer 28 is rotated and moved upwardly within section 46 by work string 22. As the near bit reamer 28 is pulled back up through the previously drilled section 46, the borehole is back reamed and enlarged to a larger diameter 58. The reamer 28 also serves other functions such as cleaning the previously drilled borehole for better and smoother borehole geometry.

As the borehole is drilled, a chemical casing 60 may be applied to the borehole wall 44. Chemical casing 60 includes chemicals that permeate the formation around the non-producing wellbore 10A and change the mechanical characteristics of the formation. The casing chemicals solidify in the formation to form chemical casing 60. The solid chemical casing 60 seals and adheres to the formation and thus sets up to form a barrier around the borehole wall 44. Depending on the type of chemical casing used, solidification can be a function of time and/or temperature, or can be triggered by contact between the casing chemicals and liquids or gases in the formation. For example, some chemical casing mixtures solidify upon contact with formation water.

Referring now to FIG. 9C, the chemical casing 60 may support section 46 of borehole 10A until the complete borehole 10 is drilled, then the well 12 may be cased with other casing, such a metal casing. It is preferred to apply chemical casing 60 during drilling since it provides support to the formation wall 44 without restricting the diameter of the borehole 10 thereby providing a substantially single diameter. See U.S. patent application Ser. No. 10/170,400 filed Jun. 13, 2002 and entitled Methods of Consolidating Formations or Forming Chemical Casing or Both While Drilling, now U.S. Pat. No. 6,702,044, hereby incorporated herein by reference.

One embodiment of the chemical casing 60 includes a two-component system namely a catalytic base material and a set-up material. The catalytic base material is inactive until it becomes activated by the set-up material. The catalytic base material is a penetrating material that penetrates the formation. Then the set-up material flows in behind the catalytic base material with the catalytic base material acting as a catalyst for the set-up material causing it to solidify. The catalytic base material is preferably mixed with the drilling fluids 68 and permeates into the formation while drilling. The set-up material is then applied activating the catalytic base material to form a solid and the chemical casing 60. The set-up material is spotted in the process so that it permeates into the formation. Upon permeation into the formation, the catalyzed set-up material seals the formation around the borehole wall 44. The chemical casing 60 may permeate the formation to change the formation mechanical characteristics or it may merely coat the borehole wall 44 forming a solid annular chemical casing within the borehole 10.

The catalytic base material may be a polymer which serves as a catalyst for the set-up material which may be a resin. Typically chemical casing 60 is the combination of a polymer with a resin technology. One polymer is a polyethylene imine (PEI) polymer and one resin is a melamine-type resin. For example, a melamine-type resin technology when combined with the PEI polymer will solidify to form a chemical casing. The polymer is applied first and then the resin is subsequently applied with the polymer serving as a catalyst for the resin. For example, the PEI polymer penetrates the formation and acts as a catalyst for the melamine resin.

The resin may be applied in either a liquid or a solid state. There are two types of melamine resin, a soluble resin which is a clear liquid and is completely soluble, or a solid which is a particulate material. The liquid permeates into the formation where the polymer is located and is catalyzed in the formation to change the mechanical characteristics of the formation. It depends upon the property desired for the formation. The particulate builds a wall for the chemical casing 60. If the mechanical properties of the formation are to be changed, the resin will be in the liquid state to permeate the formation. If only a layer is to be formed around the inside bore hole wall 44, the resin is a particulate which merely forms a wall. This flexibility allows the formation to be treated as desired depending upon the particular formation.

One preferred method for forming a chemical casing in a well bore for improving the mechanical strength thereof and provide zonal isolation to prevent fluid flow between zones or formations while drilling the well bore is as follows. The well bore is drilled with a drilling fluid having a pH in the range of from about 6 to about 10, preferably 8. The drilling fluid is comprised of water, a water soluble or water dispersible polymer which is cross-linkable by a thermoset resin and causes the resin to be hard and tough when cured, a particulate curable solid thermoset resin, a water soluble thermoset resin, and a delayed dispersible acid catalyst for curing the solid thermoset resin and the water soluble thermoset resin. The drilling fluid components form a filter cake on the walls of the well bore that cures into a hard and tough cross-linked chemical casing thereon.

The water soluble or dispersible polymer which is cross-linked by a thermoset resin is selected from the group consisting of polymers containing one or more of hydroxyl, amide, carboxyl and epoxy functional groups. Examples of such polymers include, but are not limited to, acrylic latexes, polyvinylalcohol, polyvinylbutyral, polyesters, polyalkylacrylic acids, polyUrethanes, acrylamide polymers, proteins, polyols and polysaccharides such as chitosan, hydroxyethylcellulose, carboxymethylhydroxyethylcellulose, water soluble starches, guar gum, xanthan gum, welan gum, carragenan gum and arabic gum. The polymer is included in the drilling fluid in an amount in the range of from about 0.5% to about 20% by weight of water in the drilling fluid, more preferably in an amount in the range of from about 1% to about 10% by weight of water and most preferably in an amount of about 3%.

As mentioned above, the particulate curable solid thermoset resin has a particle size in the range from about 50 to about 1000 microns and is selected from particulate solid melamine-formaldehyde type resins, urea-formaldehyde type resins or phenol-formaldehyde type resins, and more preferably from particulate solid alkyl esters of melamine-formaldehyde resins and particulate solid alkyl esters of urea-formaldehyde resins. Of these, the particulate solid alkyl esters of melamine-formaldehyde resins are preferred. The particulate curable solid thermoset resin used is included in the drilling fluid in the general amount in the range from about 5% to about 50% by weight of water in the drilling fluid, more preferably in an amount in the range from about 10% to about 30% by weight of water and most preferably in an amount of about 15%.

The water soluble thermoset resin is selected from water soluble melamine-formaldehyde type resins, urea-formaldehyde type resins or phenol-formaldehyde type resins, and more preferably from water soluble alkyl ethers of melamine-formaldehyde resins and water soluble alkyl ethers of urea-formaldehyde resins. Of these, water soluble alkyl ethers of melamine-formaldehyde resins are preferred. The water soluble thermoset resin used is included in the drilling fluid in an amount in the range from about 5% to about 80% by weight of water in the drilling fluid, more preferably in an amount in the range from about 20% to about 70% by weight of water and most preferably in an amount of about 50%.

The acid in the delayed dispersible acid catalyst is an organic or inorganic acid selected from the group consisting of p-toluene sulfonic acid, dinonylnaphthalene sulfonic acid, dodecyl benzene sulfonic acid, oxalic acid, maleic acid, hexamic acid, a copolymer of phthalic and acrylic acid, trifluoromethane sulfonic acid, phosphoric acid, sulfuric acid, hydrochloric acid, sulfamic acid and ammonium salts that produce acids when dissolved in water. Of these, ammonium chloride is preferred. The acid in the delayed acid utilized is included in the drilling fluid in a general amount in the range of from about 0.5% to about 8% by weight of thermoset resin in the drilling fluid, more preferably in an amount in the range of from about 1% to about 6% by weight of resin and most preferably in an amount of about 4%.

The acid in the delayed dispersible acid catalyst can be delayed using various techniques known to those skilled in the art. A preferred technique for controlling the release of the acid catalyst utilized is to cause the acid to be absorbed into a particulate porous solid material whereby the acid is encapsulated. When the encapsulated acid is combined with the drilling fluid, it is slowly released into the drilling fluid. While a variety of porous solid materials can be utilized, particularly suitable such materials are inorganic porous solid materials which remain dry and free flowing after absorbing a liquid chemical additive therein. Examples of such porous solid materials include, but are not limited to, metal oxides, e.g., silica and alumina; metal salts of alumina-silicates, e.g., zeolites, clays and hydrotalcites; and others. Of the various particulate porous solid materials that can be used, particulate porous silica is preferred with precipitated silica being the most preferred.

The delayed release of a liquid chemical additive, absorbed in particulate porous precipitated silica, is by osmosis whereby the encapsulated liquid chemical diffuses through the porous solid material as a result of it being at a higher concentration within the porous material than its concentration in the liquid fluid outside the porous material. In order to further delay the release of a liquid chemical additive, the porous precipitated silica can be coated with a slowly soluble coating. Examples of suitable slowly soluble materials which can be used include, but are not limited to, EDPM rubber, polyvinyldichloride (PVDC), nylon, waxes, polyUrethanes, cross-linked partially hydrolyzed acrylics and the like. A more detailed description of the encapsulating techniques described above is set forth in U.S. Pat. No. 6,209,646 issued on Apr. 3, 2001 to Reddy et al., the disclosure of which is incorporated herein by reference thereto.

In order to strengthen the chemical casing formed in the well bore, one or more insoluble reinforcing materials can be included in the drilling fluid. The reinforcing materials become a part of the filter cake deposited on the walls of the well bore that cures into a hard and tough casing thereon. The presence of the reinforcing materials in the strong, hard and tough chemical casing provides additional strength to the chemical casing. The insoluble reinforcing materials which can be utilized include, but are not limited to, carbon fibers, glass fibers, mineral fibers, cellulose fibers, silica, zeolite, alumina, calcium sulfate hemihydrate, acrylic latexes, polyol-polyesters and polyvinyl butyral. Of these, fibrous materials or calcium sulfate hemihydrate are preferred. When used, the reinforcing material is included in the drilling fluid in an amount in the range of from about 2% to about 25% by weight of water in the drilling fluid, more preferably in an amount in the range of from about 5% to about 20% by weight of water and most preferably in an amount of about 10%.

As mentioned above, the drilling fluid can include other conventional drilling fluid additives which are known to those skilled in the art.

A combined method for both consolidating unconsolidated weak zones or formations and for forming a chemical casing in a well bore penetrating the weak zones or formations to improve the mechanical strength thereof and/or to provide zonal isolation while drilling the well bore is as follows. A well bore is drilled with a drilling fluid having a pH in the range of from about 6 to about 10, preferably 8. The drilling fluid is comprised of water, a polymeric cationic catalyst capable of accepting and donating protons which is adsorbed on the unconsolidated clays, shales, sand stone and the like, a water soluble or dispersible polymer which is cross-linked by a thermoset resin and causes the resin to be hard and tough when cured, a particulate curable solid thermoset resin, a water soluble thermoset resin and a delayed dispersible acid catalyst for curing the thermoset resins, the drilling fluid forming a filter cake on the walls of the well bore that cures and consolidates the unconsolidated weak zones and formations penetrated by the well bore so that sloughing is prevented and forms a hard and tough cross-linked chemical casing on the walls of the well bore.

The polymeric cationic catalyst in the drilling fluid is selected from the group consisting of polyethyleneimine, poly(dimethylaminoethylmethacrylate) and poly(dimethylaminopropylmethacrylate). Of these, polyethyleneirine is preferred. The polymeric cationic catalyst is included in the drilling fluid in an amount in the range of from about 1% to about 15% by weight of water in the drilling fluid, more preferably in an amount in the range of from about 2% to about 10% by weight of water and most preferably in an amount of about 6%.

The water soluble or dispersible polymer which is cross-linked by a thermoset resin utilized in the drilling fluid is selected from polymers containing one or more of hydroxyl, amide, carboxyl and epoxy functional groups. Examples of such polymers include, but are not limited to, acrylic latexes, polyvinylalcohol, polyvinylbutyral, polyesters, polyalkylacrylic acids, polyUrethanes, acrylamide polymers, proteins, polyols and polysaccharides such as chitosan, hydroxyethylcellulose, carboxymethylhydroxyethylcellulose, water soluble starches, guar gum, xanthan gum, welan gum, carragenan gum and arabic gum. Of these, polysaccharides are preferred. The water soluble or dispersible polymer which is cross-linked by a thermoset resin is generally present in the drilling fluid in an amount in the range of from about 0.5% to about 20% by weight of water in the drilling fluid, more preferably in an amount in the range of from about 1% to about 10% by weight of water and most preferably in an amount of about 3%.

The particulate curable solid thermoset resin, which preferably has a particle size in the range of from about 50 to about 1000 microns, is selected from particulate solid melamine-formaldehyde type resins, urea-formaldehyde type resins or phenol-formaldehyde resins, and more preferably from particulate solid alkyl ethers of melamine-formaldehyde resins and particulate solid alkyl ethers of urea-formaldehyde type resins. Of these, particulate solid alkyl ethers of melamine-formaldehyde resins are preferred. The particulate curable solid thermoset resin is generally included in the drilling fluid in an amount in the range of from about 5% to about 50% by weight of water in the drilling fluid, more preferably in an amount in the range of from about 10% to about 30% by weight of water and most preferably in an amount of about 15%.

The water soluble thermoset resin is selected from the group consisting of water soluble alkyl ethers of melamine-formaldehyde resins, water soluble alkyl ethers of urea-formaldehyde resins and water soluble phenol-formaldehyde type resins. Of these, a water soluble alkyl ether of melamine-formaldehyde resin is preferred. The water soluble thermoset resin is included in the drilling fluid in an amount in the range of from about 5% to about 80% by weight of water in the drilling fluid, more preferably in an amount in the range of from about 20% to about 70% by weight of water and most preferably in an amount of about 50%.

The acid in such delayed acid catalyst in such drilling fluid is an organic or inorganic acid selected from the group consisting of p-toluene sulfonic acid, dinonylnaphthalene sulfonic acid, dodecyl benzene sulfonic acid, oxalic acid, maleic acid, hexamic acid, a copolymer of phthalic and acrylic acid, trifluoromethane sulfonic acid, phosphoric acid, sulfuric acid, hydrochloric acid, sulfamic acid and ammonium salts that produce acids when dissolved in water. Of these, ammonium chloride acid is preferred. The acid in the delayed acid catalyst utilized is generally present in the drilling fluid in an amount in the range of from about 0.5% to about 8% by weight of the thermoset resin in the drilling fluid, more preferably in an amount in the range of from about 1% to about 6% by weight of resin and most preferably in an amount of about 4%.

The drilling fluid can optionally include an insoluble chemical casing reinforcing material selected from the group consisting of carbon fibers, glass fibers, mineral fibers, cellulose fibers, silica, zeolite, alumina, calcium sulfate hemihydrate, acrylic latexes, polyol-polyesters and polyvinyl butyral. Of these, fibrous materials or calcium sulfate hemihydrate are preferred. When used, the insoluble reinforcing material is generally present in the drilling fluid in an amount in the range of from about 2% to about 25% by weight of water in the drilling fluid, more preferably in an amount in the range of from about 5% to about 20% by weight of water and most preferably in an amount of about 10%.

As mentioned above, the drilling fluid can also include conventional additives known to those skilled in the art.

Another method of consolidating unconsolidated weak zones or formations and forming a chemical casing in a well bore penetrating the weak zones or formations to improve the mechanical strength of the well bore and/or to provide zonal isolation while drilling the well bore is comprised of the steps of: (a) drilling the well bore with a drilling fluid having a pH in the range of from about 6 to about 10, preferably 8, and comprised of water, a polymeric cationic catalyst capable of accepting and donating protons which is adsorbed on said unconsolidated clays, shales, sand stone and the like, a particulate curable solid thermoset resin and a delayed acid catalyst for curing the solid resin, the drilling fluid forming a filter cake on the walls of the well bore that cures and consolidates the unconsolidated weak zones and formations penetrated by the well bore so that sloughing is prevented; and (b) contacting the well bore with a treating fluid comprised of water, a water soluble or dispersible polymer which is cross-linkable by a thermoset resin and causing the resin to be hard and tough when cured and a water soluble or dispersible thermoset resin, the treating fluid components depositing on the filter cake formed in step (a) and the thermoset resins curing into a hard and tough cross-linked chemical casing on the walls of the well bore.

The components in the drilling fluid and the treating fluid are the same as the components described above in connection with the preceding method.

The polymeric cationic catalyst is generally present in the drilling fluid in an amount in the range of from about 2% to about 25% by weight of water in the drilling fluid, more preferably in an amount in the range of from about 5% to about 20% by weight of water and most preferably in an amount of about 10%.

The particulate curable solid thermoset resin is generally present in the drilling fluid in an amount in the range of from about 5% to about 50% by weight of water in the drilling fluid, more preferably in an amount in the range of from about 10% to about 30% by weight of water and most preferably in an amount of about 15%.

The acid in the delayed acid catalyst is generally present in the drilling fluid in an amount in the range of from about 0.5% to about 8% by weight of the thermoset resin in the drilling fluid, more preferably in an amount in the range of from about 1% to about 6% by weight of water and most preferably in an amount of about 4%.

The water soluble or dispersible polymer which is crosslinkable by a thermoset resin is generally present in the treating fluid in an amount in the range of from about 0.5% to about 20% by weight of water in the treating fluid, more preferably in an amount in the range of from about 1% to about 10% by weight of water and most preferably in an amount of about 3%.

The water soluble or dispersible thermoset resin is generally present in the treating fluid in an amount in the range of from about 5% to about 80% by weight of water in the drilling fluid, more preferably in an amount in the range of from about 20% to about 70% by weight of water and most preferably in an amount of about 50%.

The drilling fluid can optionally include a reinforcing material to strengthen the chemical casing as described above in connection with the preceding method. When used, the reinforcing material is generally included in the drilling fluid in an amount in the range of from about 5% to about 50%, more preferably in an amount in the range of from about 10% to about 30% by weight of water and most preferably in an amount of about 15%.

As mentioned, the drilling fluid can also include conventional additives known to those skilled in the art.

Other preferred compositions and methods are described in U.S. patent application Ser. No. 10/170,400 filed Jun. 13, 2002 and entitled Methods of Consolidating Formations or Forming Chemical Casing or Both While Drilling, now U.S. Pat. No. 6,702,044, hereby incorporated herein by reference.

If the formations can support themselves, then back reaming or applying the chemical casing may not be necessary.

The borehole is drilled from the top of the well to as far as possible monitoring the ECD and fracture gradient window band. If possible, the borehole is drilled across sections of the non-producing area that has different formations, pressure zones, and ECD measurements. If the ECDs and fracture gradients window narrow or other parameters indicate there might be the potential of the borehole becoming unstable, then chemical casing or expandable casing may be utilized to support the borehole. If at all possible, the borehole is drilled from surface to reservoir barrier.

It should be appreciated that the formulation of the chemical casing may vary with the type of formation through which the borehole is extending. Thus each section of the borehole, as it is chemically cased, may have a different chemical casing formulation formulated for that formation section.

Resin and polymer technology are disclosed in U.S. Pat. Nos. 4,664,713; 4,773,481; 4,799,550; 5,181,568; 5,146,986; 5,304,620; 5,335,726; 6,176,315, and 6,271,181, all hereby incorporated herein by reference. Other chemicals include formation stabilization agents such as fibrous materials. Chemical casing may also include liquefied metallic casing.

The chemical casing 60 may be applied using various methods. With respect to FIGS. 3 and 9A-G, the catalytic base material is mixed in with the drilling fluids 68. As the SLICKBORE extended gauge bit 24 or rotary steerable extended gauge bit on downhole assembly 20 drills the initial section 46 of borehole 10A, the modified drilling fluid 68 with catalytic base material passes through the work string 22 and through the bit nozzles. The catalytic base material penetrates the formation surrounding borehole wall 44. A polymer catalytic base material permeates the formation best in a low water loss mud system while the borehole is being drilled.

Then after the bore hole section 46 has been drilled, the bore hole section 46 is under-reamed, and the set-up material is applied during a sweep of the bore hole section. As the borehole is back reamed, the set-up material is applied to the borehole wall 44 as reamer 28 passes upwardly through the borehole 10A. The set-up material, in its fluid form, flows down the flowbore of work string 22 and through nozzles in reamer 28. As the cutter blades on the reamer 28 rotate, the nozzles spray the borehole wall 44 with set-up material allowing the set-up material to penetrate and extrude into the formation surrounding the borehole wall 44. Fluid pressure forces the set-up material of the chemical casing 60 to flow and permeate into the formation. The set-up material contacts the catalytic base material which acts as a catalyst to activate the set-up material causing it to solidify and form chemical casing 60. In one embodiment the resin coats the bore hole wall 44 with the polymer catalyst causing the resin to solidify thereby forming the chemical casing 60.

The set-up material may either be a soluble liquid and depending upon the application, may be a solid. For example, the application will depend upon the permeability of the formation material such as shale or sandstone. If a chemical casing layer is to be constructed, the solid particulate set-up material is used which will coat the formation. However, if the mechanical characteristics of the rock and the formation are to be changed, a soluble set-up material is used. The soluble set-up material permeates and solidifies in the formation thereby changing the mechanical characteristics of the formation.

The chemical casing 60 also serves as a sealant to seal off the borehole 10A. A preferred chemical casing 60 seals the borehole wall 44 such that even gases can not penetrate the borehole wall 44.

Although the chemical casing 60 is preferably applied through nozzles in near bit reamer 28, the chemical casing 60 can be applied through nozzles in the bit. For maximum penetration, it is advantageous to apply the chemical casing 60 through nozzles in a modified near bit reamer 28 or a modified under-reamer with the nozzles directed toward the borehole wall to allow for maximum borehole wall penetration. As distinguished from a conventional bit where jets are more hydraulically focused downward, the nozzles adjacent the cutters on the reamer 28 or under-reamer are focused toward the borehole wall 44 thus applying the chemical casing 60 directly into the wall 44. Although it is preferred to direct the application of the chemical casing toward the borehole wall rather than the bottom of the well, it should be appreciated that the chemical casing may be applied through the nozzles in a conventional, anti-whirl or energy balanced bit. Chemical casing can also be applied with a modified brush apparatus, turbulator apparatus or applicator type device. It should be appreciated that the catalytic base material may be mixed with the drilling fluids 68 and then the set-up material selectively applied or not applied to a certain portion of the borehole section being drilled.

Chemical casing provides many advantages. It does not reduce the diameter of the wellbore 10. With chemical casing, the drill string may not need to be removed from the well while drilling the non-producing wellbore 10A. The casing chemicals may provide such a strong surface on borehole wall 44 that the borehole may be able to be drilled from the surface 14 to the formation barrier 16 using one string of casing. The chemical casing 60 can also form a barrier across multiple formations. Chemical casing allows the monodiameter non-producing borehole 10A to extend from the surface 14 to the reservoir barrier 16. A formation compatible chemical casing can allow the producing borehole 10B to extend through the producing formation 30.

Referring now to FIGS. 9D and 9E, once the chemical casing 60 has been applied to section 46 and the borehole back reamed, the downhole assembly 20 need not be pulled completely out of the borehole 10A and may be lowered back through the chemical cased section 46 to continue drilling the small diameter 48 borehole for next section 56 of borehole 10A, best shown in FIG. 9E. As the next section 56 is drilled, it may encounter another barrier 62. The back reaming step or chemical casing application is then repeated.

Referring now to FIG. 9F, additional borehole sections, such as section 66, may be back reamed and chemical cased as required to extend non-producing wellbore 10A from the surface 14 to the reservoir barrier 16. Thus, the steps of drilling with the SLICKBORE bit 24, back reaming with the near bit reamer 28 or chemical casing application device, and applying the chemical casing are repeated until borehole 10A reaches the reservoir boundary barrier 16.

Figure 9G:
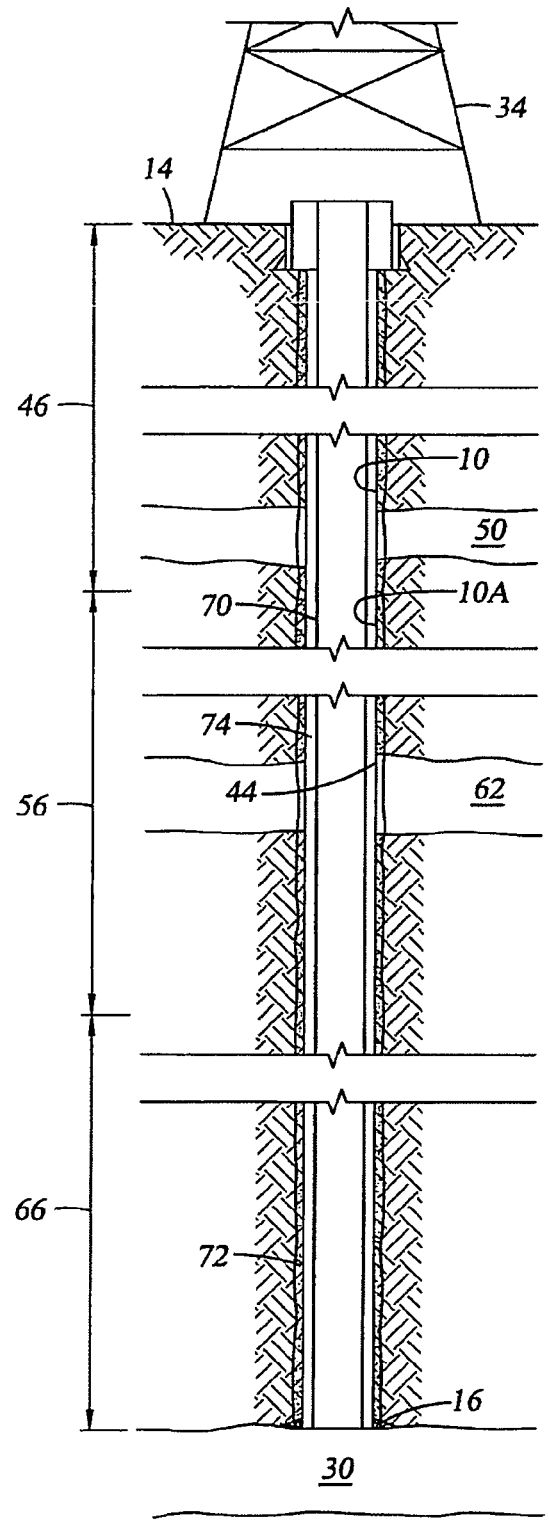
FIG. 9G is a schematic elevation view of the non-producing borehole for the monodiameter wellbore of FIG. 9F with metal casing installed.

Referring now to FIG. 9G, after drilling and back reaming borehole 10A, the monodiameter non-producing wellbore 10A is cased with conventional casing 70 extending from the surface 14 to the reservoir barrier 16 and then cemented into wellbore 10A by flowing cement 72 into the annulus 74 formed between casing 70 and wellbore wall 44. Although a metal casing, such as expandable casing, is preferred for casing 70, it should be appreciated that casing 70 may be made of a composite or fiberglass. The expandable casing can be expandable composite tubing, expandable metallic casing tubulars, or expandable metallic coiled tubing.

Further, the casing may be a string of expandable casing which extends from the surface 14 to the reservoir barrier 16. Patents related to expandable casing include U.S. Pat. Nos. 3,191,677; 3,191,680; 4,069,573; 4,976,322; 5,348,095; 5,984,568; and 6,029,748, all hereby incorporated herein by reference, and International Publication WO 98/22690. Published applications relating to expandable casing include Published U.S. Patent Application No. 20020060068 published May 23, 2002, now U.S. Pat. No. 6,725,919; Published U.S. Patent Application No. 20020060069 published May 23, 2002, now U.S. Pat. No. 6,739,392; and Published U.S. Patent Application No. 20020060078 published May 23, 2002, all hereby incorporated herein by reference. U.S. Pat. No. 6,470,966, hereby incorporated herein by reference, is related to methods and apparatus for expanding expandable casing. Other published applications relating to methods and apparatus for expanding expandable casing include Published U.S. Patent Application No. 20010045289 published Nov. 29, 2001, now U.S. Pat. No. 6,631,760; U.S. Patent Application No. 20010047866 published Dec. 6, 2001, now U.S. Pat. No. 6,561,227; Published U.S. Patent Application No. 20020074130 published Jun. 20, 2002, now U.S. Pat. No. 6,684,947; Published U.S. Patent Application No. 20020074134 published Jun. 20, 2002; Published U.S. Patent Application No. 20020084078 published Jul. 4, 2002, now U.S. Pat. No. 6,631,769; Published U.S. Patent Application No. 20020092657 published Jul. 18, 2002; Published U.S. Patent Application No. 20020096338 published Jul. 25, 2002; Published U.S. Patent Application No. 20020100593 published Aug. 1, 2002, now U.S. Pat. No. 6,631,759; Published U.S. Patent Application No. 20020100594 published Aug. 1, 2002, now U.S. Pat. No. 6,705,395; and Published U.S. Patent Application No. 20020100595 published Aug. 1, 2002; all hereby incorporated herein by reference. See also SPE 77612 entitled Reaching Deep Reservoir Targets Using Solid Expandable Tubulars by Rune Gusevik and Randy Merritt dated Sept. 29-Oct. 2, 2002. As discussed in greater detail below, in embodiments in which a metal casing is used, it is preferred to use expandable metal casing, in order to avoid any reductions in borehole diameter that would be necessary with conventional metal casing.

It is preferred that chemical casing 60 be used without metal casing during the drilling operation until all formation intervals are drilled from the surface to the formation barrier and that the chemical casing be used for production depending upon the formation. In the lower production borehole, chemical casing can be used with or without metal casing or liner. Chemical casing is used only as a temporary casing while drilling the non-producing borehole 10A and a permanent metal casing is installed in borehole 10A to serve as the production casing. The use of chemical casing 60 allows the monodiameter borehole 10A to be drilled without the installation of an intermediate metal casing so that a common diameter metal casing 70 can be permanently installed in the well bore for production after borehole 10A has been completely drilled. Thus the chemical casing 60 achieves the objective of avoiding several intermediate casing strings while drilling. Conventional intermediate casing strings cause a reduction in the diameter of the borehole. Chemical casing avoids having to set a metal casing for a section of borehole to reach the ultimate target formation.

The methods and apparatus described above are directed to drilling the well in one trip and installing the casing in the well all at one time. Such is particularly applicable to shallow wells, i.e., wellbores less than 1000 meters deep. A well only 2,000 or 3,000 feet deep may use conventional drill pipe to drill the well where the well only includes one or two formations. In using a conventional drill pipe, the concept of using expandable casing may still be used. Also the drill pipe may be expanded and used for casing.

The non-producing borehole 10A is preferably treated separately from the producing borehole 10B extending from the reservoir boundary 16 through the reservoir producing zone 30. The upper borehole 10A is cased off before drilling through the reservoir producing zone 30. The same is true with respect to barriers 50, 62 in that they are cased off at least with chemical casing before drilling further.

The sequential steps for constructing the monodiameter non-producing wellbore 10A will vary due to the numerous geological formations that must be penetrated to reach the production zone and the numerous drilling operations and required equipment that must be used to achieve the well plan for drilling and completing a well. The well construction sequential process described with respect to FIGS. 9A-G and 3 will vary depending on the circumstances of the well.

For example, regulatory agencies may require that the non-producing wellbore 10A be supported by metal casing as the borehole is being formed for the wellbore 10A, such as where the well is a deep well or where the borehole passes through several different formations or where the borehole passes through pay zones having different pressures or where the borehole passes through unstable formations, tectonic active zones, or a combination thereof. Such occurrences are more likely to occur in deeper formations where the wellbore will extend through several different formations. In such occurrences, the borehole being formed for the monodiameter well may need to be cased with metal casing as the drilling of the borehole progresses, as is hereinafter described.

It should be appreciated that the well may be drilled using expandable drill pipe. The drill pipe may be jointed pipe or coiled tubing. Cementing can be done conventionally down the drill pipe and back up through the annulus or cementing can be done by circulating down the annulus between the formation borehole and drill pipe and back up the flowbore of the drill pipe. The drill pipe can then be expanded. The bottomhole assembly is removed from the drill pipe either by snubbing pipe, coil tubing or wireline. The bottomhole assembly can also be permanently disposed at the bottom of the well and be cemented in the well. The drill pipe then serves as the casing. See U.S. patent application Ser. No. 10/262,136 filed Oct. 1, 2002 and entitled Apparatus and Methods for Installing Casing in a Borehole now U.S. Pat. No. 6,868,913, hereby incorporated herein by reference.

Referring now to FIG. 12, an alternative embodiment to that described with respect to FIGS. 3 and 9A-G, includes mixing the drilling fluid and chemical casing together into one system such that the drilling fluid/chemical casing mixture is used for drilling the borehole while simultaneously chemically casing the borehole. The drilling assembly consisting of a SLICKBORE and extended gauge bit is used with the drilling fluid/chemical casing composite fluid to achieve borehole quality for the monodiameter wellbore. The near bit reamer may or may not be present in the bottomhole assembly as it can be used in helping to achieve a smooth borehole and get the composite fluid mix deeper into the borehole. It should be appreciated that a SLICKBORE bit and near bit reamer may be used together to simultaneously drill and ream the borehole as the drilling assembly forms borehole 10A.

The components of the chemical casing 60 are mixed with the drilling fluids 68 passing down the flowbore of the work string 22. The drilling fluid containing the casing chemicals 60 passes through the bit 86 and up the annulus 42 formed between the work string 22 and borehole wall 44.

The chemicals in the chemical casing 60 solidify while drilling and thus avoid having to stop drilling or raise the downhole assembly 20 and work string 22 in the borehole 10A. Thus, drilling and casing are a continuous process. This continuous process of casing while drilling is preferably performed for the entire length of the non-producing borehole 10A from the surface 14 to the top of the reservoir barrier 16 in one trip into the well 12. Alternatively, the casing while drilling can be performed for a plurality of geological formations or it can be performed from the top of the well to target depth. Various chemical casing/drilling fluid composite systems can be applied during the drilling process of one wellbore with the chemical casing/drilling fluid composite system being adapted to the different formations through which the borehole is drilled.

The casing chemical 60 mixed with the drilling fluid 68 permeates the formation wall 44 surrounding the borehole 10A to chemically case the borehole 10A while drilling. The drilling fluid/chemical casing combination includes a glue composition which adheres or seals together the material making up the borehole wall 44 to provide structural support for the borehole wall 44. It is differentiated from other drilling fluids because conventional drilling fluids do not penetrate the formation and merely form a filter cake on the borehole wall 44 which peels and flakes off in a short time period. Composite chemical casing/drilling fluid will support and coat the borehole for a longer period of time than conventional drilling fluids. The casing chemical 60 also includes a borehole sealant which seals against casing leaks and penetrates into the formation around the earthen wall 44 to seal the formation.

An alternative embodiment to the combination of drilling fluids and chemical casing includes using the chemical casing as the drilling fluid such that the chemical casing, in its fluid form, is used for drilling the borehole while chemically casing the borehole. The chemical casing performs the functions of conventional drilling mud, such as cooling the bit and removing the cuttings. It should be appreciated that this embodiment also includes a bit drilling with a drilling fluids system that can stabilize the formation, i.e., the borehole wall 44.

Rather than applying the chemical casing while drilling, another alternative preferred method for chemically casing a monodiameter wellbore includes stopping the drilling after completing the drilling of a borehole section and applying chemical casing.

There are several techniques for applying the chemical casing 60. One technique includes pumping the catalytic base material down the annulus 42 formed by the drill string and bore hole wall with the set-up material being pumped down the flowbore of the drill string 22 and then mixed with the catalytic base material as the drill string 22 is raised in the borehole 10A and injected into the formation. The chemical casing may also be applied by first flowing the catalytic base material down the flow bore of the drill string 22 and then up around the annulus 42 followed by the set-up material which then permeates the formation and is activated by the catalytic base material.

Another technique of applying the chemical casing involves circulating the catalytic base material down the borehole and drill pipe annulus and retuning it back through the drill pipe/bit bore. Pressure is applied and the material actually squeezed into the formation.

Application of the composite drilling fluid/chemical casing and singular composites can be applied to the formation through devices which promotes the fluids to deeply penetrate the borehole formation wall using drilling "squeeze" devices.

Referring now to FIGS. 13A-13E, there is shown a still another preferred embodiment of the present invention. In this preferred embodiment, expandable casing 90 is used to case the borehole 10 rather than chemical casing. Although the non-producing wellbore 10A may be completely formed and then cased with expandable casing 90, alternatively each section of the borehole for non-producing wellbore 10A, such as borehole sections 46, 56, 66 shown in FIG. 13E, may be cased with expandable casing 90 after it has been drilled until the wellbore 10A has been completely drilled and cased with expandable casing 90. No chemical casing is applied in this embodiment. If large wash outs do occur during the drilling, it may be necessary to fill in the borehole walls prior to casing the borehole. A settable spot material may be spotted in the washed out areas and the expanded casing applied over it.

Since the chemical casing 60 is not used, it is preferred to use the SLICKBORE extended gauge bit or rotary steerable extended gauge bit combination and/or near bit reamer to insure that the borehole has sufficient quality for setting the expandable casing If the entire borehole 10A is to be drilled before it is cased, the expandable casing 90 is installed from the surface 14 to the reservoir barrier 16 of the well all at one time. Also, the downhole assembly 82 of FIG. 12 may be used to drill borehole 10A with downhole motor 84 and standard full bit 86. Thus the back reaming step of the embodiment of FIGS. 9A-G and 3 is no longer necessary, but can be performed. FIG. 13A shows borehole section 46 of borehole 10A having been drilled using a standard full bit 86.

However, preferably expandable casing 90 can be installed in stages where a section of expandable casing is installed after each section of borehole 10A has been drilled.

Where expandable casing 90 is installed in sections, the bit must pass through the previously cased section of borehole 10A and a full standard sized bit, such as bit 86, which had been used to drill the previous casing borehole, cannot be used since it will not pass through the previously installed section of expandable casing. Thus it is preferred to use a drilling assembly which includes overgauge hole drilling, such as a bi-center bit or a bit with winged reamer or a bit with an underreamer, each of which will pass through the previously installed section of expandable casing to then drill the same diameter borehole below the previously cased section of the borehole 10A.

While chemical casing is the minimum sealing mechanism by which the non-producing section 10A can be sealed prior to drilling the reservoir section, it is preferred that the upper borehole has been contained by one of the following: conventional casing, expandable casing, composite casing, expandable composite casing, coiled tubing or expandable coiled tubing. The bottomhole assembly of FIG. 9A may be used.

As distinguished from the method of FIGS. 3 and 9A-G, borehole section 46 is preferably cased with metal casing before the next borehole section 56 is drilled. FIG. 13A shows an expanded upper section 92 of expandable casing 90 installed within borehole section 46 of non-producing wellbore 10A.

It should be appreciated that the uppermost section of casing in borehole 10A may be a string of conventional casing that requires no expansion except any overlapped portion with a next casing 94. The first casing string may be conventional casing that has been cemented in place within the borehole using conventional cement. The cement 108 in the bottom of the initial string of casing is drilled out and a borehole with the same diameter is further drilled into the well. A section of expandable casing 90 is then installed in the newly drilled borehole by passing that casing through the upper length of conventional casing.

The expandable casing 90 is cemented into place within wellbore 10A. If the expandable casing 90 is installed from the surface 14 to the reservoir barrier 16 of the well all at one time, then the entire casing string is cemented at one time. If the casing 90 is installed in stages where a section of expandable casing is installed after a length of borehole 10A is drilled, then each section of expandable casing 90 will be cemented after it has been installed in the newly drilled section of borehole. However, when certain sections of the borehole 10A must be supported as the borehole is drilled, then the expandable casing 90 is installed in sections to stabilize the borehole wall 44 as sections of borehole 10A are drilled.

Figure 13B:
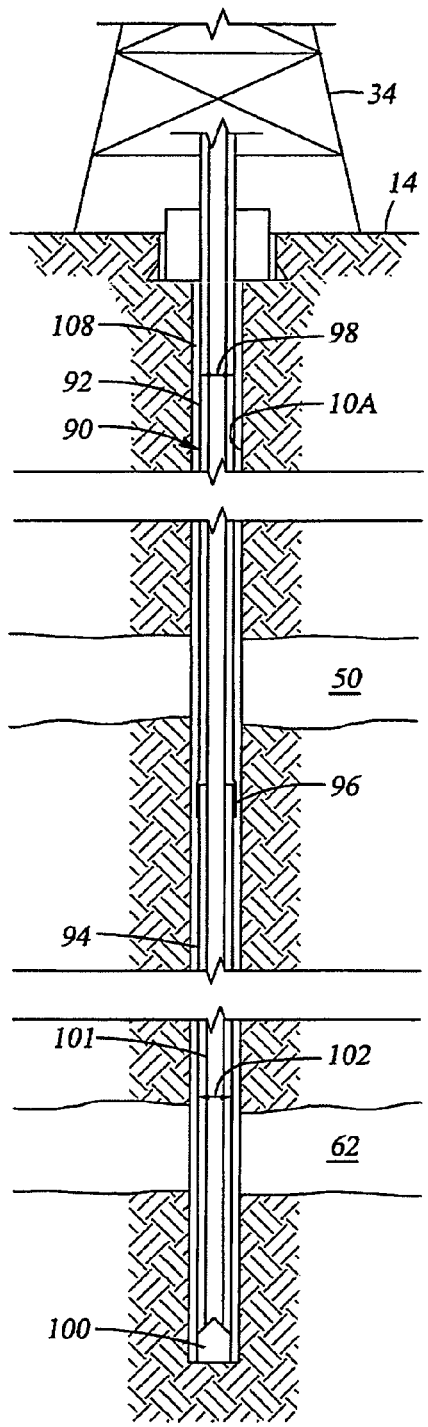
FIG. 13B is a schematic elevation view of another section of non-producing borehole for a monodiameter wellbore having been drilled and with a next section of expandable casing in the unexpanded position disposed within another borehole section.

Referring now to FIG. 13B, an additional borehole section 56 of borehole 10A is drilled. After borehole section 56 has been drilled, a next section 94 of unexpanded expandable casing is then run through upper casing string 92 and is shown in the process of being installed in borehole section 56. Regular casing may be used and expanded as the expandable casing 90. The inside diameter 98 of expanded upper section 92 is greater than the outside diameter 102 of unexpanded next section 94. Next casing 94 has a diameter 102 which is slightly nominal less than the diameter 98 of upper casing 92. The amount of the expansion of the casing 90 will depend upon its size and weight. Typically the expansion is between 10% to 20% of the diameter of the expandable casing diameter, and preferably 20%. Next section 94 can therefore be lowered through the upper section 92 such that preferably there is an overlap 96 between the lower end of upper section 92 and the upper end of next section 94.

Figure 13C:
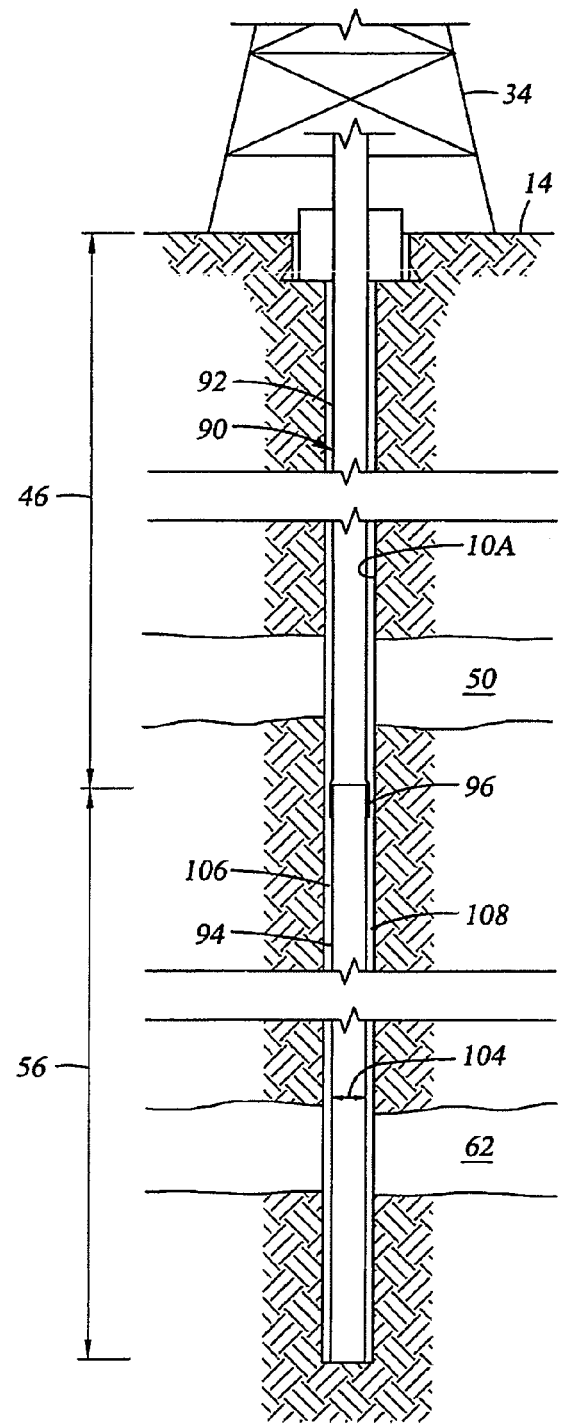
FIG. 13C is a schematic elevation view of the another section of expandable casing expanded and cladded to the initial section of expandable casing.

Referring now to FIG. 13C, once the next section 94 is in place as shown in FIG. 13B, a piston, pig, wedge, cone, or plunger 100 on a work string 101 is disposed within next casing 94 and is hydraulically actuated and passed through unexpanded next section 94. As the piston 100 moves through the flowbore of next section 94, next section 94 is expanded to an expanded diameter 104 which is substantially the same as the expanded diameter 98 of expanded upper section 92. The piston 100 may pass upwardly from the bottom of the casing 94 or may pass downwardly from the top of the casing 94. The casing 90 is expanded along its length as the piston 100 is pumped through the expandable casing string. Thus each new length of expandable casing 90 is expanded such that it has the same diameter as the previous installed length of expandable casing. The piston 100 may travel all the way back up to the surface 14 or only travel through the expandable casing 90 and then be drilled out.

Piston 100 need not be removed from the expandable casing 90 if it is made from a composite and can be drilled out. The work string 101 is disengaged from the piston 100 and a bit is run through the expandable casing 90 to drill out piston 100. If piston 100 is pushed downwardly through the expandable casing 90, piston 100 is made of a composite and then is drilled out for the next section of borehole to be drilled. It is possible that piston 100 cannot be removed and thus needs to drill it out. If the piston is a composite, this gives flexibility if the piston gets stuck.

It should be appreciated that expandable casing 90 can be set or run by various means such as by using pressure, mechanical, hydraulic, electrical, thermal, and/or cryogenic methods. The running of the expandable casing 90 may also be enhanced by friction reducing agents in-situ or coated.

The adjacent overlapped ends of sections 92, 94 are cladded together by a sealant. When the next section 94 of expandable casing 90 is run into the well 12, the overlapping portion of section 94 includes a sealant 95, best shown in FIG. 13D, around the upper end of the new section 94 of expandable casing 90. When the new section 94 is expanded and the overlapping portion of section 94 is expanded outward, the sealant 95 is activated to seal the cladded portion. It should be appreciated that a sealant is not always used.

Figure 13D:
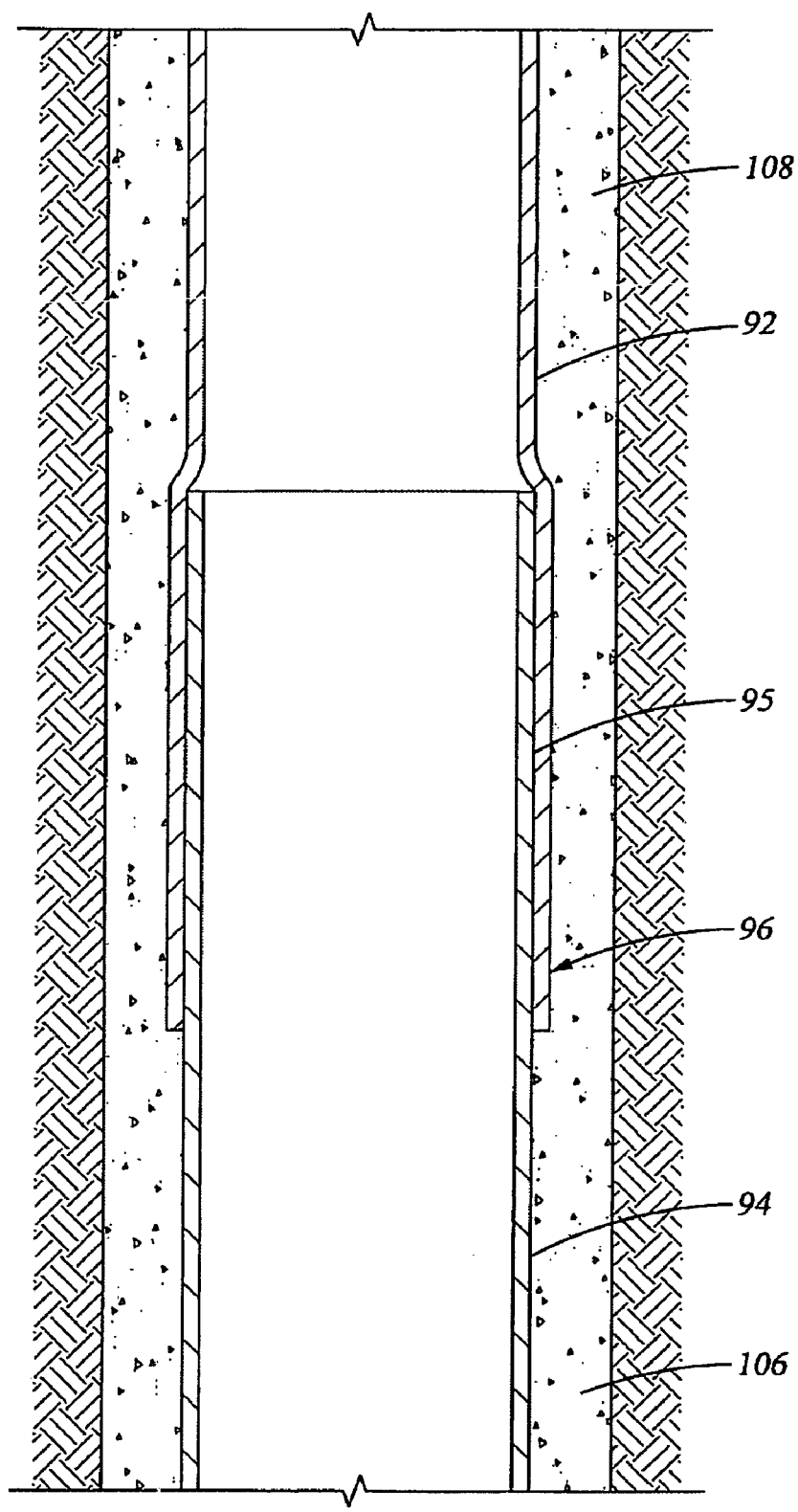
FIG. 13D is an enlarged view of the overlapped portion of the adjacent sections of expandable casing of FIG. 13C.

Referring now to FIG. 13D, overlap 96 is enlarged. The upper end of next casing section 94 is affixed to the lower end of upper casing section 92 by the expansion of the upper end of next casing section 94 inside of the lower end of upper casing section 92. As the piston 100 passes through overlap 96, both the lower end of previously expanded casing section 92 and the upper end of next casing section 94 are expanded such that overlap 96 also has a diameter common to that of expanded sections 92, 94. The overlap 96 between sections 92, 94 of expandable casing 90 is flattened out to reduce any restriction in diameter between the sections 92, 94 of expandable casing 90 such that the two sections of expandable casing 92, 94 are substantially same inner diameter. Preferably the sections 92, 94 of expanded casing 90 each have an inside diameter which is within a couple of millimeters of the common diameter of the over length of casing 90. Special attention is paid to the over all tensile strength of the casing, the overall loading of the casing, and the potential casing wear that the casing must withstand during the well construction process.

The annulus 106 between the new section 94 of expandable casing 90 and borehole wall 44 is more narrow than in conventional wells. The annulus 106 is preferably at least one inch and no more than 3 inches. It is preferred to have at least a one inch clearance to allow an adequate flowpath for the cement 108. Cement 108 is pumped down through the flowbore of the expandable casing 90 from its upper end and then around its lower terminal end and up the narrow annulus 106. The cement 108 then is pumped into the annulus 106 very slowly. The cement 108 preferably includes more sealant than regular cement. In the initial section of expandable casing 92, any fluid in advance of the cement 108 will be pushed up through the annulus 106 and back to the surface 14. The cementing can be done in the reverse direction as well. If the upper section 92 of expandable casing 90 has already been cemented in place, the new section 94 is cemented in place by causing the new cement to force any column of drilling fluids in the annulus to pass between the overlapped portions of the casing 92, 94 (before expansion and cladding) and/or be forced out into the formation around the borehole wall 44. The cementing can also occur after all sections of expandable casing 90 have been installed.

To minimize the diameter of non-producing wellbore 10A to be drilled, a minimal clearance, such as one inch, is provided for the annulus 106 formed between expandable casing 90 and the borehole wall 44 of the wellbore 10A. Therefore it is preferred to use a resilient polymer, resilient polymeric cement, or foam cement to cement casing 90. Compositions suitable for use in this manner are disclosed in U.S. patent application Ser. No. 10/006,109 filed Dec. 4, 2001 entitled Resilient Cement, now U.S. Pat. No. 6,668,928, hereby incorporated herein by reference and U.S. patent application Ser. No. 10/177,568 filed Jun. 21, 2002 entitled Methods of Sealing Expandable Pipe in Well bores and Sealing Compositions, now U.S. Pat. No. 6,722,433, hereby incorporated herein by reference. Also see U.S. Pat. Nos. 5,873,413; 5,875,844; 5,957,204; 6,006,835; 6,069,117; 6,244,344; all hereby incorporated herein by reference.

Other patents relating to expandable casing and chemical casing include U.S. Pat. Nos. 4,716,965; 5,366,012; 5,667,011; 5,787,984; 5,791,416; and 6,085,838, all hereby incorporated herein by reference.

Referring now to FIG. 13E, a section of expandable casing 90, such as sections 92, 94, 110, as for example, are installed after a section of non-producing borehole 10A, such as borehole sections 46, 56, 66, is drilled such that expandable casing 90 is installed in stages. Additional sections of borehole are then drilled, such as through another barrier 63, with additional lengths of expandable casing 90 installed, expanded and affixed to the expandable casing section above it. This is repeated until the non-producing borehole 10A is completely cased with expandable casing 90. The resulting borehole has substantially the same size diameter throughout its length so as to provide a common borehole diameter from the surface 14 to the reservoir barrier 16.

With drilling the borehole in sections and then casing it in sections, expandable casing 90 is used rather than conventional concentric casing to avoid significantly reducing the inner wellbore usable space for production tubing. It is preferred to drill and case the well in sections using expandable casing 90 so as to better control drilling through the different formations (if it is required from a fracture gradient standpoint) rather than drilling the borehole 10A all at one time and then installing a expandable casing or conventional casing. As the casing 90 is installed one section at a time, the expandable casing provides mechanical strength to the previously drilled borehole where otherwise the borehole wall 44 may not hold while attempting to drill the entire borehole at one time.

Expandable casing 90 not only achieves a substantially common inside diameter but also provides a substantially common outside diameter disposed in the monodiameter non-producing wellbore 10A. If casing of different diameters is used to case the monodiameter wellbore 10, different sized boreholes would have to be drilled and thus prevent a monodiameter wellbore. As mentioned above, this is undesirable for a variety of reasons, included the resulting need for a larger volume of drilling fluid. Expandable casing 90 allows a constant nominal casing diameter across multiple formations to produce a monodiameter non-producing wellbore. Thus, expandable casing 90 maintains a constant diameter when the well must be drilled in sections.

It is desirable to increase the weight of the drilling fluids (mud) as the borehole is drilled deeper. If the borehole extends through a low pressure reservoir and ultimately through a high pressure reservoir, drilling fluid will tend to flow into the low pressure reservoir. Thus the low pressure reservoir must be cased and sealed off to prevent the loss of drilling fluid. For example, This requires the drilling mud weight to be increased from a 8 pound mud to a 9 pound mud or some increased mud weight. Chemical casing or expandable casing or both may used in each borehole section to isolate and seal off low or high pressure formations. Once the casing is set across the upper or lower pressure formation, then the drilling mud, such as a 8 or 9 pound drilling mud, can be increased in density to a 10 or 14 pound drilling mud to put more pressure on the high pressure formation. The extra mud weight prevents any blowout of the higher pressure formation. The objective is to maintain borehole stability, keeping the formation intact and not falling in or fracturing.

Additional description of expandable casing in a monodiameter well may be found in "The Reeled Monodiameter Well," by Pointing, Betts, Bijleveld, and Al-Rawahi of Shell International, SPE 54508 May 25-6, 1999 and in "Towards a Mono-Diameter Well," by Benzie, Burge, and Dobson of e2 TECH Ltd, SPE 65184 Oct. 24-5, 2000.

Referring now to FIG. 14, chemical casing 60 may be used in combination with expandable casing 90. In one embodiment, the chemical casing 60 is applied as described with respect to FIGS. 9A-G and 3. Using downhole assembly 20 with SLICKBORE bit 24, downhole motor 26, and near bit reamer 28, the SLICKBORE bit 24 drills an initial section 46 of borehole 10A with a drilling fluid 68, modified to include a catalytic base material for the set-up material of the chemical casing, passing through the work string to provide power to mud motor 26 and to remove cuttings up the annulus 42 formed by work string 22 and borehole wall 44. The drilling mud motor 26 in turn powers the SLICKBORE bit 24. The SLICKBORE bit 24 produces a small diameter borehole 48. The first section 46 of borehole 12 is drilled down to a formation barrier 50 using the modified drilling fluids (mud) passing through the mud motor 26 and bit 24.

Once downhole assembly 20 drills down through barrier 50, the arms 52 with cutters 54 on near bit reamer 28 are expanded to ream the borehole as the near bit reamer 28 is rotated and moved upwardly within the previously drilled non-producing borehole section 46 by work string 22 thereby back reaming and enlarging the borehole to a larger diameter 58. The reamer 28 also cleans and smooths the wall of the previously drilled borehole.

As the borehole is back reamed, chemical casing 60 is applied to the borehole wall 44 as reamer 28 passes upwardly through the borehole 10A. Chemical casing 60, in its fluid form, flows down the flowbore of work string 22 and through nozzles in reamer 28 to spray the borehole wall 44 with chemical casing 60 allowing the chemical casing 60 to penetrate and seal the earthen wall 44. Pressure forces the chemicals of the chemical casing 60 to flow and permeate into the formation surrounding the borehole wall 44. Thus, as the borehole is reamed and enlarged, the chemical casing 60 is applied while reaming. The solid chemical casing 60 seals and adheres to the formation and thus sets up to form a barrier around the borehole wall 44.

The chemical casing 60 supports section 46 of borehole 10A until a section of expandable casing 90 is installed in borehole section 46 such that the borehole 110A is cased both with chemical casing 60 and expandable casing 90. After section 92 is installed and cemented, the next section 56 of borehole 10A is drilled, back reamed and chemical casing applied. A next section 94 of expandable casing is installed, as described with respect to the embodiment shown in FIGS. 13A-E. Alternatively each section of the borehole for non-producing wellbore 10A, such as sections 46, 56, 66 shown in FIG. 13E, is drilled, back reamed and chemically cased and then a section of expandable casing 90, such as sections 92, 94, 110, installed until the wellbore 110A has been completely drilled and cased with chemical casing 60 and expandable casing 90.

Another preferred embodiment includes applying the chemical casing in sections for the non-producing wellbore 10A and then installing the expandable casing in one operation across all the sections.

Thus, one method of constructing a land based monodiameter wellbore in accordance with the present invention includes setting conductor pipe, setting structural casing and cementing the casing in place, drilling the formations utilizing drilling fluids (mud) and chemical casing, running expandable casing and cementing the expandable casing in place, and expanding the casing.

Although the preferred embodiment of FIG. 14 includes the application of chemical casing 60 during the back reaming of the small borehole drilled by SLICKBORE bit 24, it should be appreciated that the expandable casing 60 may be used with the embodiment described with respect to FIG. 3. The borehole 10 is drilled using a mixture of the drilling mud and chemical casing combined into one system such that the borehole is drilled while being chemically cased. Thus the drilling fluid 68 with the chemical casing 60 causes the casing chemicals to permeate the formation wall 44 surrounding the borehole 10A to case the borehole 10A while drilling. Since the drilling mud 68 is mixed with the chemical casing 60, the back reaming step of the embodiment of FIGS. 9A-H and 3 is no longer necessary but may still be utilized to insure the chemical casing is thoroughly deeply penetrated into the formation.

As described with respect to FIG. 14, a section of expandable casing 90, such as sections 92, 94, 110, as for example, are installed after a section of non-producing borehole 10A, such as sections 46, 56, 66, is drilled such that expandable casing 90 is installed in stages. Additional lengths of borehole are then drilled with additional sections or lengths of expandable casing 90 installed, expanded and affixed to the casing section above it. This is repeated until the non-producing borehole 10A is completely cased with expandable casing 90. It is preferred, if the drilling fluid/chemical casing can support the borehole, that the casing be installed as one complete casing string rather than installing the casing in stages.

An alternative embodiment to the use of expandable casing after drilling a borehole section using a mixture of drilling fluids and chemical casing includes using the chemical casing as the drilling fluid such that the chemical casing, in its fluid form, is used for drilling the borehole while chemically casing the borehole. The chemical casing performs the functions of conventional drilling mud, such as cooling the bit and removing the cuttings. It should be appreciated that this embodiment also includes a bit drilling with a drilling fluids system that stabilizes the formation, i.e., the borehole wall 44. As described with respect to FIG. 13E, a section of expandable casing 90, such as sections 92, 94, 110, as for example, are installed after a section of non-producing borehole 10A, such as sections 46, 56, 66, is drilled such that expandable casing 90 is installed in stages. Additional lengths of borehole are then drilled with additional sections or lengths of expandable casing 90 installed, expanded and affixed to the casing section above it. This is repeated until the non-producing borehole 10A is completely cased with expandable casing 90. It is preferred if the drilling fluid/chemical casing can support the borehole, that the expandable casing be installed in one complete casing string rather than installing the casing in stages.

In the previously described embodiments, it should be appreciated that the chemical casing 60 may be applied along the entire non-producing borehole 10A, along only one or more of the individual borehole sections, or along only a portion of an individual borehole section. Further it should be appreciated that the formulation of the chemical casing 60 may be varied according to the geology of a formation encountered in a borehole section. Thus the application and formulation of the chemical casing 60 is selective and elective for the various portions of the formation through which the borehole 10 extends.

Further, the selective and elective isolation of the borehole wall may be performed by various techniques using chemical casing and expandable casing. For example, a shale formation may be optimally isolated with expandable casing while a sandstone formation may be optimally isolated with chemical casing which can more easily permeate a sandstone formation. Thus, with both expandable and chemical casing available, a particular portion of the borehole 10 may be electively and selectively cased.

One of the advantages of using real time MWD and LWD measurements is to identify the particular formations through which the slick bore bit 24 is drilling in the borehole 10. Thus, once a borehole section is drilled and the borehole is being under-reamed, different chemical casings can be spotted across the different formations through which the borehole 10 extends. Even if the chemical casing 60 is being applied during the drilling of the borehole 10, the formations through which the borehole 10 extends may be known thus allowing the chemical casing formulation to vary as the bit drills through a particular formation. The formulation of the chemical casing 60 can then be varied for each different strata of formation through which the borehole extends 10. For example, one formation strata may be soft sand, another formation strata may be hard shale, and still another formation strata may be granite, each being chemically cased with a different chemical casing formulation or cased with expandable casing or both be chemically cased and cased with expandable casing.

Chemical casing 60 allows a borehole section to be drilled deeper or longer than in the prior art before a length of expandable casing need be installed to support the formation. If an excessive large number of expandable casing strings must be installed due to a large number of casing intervals, the large number of expandable casing strings will begin to reduce the borehole diameter. Chemical casing can be applied without tripping out the drill string. In installing the expandable casing, the borehole must be treated and then the expandable casing set, cemented, and expanded. Expandable casing cannot be installed while drilling. Drilling must be stopped and then resumed. Thus, there is a substantial cost savings in using chemical casing to extend the borehole interval. The chemical casing provides a temporary support of the formation so that the length of expandable casing to be installed can be maximized. Thus, chemical casing allows the borehole to be drilled deeper before a length of expandable casing has to be set in the borehole.

It should also be appreciated that the chemical casing 60 may not extend the entire length of the borehole 10. One of the limitations of chemical casing is temperature. Once a predetermined temperature is reached, certain chemical casings can no longer be used and expandable casing must be used. Once the borehole reaches a certain depth where the down-hole temperature exceeds the limitations of the chemical casing, expandable casing is used. Thus, traditional chemical casing may only be applied in those borehole sections where conventional intermediate casing might otherwise be used. Higher temperature rated chemical casing materials can be used and applied in higher temperature wellbores. Therefore, typically, the chemical casing extends to the formation barrier 16.

For example, if the borehole temperature exceeds the limits of the chemical casing prior to reaching the formation barrier 16, the chemical casing will stop at the depth where the borehole temperature exceeds the limits of the chemical casing and the remainder of the borehole, down to the formation barrier 16, will be cased using a higher rated chemical casing or expandable casing if required. A production liner, such as a production string, may be set at the formation barrier 16 and extend down through the target formation. Where the chemical casing is not available, only expandable casing may be used.

The number of expandable casing sections which must be installed into the wellbore is dependent upon having a consolidated formation or consolidating the formation to prevent sloughing into the wellbore and to prevent fluids from one formation from commingling with fluids in another formation. It is also preferred to drill as long an interval as possible to reduce costs. Thus, it is preferred to use chemical casing and chemical solutions to permit the drilling of longer intervals. In particular, chemical casing not only may consolidate an unconsolidated formation but also may provide a hard inner wellbore wall which will prevent the commingling of fluids from adjacent formations and thus allow the drilling of a longer interval and the reduction of the number of expandable casing sections. One or more chemical casings can reduce the number of expandable casing sections. Thus, where chemical casing will prevent the commingling of fluid between two formations, additional sections of expandable casing are avoided. The chemical casing consolidates and hardens the borehole wall long enough to allow the drilling of a longer interval before the installations of expandable casing. The objective is to use one or more chemical casing sections to lengthen the interval required for one expandable casing.

Figure 15:
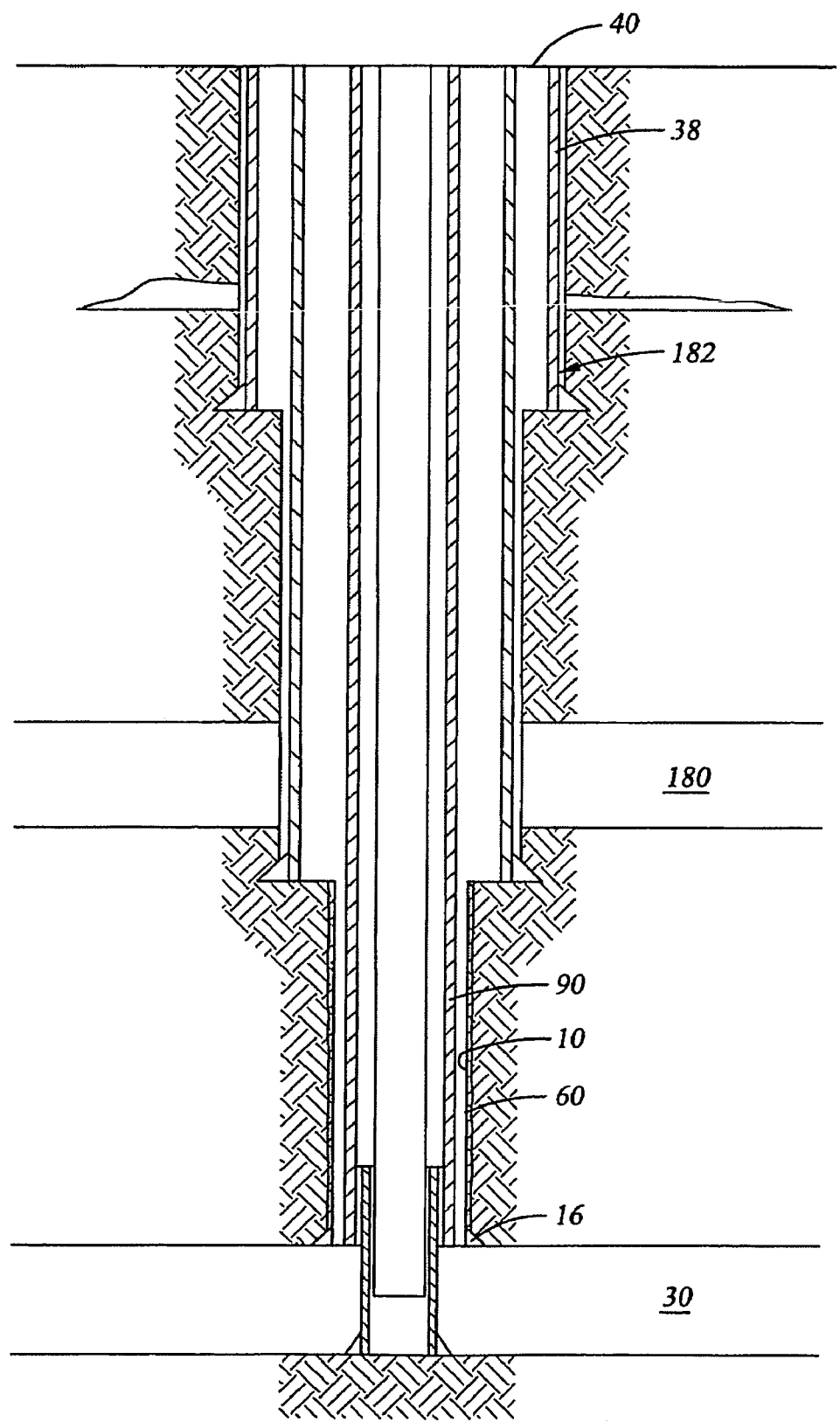
FIG. 15 is a schematic elevation view of a monodiameter wellbore combined with a structural casing.

Referring now to FIG. 15, there is shown still another embodiment of the present invention. In FIG. 15, the monodiameter wellbore 10 passes through a salt formation 180. Regulatory agencies may not allow only one casing to pass through multiple formations and thus require an additional casing 182. Regulatory agencies are concerned with the commingling well fluids from a producing formation with well fluids in another producing or non-producing formation. They also concerned with mixing salt with a producing formation or commingling hydrocarbons from two different producing formations. Thus, regulatory agencies may require a double barrier to the formations to ensure that the mixing of formations does not occur.

The casing system of FIGS. 13A-E is shown for the well in FIG. 15. Although the expandable casing 90 and the chemical casing 60 form barriers across multiple formations, a structural casing 182 may be used to form an additional barrier across the formation. Structural casing is casing used to support the wellhead and carries the load of the wellhead. It has a thicker wall and provides a stable support frame for the wellhead whether it be subsea or land operations.

In wells extending through a salt formation, such as in the Gulf of Mexico, the structural casing 182 may be extended from the wellhead 40 typically a few hundred feet, to serve as a support for the wellhead. The structural casing 182 may be a conventional casing or an expandable casing. Further, it is important that the casing 90 maintains its integrity. An outer casing may be placed through the salt formation to protect the primary wellbore casing from salt corrosion and possible damage.

A drilling template is set on the sea floor 14. Casing is set to penetrate through the mud line, such as conductor casing 38 and is cemented in place. This may be 36 inch diameter pipe. The 13-⅜ structural casing 182 is then set and cemented in place. Casing strings are then set across the formation or a drilling hazard zone, such as salt formation 180. The borehole is then drilled utilizing drilling fluids and/or chemical casing. The expandable casing then is run, cemented in place, and is expanded. This process is repeated. Finally, the casing string then is set to the top 16 of the reservoir 30.

The wellbore 10 and borehole for the structural casing 182 may be drilled with chemical casing and then completed with expandable casing. It is preferred that the structural casing is not expandable. However, the structural casing 182 need not be chemical casing and expandable casing. The inner casing 90 can be chemical casing and expandable casing, or it can be conventional or composite casing. The outer casing 60 can be expandable casing or conventional casing Another casing can provide a second barrier across the salt formation 180 due to the requirement that the well have at least two pressure barriers. Although it is an objective of the present invention to limit the number of casing strings extending into the well, certain formations must be closed off, such as salt formation 180, and therefore an additional barrier may have to be installed.

If, for example, there was a second salt formation between salt formation 180 and reservoir 30, the barrier casing 182 could preferably extend through both salt formations to close them off from the wellbore 10. A liner in the barrier casing 182 could be used to close off a lower salt formation by hanging the liner adjacent the end of barrier casing 182. It is preferable however to extend the barrier casing 182 through both formations.

The structural casing can be pile driven or suction driven down rather than traditionally drilled. In this case, case and drill operations can be applied creating this outer casing structure.

In the MONOWELL, formation evaluation occur primarily during the drilling rather than later. Formation knowledge is maximized at the onset so that an operator can better handle bore-stability issues or completion issues. In the upper borehole, the bit should travel the optimum wellpath. Also, evaluation for designing the optimum completion is done. The bottomhole assembly preferably includes taking pressure while drilling, vibrations, tortuosity, lithology characteristics, faulting (fracturing) characteristics, and drilling measurements that allow the wellpath to be re-evaluated in real-time while drilling. This data is integrated with the reservoir and geomechanics models so that decisions can be made that result in the construction of an optimal MONOWELL. These decisions are focused on the following areas: optimum pathway to optimum reservoir recovery; quality borehole; borehole stability; mud management including ECDs; bottomhole assembly reliability, borehole management (knowledge of where and when to apply borehole-strengthening materials and reservoir completion optimization), formation damage, formation productivity, and other related areas.

Across the completion section, the bottomhole assembly takes on the additional requirements of defining the reservoir so that an optimum completion is executed. Therefore, the reservoir is evaluated from both a petrophysical and productivity viewpoint. For the monodiameter/monobore, the best formation evaluation includes measurements using sonic or nuclear magnetic resonance (NMR) tools because they provide information about: porosity, permeability, fluids identification; producibility, fluid distribution, oil quality, pore pressure, seismic time-depth correlation, gas detection, rock mechanical properties, and fault and fracture detection.

A sonic tool is also recommended in the upper borehole 10A because borehole stability and mud and cementing casing designs may be improved by data on the following: pore pressure, seismic time-depth, gas detection, fault/fracture detection, and rock mechanical properties. The sonic tool provides the information about when to apply expandable casing, material for drilling ahead, chemical casing material, and a specially formulated drilling fluids system for the particular formation drilled. Across the reservoir, the combination of sonic and nuclear magnetic measurements allow the following to occur: optimal screen or liner placement across the formation; borehole stability in relation to perforations and longevity of the completion; perforating orientation; stimulation selection (if required); completion design with regard to future potential required conformance; and quality of borehole that contributes to better completion execution and in the long run better production.

The MONOWELL completion begins with the drilling of the reservoir section. Optimum well performance and reliability are the primary focus. Ultimately, borehole quality leads to better production. Drilling the borehole with a matched mud motor and bit, and underreaming the hole in the same trip, allows a smooth wellbore to be achieved with minimum formation damage. The initial bit penetration has the most concentric cutter contact, while the follow-up underream provides a smooth wellbore. The drilling fluid impacts the borehole quality and overall well productivity. A drilling-completion fluid that basically "seals" the formation minimizes fluid losses, provides a conduit for installation of the borehole structural support, and provides effective wellbore production delivery. These methods lead to better wellbore formation evaluation and borehole support-structure installation, whether used with a conventional liner or expandable liner or screen.

The fluids used while drilling through the lower producing zone protect the reservoir and minimize fluid losses for maximum well productivity. Washouts are minimized because long-term well productivity, along with formation evaluation, is generally affected. Reservoir drilling fluids such as brine fluids, carbonate fluids with in-situ acid breakers, and clay-stabilization fluids stabilize the monobore/monodiameter wellbore with the least formation damage.

The lower producing zone is drilled with real-time formation evaluation so that exact placement of the completion equipment can be modified while drilling is still ongoing, minimizing downtime associated with replanning the completion after logging. For example, blank sections and external casing packers (ECPs) may be added because of stratigraphy or fluid-contact deviations from what was originally planned. Additionally, potential conformance issues are considered.

The union of the monodiameter and monobore design parameters converge at the lower producing zone. The monodiameter design strives to reduce the wellbore sizing but the monobore design strives to maximize the reservoir exposure and the well's productivity. Using the expandable liner hanger can allow this union to occur. From the liner hanger to well total depth (TD), expandable liners, expandable screens, traditional liners, traditional screens, other nonmetallic liners or fluid/proppant solutions (i.e. resins) can be used depending on the current and future requirements of the reservoir. The primary objective is to simultaneously optimize both the inflow performance and the tubing outflow performance.

In unconsolidated sandstone formations, expandable screens can provide the greatest uniform reservoir exposure and have reported some of the greatest benefits. Expandable sand screen development and deployment have benefits that include: reduction in spot erosion locations, increased borehole access for interventions, increased borehole for well deliverability, increased production rates (due to more efficient perforation packing), and more reliable complex horizontal gravel packing.

If the producing formation is a carbonate, which is a hard rock or a hard sandstone such as one having 0.1 millidarcy, then a monodiameter borehole can be achieved. If, however, the producing formation is an unconsolidated sand, such as one requiring gravel packing, where for example the formation has 2 darcy, then a chemical casing or internal breaker drilling/completion fluid and expandable screen may extend across the formation. This may or may not require perforation. It is also possible to merely go in and frac pack the producing formation. It also means that the diameter through the producing formation would be reduced. Multiple screens extending across the producing formation causes the wellbore to be narrowed through the producing formation.

Chemical casing may be used in the lower borehole extending through the producing formation so long as it does not permeate or extend too far into the formation so as to damage the reservoir. It is important to achieve a very tight, low fluid loss across the producing formation. If chemical casing or regular cement are used through the lower borehole extending through the producing formation, then it is to be perforated.

Halliburton has chemicals which solidify the lower borehole wall extending through the producing reservoir and still allow well fluids to be produced through it. Such chemicals may be placed in the lower borehole extending through the producing formation without requiring perforation.

One type of chemical is a conductivity enhancer allowing hydrocarbons to be produced through the lower borehole wall. The conductivity enhancer remains on the borehole wall and then an expandable screen is set across the producing formation. The conductivity enhancer is a different type of chemical casing such that it consolidates and solidifies the formation but does not require perforation and will allow the production of fluids through it. The conductivity enhancer is a substitute for chemical casing or cement. One conductivity enhancer includes a calcium carbonate fluid that has internal breaker stimulants and which is used with expandable screens. The conductivity enhancer can be used while drilling with a liner or screen and then expanding and leaving the liner or screen in the borehole. Drilling may be conducted through the liner which may or may not include a screen on its lower end. Typically the liner is a solid tubular and is perforated to produce the well.

The MONOWELL may be considered for any well because of the benefits of the smaller upper support structure and maximum well delivery conduit. Initial completion is achieved with coiled tubing (or wired composite tubing) for possible placement of the tubulars, proppant and screen. While this method is traditionally not used today, using it may generate additional savings because the larger rig can be released when the reservoir drilling and completion begins. Also, the large rig may be released when the initial chemical casing or nested expandable borehole is installed for the upper borehole. The coiled tubing unit or wired composite tubing may be used to install the tie-back (secondary barrier).

Figure 16:
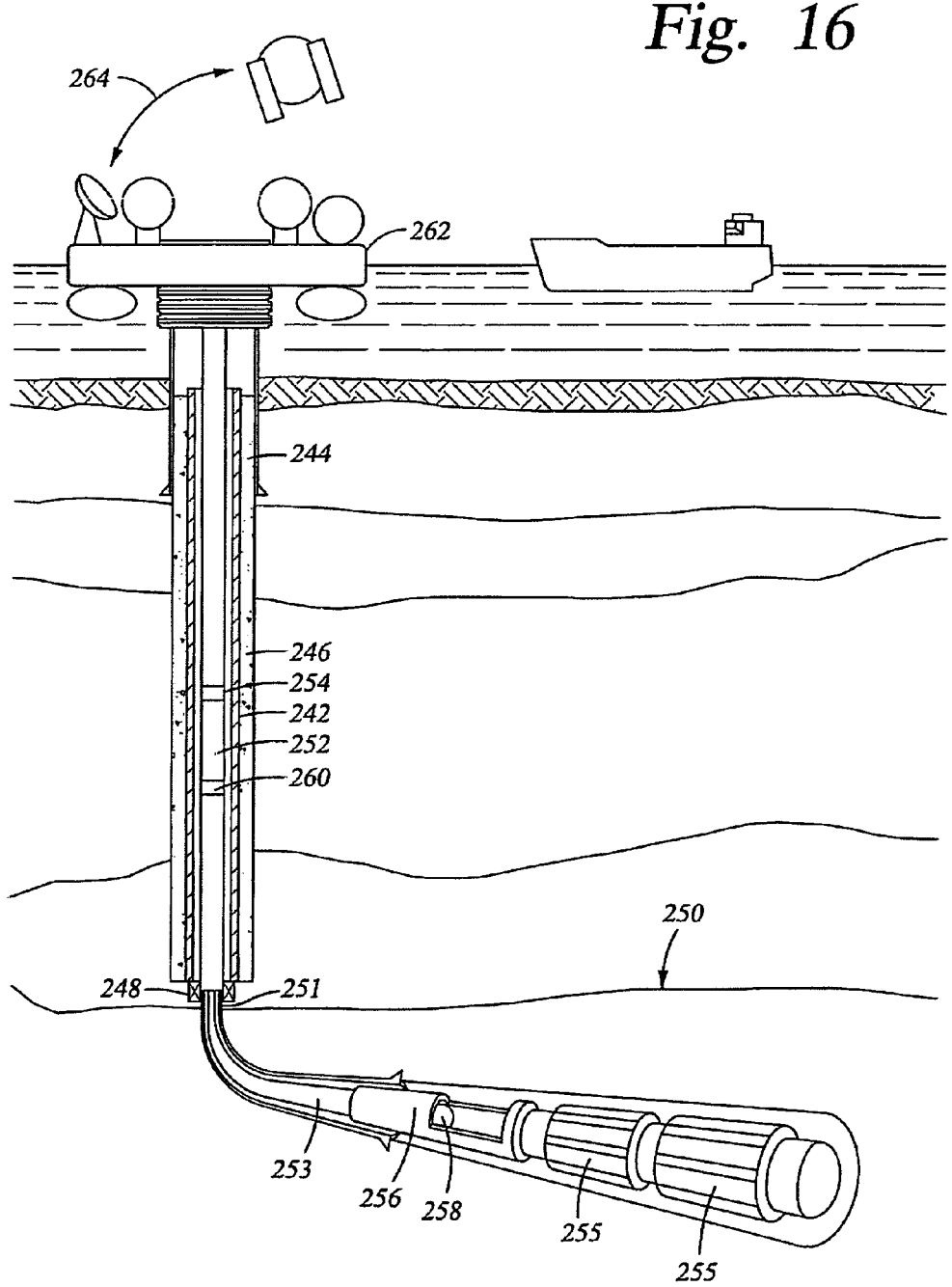
FIG. 16 is a schematic of a MONOWELL completion with tubing in the upper borehole having the same inner diameter as the liner extending through the reservoir.

Referring now to FIG. 16, there is shown a completed well. An expanded casing 242 is shown cemented at 244 into the monodiameter wellbore 246. A packer 248 is set at the lower end of a completion string 250. An expandable liner hanger 251 supports a liner 253 having a plurality of screens 255 on its lower end. The drilling fluid has an in-situ breaker. The completion equipment 250 for completing the well includes a completion string 252 which is fullbore to complete the final delivery of an optimized well architecture. Depending on the location, safety and environmental concerns, as well as governmental regulations and the reservoir, the completion equipment may include fullbore safety valves 254, reservoir-pressure monitoring 256, shutoffs 258, fullbore nipples 260, measurements, evaluation, and various other devices.

Smart wells are considered for long-term cost reduction by being able to manage the reservoir at the sandface. Smart wells include sensors and conductors for transmitting to the surface the data and information measured and collected by the sensors. The conductors may be electrical wires, fiber optics, hydraulic, or other type data conductors. Fiber optics are able to provide data and information to the surface. For example, fiber optics may be used to measure downhole temperature and pressure and transmit those measurements to the surface real time for well control. Smartwells can provide this as well as be able to control various reservoir fluids and zones. Additionally, smart well installation can be integrated with the wired composite coiled tubing for long-term real-time reservoir dynamic process monitoring and management. See U.S. Pat. No. 6,257,332 issued Jul. 10, 2001 entitled Well Management System, hereby incorporated herein by reference. More details on drilling and completing composite coiled tubing units are set forth hereinafter. Preferably conductors are embedded in the wall of the composite coiled tubing to transmit real time data and information to the surface for analysis and processing. Fiber optics may be preferred since fiber optics can transmit more data than electrical conductors and have more data across the entire reservoir interval rather than merely data at a localized position. Production flows to a floating mini production satellite unit 262 having a communications system 264 for sending data and other production information to a central location. It should be appreciated that the conductors include electrical, fiber optics, and any other means by which information or instrument commands can be delivered. Commands and data transmitted from completion or drilling devices may be transmitted by acoustic, vibrations, hydraulic, radio frequency, short or broad band, or any other energy mechanism. For example, based on the data and information of the sensors, completion devices may be opened, closed, adjusted or otherwise manipulated by means of commands or signals transmitted to the devices through the conductors.

Figure 17:
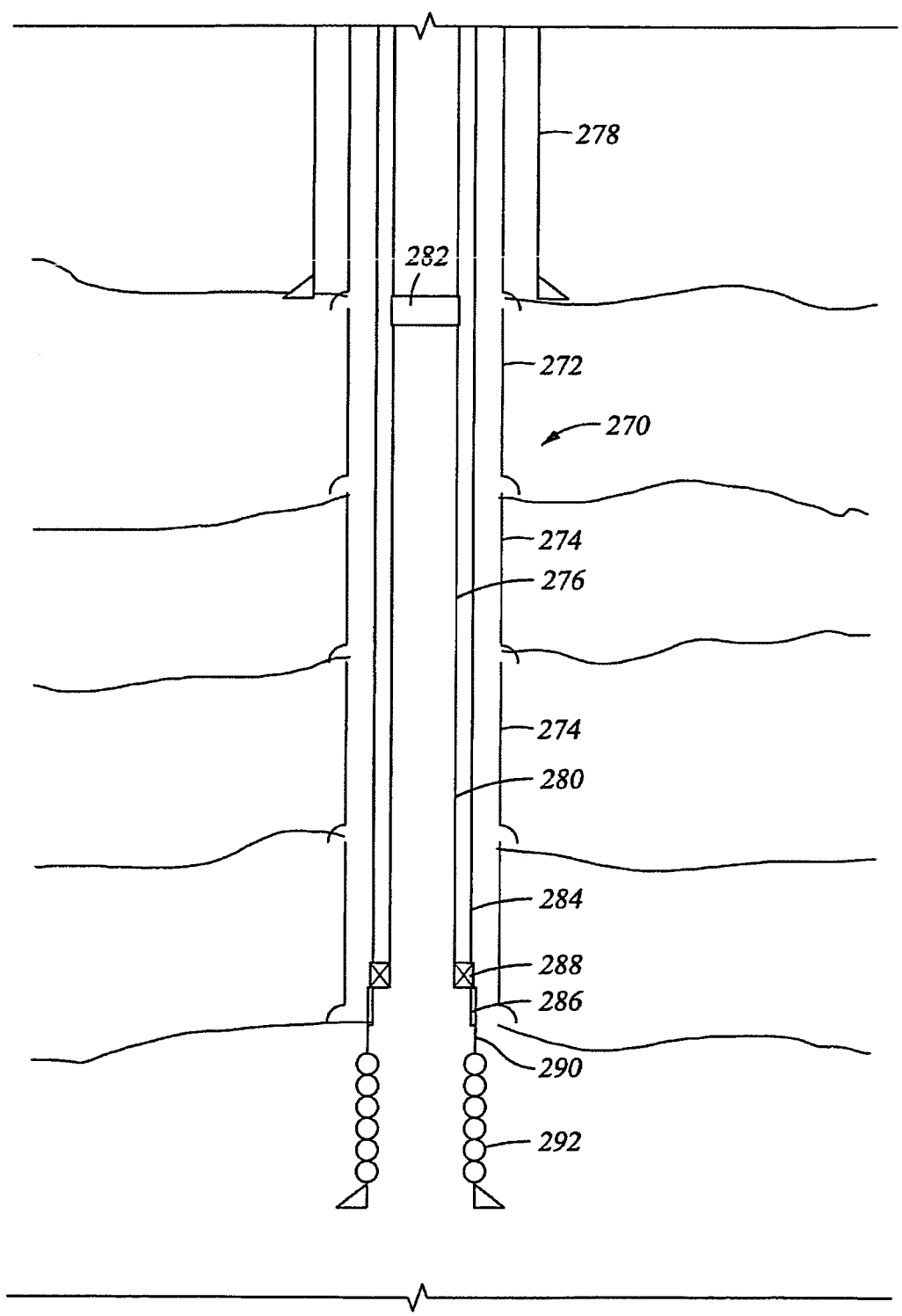
FIG. 17 is a schematic of a MONOWELL with nested expandables in the upper bore having mechanical solutions and an expandable liner hanger and with a gas tight expandable liner and expandable screens extending through the reservoir.

Referring now to FIG. 17, there is shown a MONOWELL 270 having a monodiameter 272 with nested expandable casings 274. The upper borehole has a plurality of expandable sections. A secondary barrier, in the form of a traditional casing tie-back 284, may be installed within the monodiameter 272. A structural pipe 278 has been installed. A fillbore delivery system 280 with tubing 276 having a full bore safety valve 282 is disposed within casing tie-back 284. Mechanical solutions and expandable liner hanger 286 below a packer 288 are used. For the reservoir, the liner hanger 286 supports a gas tight expandable liner 290 with expandable screens 292.

The monodiameter, monobore, and MONOWELL of FIG. 17 are achieved by drilling and casing one formation section at a time sequentially. Nested expandable casings 274 and gas-tight production liners 290 are used for achieving the monodiameter. The nesting of the expandables permits the use of a second or third-generation semisubmersible where the well is constructed in a deepwater environment.

Figure 18:
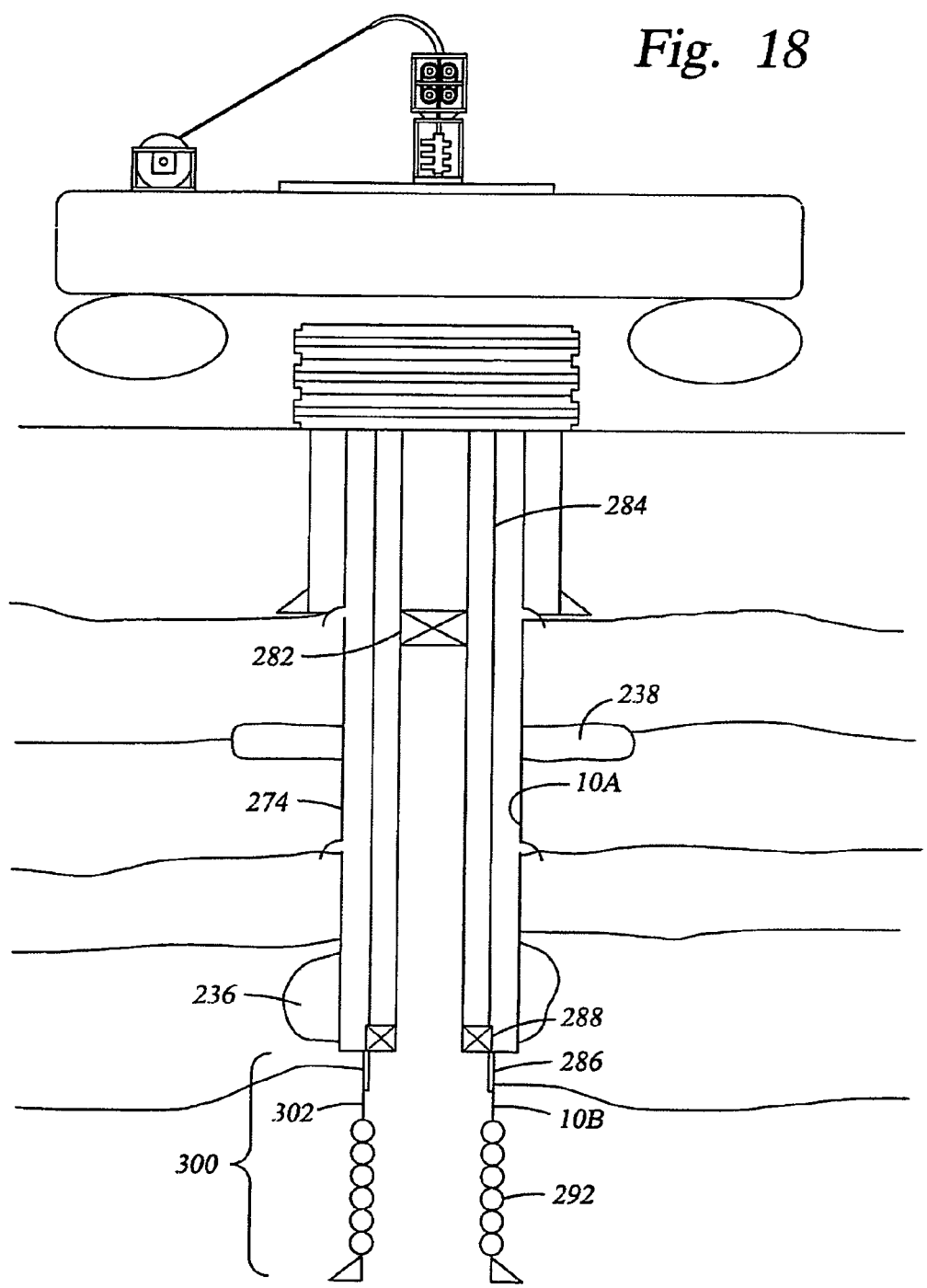
FIG. 18 is a schematic of a MONOWELL having a 7 inch monodiameter casing and a 4.5 to 5.5 monobore full production delivery system using mechanical and fluid technologies.

Referring now to FIG. 18, other technologies can be used to achieve the monodiameter and monobore in combination or separately from the above technologies. In the system illustrated in FIG. 18, the formations are drilled and isolated while their mechanical pressure integrity is increased through chemical processes, such as drill ahead material 238 and chemical casing material 236. This allows larger portions of the upper borehole 10A to be drilled. Regular or expandable casing 274 are then used for the structure of upper borehole 10A. If real-time chemical application methods are used, the system of FIG. 18 will result in fewer steps (i.e. less time) in the upper borehole well-construction process. Across the productive interval 300, drill-in fluids with sealing capabilities, with or without internal breakers, are used for drilling the section. If certain zones are not pay zones, but require attention to allow the next pay zone to be drilled, using a drill ahead material 238 to improve the pressure integrity of the formation will help achieve productive drilling. The reservoir section 300 can be completed openhole, with expandable screens 292 or expandable tubular liners 290, shown in FIG. 17, or traditional liners to maintain the monodiameter across the lower producing zone 300. Installing an expandable liner hanger 286 and a short section of expandable tubular 302 in the intersection of the upper borehole 10A and producing zone 300 can help maintain the monodiameter and monobore if desired.

If the monodiameter is to be maintained only in the upper wellbore 10A, completion options are open across the lower producing zone 300: frac pacs, gravel packs, cased liners, liner hangers, etc. The intersection between the upper borehole section 10A and lower producing zone 10B can include traditional equipment or expandables if desired.

The lower producing zone 10B is preferably drilled with SLICKBORE and/or near bit reamer or rotary steerable or rotary steerable with long gauge bit, energy balanced bit, or other bit system, full drift bit system, or disposable bit system. Drill-in fluid is drilling fluid which is compatible with the formation and is defined as having a minimum of 65% return permeability when tested against formation lithology and actual drill-in drilling fluid.

It should be appreciated that the lower producing borehole can be drilled with a compatible drill-in fluid and left openhole; the borehole can be drilled with drill-in fluid and perforated; the borehole can be drilled with drill-in fluid, underreamed either going down or up, and the formation sealed; the borehole can be drilled with drill-in fluid and an expandable screen or expandable composite installed; the borehole can be drilled with drill-in fluid, sealed and cased using conventional casing or expandables (Coil tubing, composites or tubulars) and perforated; the producing interval can be drilled with compatible drilling fluids (drill-in fluids), reamed with near bit reamer, perforated, stimulated (fractured) and a permanent support set in place such as expandables (tubulars or screens), conventional tubulars or screens, alternating path screens or composite screens; the producing interval can be drilled using bit and liner combination as drill string, left in hole and expanded or not expanded. The liner may or may not be a composite, tubular, expandable materials, non-ferrous alloys, ferrous materials or nanotechnology materials.

Referring again to FIG. 3, there is shown a particular example of a MONOWELL. A monodiameter producing borehole 10B is drilled from the reservoir barrier 16 and across or through the reservoir 30 to the bottom of the well 15, with temporary sealing, over-balanced, under-balanced or special drilling fluids. In the producing borehole 10B, the near bit reamer is preferred because it builds a smooth borehole allowing for a better completion—whether it is an expandable screen only, liquid screen, some type of stimulation and screen, or perforating and cased borehole. The near bit reamer can be used in applying a formation compatible fluid for producing through it such as a specialized drill-in fluid that has internal breakers it can disperse with time. Drill-in compatible fluid may or may not have the internal breakers or traditional cement or expandable casing cement. Chemical solutions that do not result in deep reservoir damage can be applied while drilling the reservoir as well.

In drilling through the producing formation 30, particularly in sandstone, calcium carbonate is used to build a cake wall to hold back the pressures of the producing formation. The fluid which forms the cake wall may include an encapsulated breaker or a delayed breaker. The breakers are completely disbursed in the fluid for the cake wall. The breaker is typically an acid. The time release encapsulated acid is released over time in the cake wall. The encapsulation dissolves allowing the acid to allow production from the formation through the cake wall. This avoids or minimizes the need for acidizing the formation. Treatment, such as acidization, often is not effective along the entire interval exposed to the producing formation. The internal breakers are more evenly distributed in the cake wall throughout the producing interval, such that upon being released, the entire producing interval is acidized to increase production.

The cement may be liquid chemical casing. If it is dispersed across unconsolidated formation, then it may not be cement but fluids containment called liquid screens. Liquid screens or a liquid screen with expandable screens having the same diameter as the upper bore, i.e., monodiameter, can be placed across the reservoir. See the description of SANDWEDGE in U.S. Pat. Nos. 5,775,425; 5,787,986; 5,833,000; 5,839,510; 5,853,048; 5,871,049; 6,047,772; and 6,209,643, all hereby incorporated herewith by reference.

Producing borehole 10B is, normally, not chemical cased, however it is possible. Expandable casing with expandable casing cement or traditional cement and liner may be used. More traditional liners may be suspended in the lower end of the monodiameter casing and through the lower producing zone. However, a chemical casing may be part of the producing zone, initial drilling fluid system or a separate fluid or fluid slurry system that can be applied when the lower producing zone is underreamed. A production liner and/or screen 78 may be suspended adjacent the end of casing 70 and extend into or through the lower producing borehole 10B. The screen may be expandable or not expandable. Production tubing 80 is installed within casing 70, 78 for producing production reservoir 30. The casing 70, 78 and production tubing 80 may be conventional casing or expandable casing or expandable screen and production tubing. The well 12 may be completed by perforating the casing 78 adjacent the producing reservoir 30 with the perforations allowing produced fluids to flow into the production tubing 80 and flowing to the surface 14 as in well known in the art. The well does not require being perforated, it may be left openhole and screened (expandable or conventional). Only in the case of the solid liner (or solid expandables) will perforating be absolutely required.

The lower producing borehole 10B can be drilled with a drill-in liner and cased in place. A drill-in liner is either a part of the drill string or is mounted on the drill string above the bit. The drilling liner may be the work string. The liner may be mounted just above the bit allowing the bit to be withdrawn through the liner upon completion of drilling the borehole. Where the liner is mounted above the bit, the bit may be disconnected from the drill-in liner and removed by the attachment of an insert mounted on a drill string which is connected to the bit. The insert with bit are then pulled out of the liner and are removed and retrieved. The liner can be solid, expandable, screen or expandable screen. A screen may be used in place of the liner where the screen has the necessary mechanical strength to withstand the loads placed on it due to the drilling operation. The drill-in liner may or may not consist of removable MWD/LWD and bit. Also, it may or may not be cemented in place. The bottom hole assembly includes an MWD and LWD, which may or may not be able to be retrieved out of the bottom hole assembly. The bottom hole assembly may just be left in the borehole as a disposable assembly. A plunger then is lifted in the liner or screen to expand it outward. It should be appreciated that some other means may be used to expand the liner or screen. In essence the work string on the bottom hole assembly is then used as a liner.

FIG. 3 illustrates a monobore, i.e., a fullbore delivery system. A fullbore production delivery system has a completion tubular with a monodiameter production bore, i.e., the same nominal internal diameter throughout the inner conduit extending from the surface to the bottom of the well. The monobore does not necessarily extend through the production casing or may extend down through the casing, liner, or screen. While a well may have a monodiameter architecture, it may or may not have a full bore production delivery system. Thus the present invention may or may not include a fullbore production delivery system. If the well has both characteristics of a monodiameter casing and a fillbore production delivery system, then the well design is called a MONOWELL.

In the monobore completion design, the liner is seen as an extension of the tubing. The first requirement for a monobore completion is that it provides a consistent diameter throughout. In the present embodiment, to achieve the monobore, it is preferred but not necessary that the wellhead and Christmas tree be full bore to provide fill access to the reservoir. It is not mandatory. Most monobore wells will not have a full bore wellhead and Christmas tree. The monobore is defined as only extending from the tubing hanger down to the formation barrier. It does not have to extend through the Christmas tree and wellhead. The production is full bore if the production tubing is full bore from the tubing hanger to the formation barrier.

The number of completion components and type will vary according to field and well needs. The gauges for measuring pressure and temperature and the safety valve are all full bore. The nipple 22 near the bottom of the tubing is also full bore. Further, Halliburton has a through bore nipple which is full bore. Thus, the present embodiment provides no restrictions in the producing bore from the formation barrier to the surface. These all are part of the completion tubular string and have an inside diameter common to the entire string. The inside diameter of the completion tubulars normally has the same inside relative nominal diameter. Completion components normally do not have the same relative nominal diameter but are preferred in the monobore.

In one type monodiameter, the upper borehole 10A is cased and then the lower borehole 10B through the producing formation is cased with the lower casing/liner overlapping the lower end of the upper casing and being cladded thereto. At the overlap, the cladding increases the thickness of the monodiameter casing due to the overlapping of the two casing strings. Production tubing extends through the expandable casing in the upper borehole 10A and through the lower borehole 10B through the producing formation. The casing extending through the producing formation is perforated. In this method, there is no variance between the liner and the production tubing. There is a true monobore.

In another method, instead of cladding a casing string, an expandable liner hanger, suspending an expandable liner, is disposed from the lower end of the casing extending through the upper borehole 10A. To achieve the monodiameter casing, the liner and liner hanger are expanded. The expandable hanger includes a seal bore for receiving the lower end of the production tubing. In a second method, the tubing is stabbed into the top of the liner. A packer is disposed between the tubing and the casing. The expansion of the liner approximates the outer diameter of the previously set casing in the upper borehole 10A but it is not the same. There is a variance. Thus, in this method, although there are some variations, they are relatively small and the well may still be termed a MONOWELL because the well still achieves the objectives of the MONOWELL. The expandable liner is cemented in place and then is expanded. Production may take place through the liner and casing.

The previously described embodiments include first drilling and casing the non-producing wellbore 10A and then drilling and completing the producing wellbore 10B. Typically the reservoir formation 30 is treated differently then the non-producing formations, particularly with respect to the fluids, such as the drilling fluids. However, it should be appreciated that the non-producing formations and the producing formations may be treated essentially the same whereby the monodiameter wellbore 10 extends the entire length of the borehole, i.e., from the surface 14 to the bottom 15 (the completion target depth) of the well 12. This is particularly applicable where the formations are substantially all sandstone, such as in Saudi Arabia. The only differential between the non-producing and the producing wellbores will be the producing wellbore fluids should be compatible and not result in deep reservoir formation damage prohibiting maximum production.

Figure 19A:
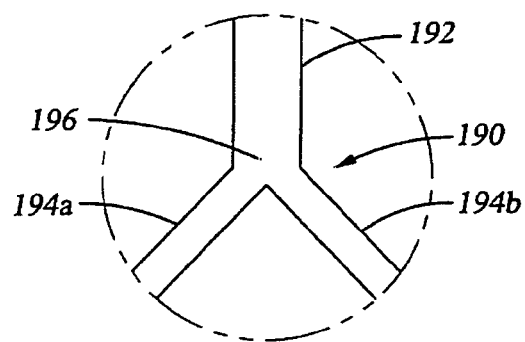
FIG. 19A is a schematic of a monodiameter multi-lateral well.

Referring now to FIGS. 19A and B, the above embodiments may be directed to multi-lateral and side-tracked wells. A multi-lateral well may be a modified MONOWELL extending from the junction to the surface. The multi-lateral is below the junction. FIG. 19A is a schematic of a multi-lateral well 190 having a trunk or upper borehole 192 extending to the surface 14 and a plurality of branch boreholes 194a, 194b extending to the same or different producing zones 30. Upper borehole 190 is connected to branch boreholes 194a, 194b at a junction 196. The upper borehole 192 of the multi-lateral well may be a monodiameter wellbore. The lateral boreholes may or may not be monodiameter sections below junction 196.

Figure 19B:
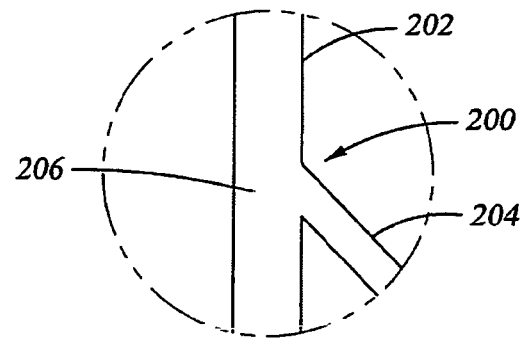
FIG. 19B is a schematic of a monodiameter side-tracked well.

FIG. 19B is a schematic of a side-tracked well 200 having a primary borehole 202 and a side tracked lateral borehole 204. Primary borehole 200 may be a new well or an existing well. Primary borehole 202 may be a monodiameter wellbore and the side tracked lateral borehole 204 below junction 206 may also be a monodiameter wellbore.

All the previous scenarios that have been discussed above with reference to non-producing borehole and producing borehole are applicable to other types of wells. The section that is called producing can be a water production well, water injection well, miscible gas well, water-alternating with gas well, or any other type well that penetrates the earth.

Figure 20:
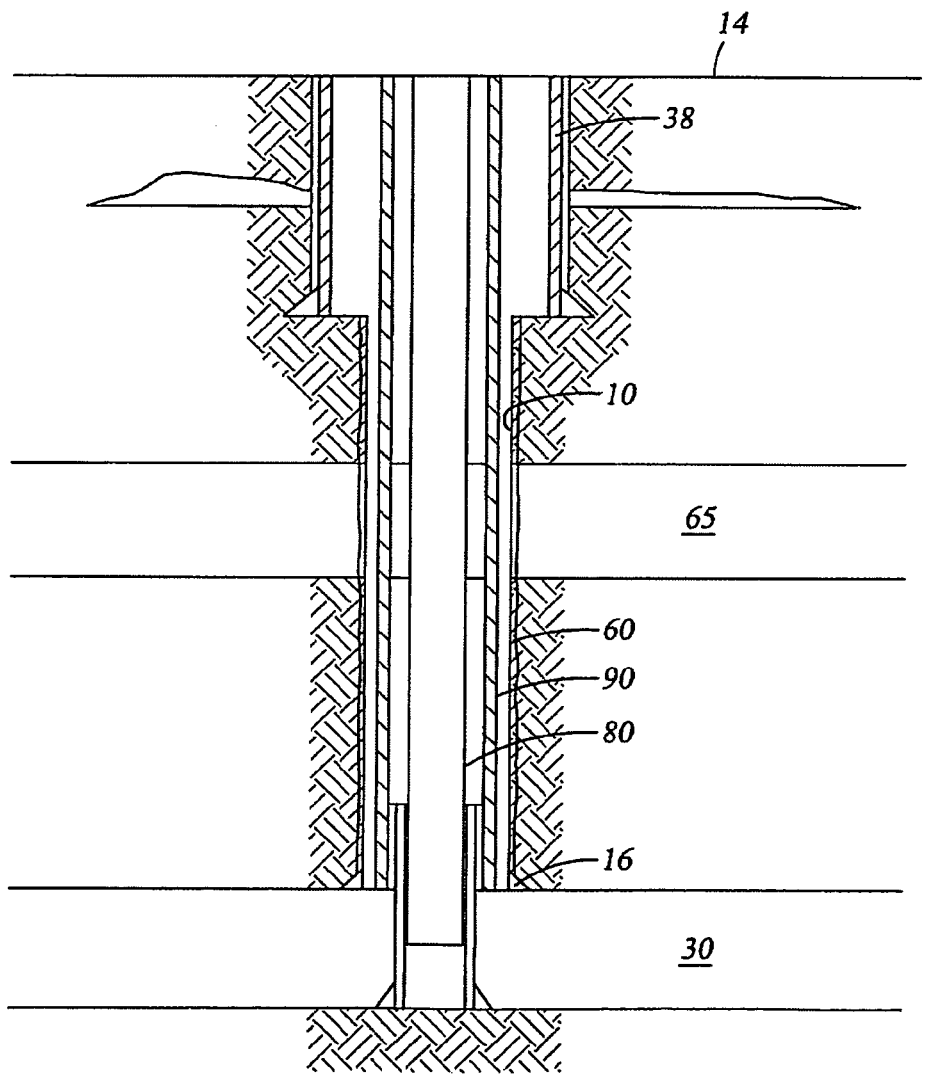
FIG. 20 is a schematic elevation view of a monodiameter wellbore having both chemical casing and expandable casing extending through the entire wellbore for a water well.

Referring now to FIG. 20, there is shown a preferred embodiment of a monodiameter water well of the present invention. FIG. 20 illustrates the monodiameter wellbore 10 in the completed stage. A conductor casing 38 for supporting a wellhead is installed into the earth's surface 14. Both chemical casing 60 and expandable casing 90 have been installed. The combination of the casing chemical and expandable tubulars provide a barrier to formations through which the wellbore 10 extends, such as, for example, problem formations 65. A production tubing string 80 extends from the surface 14 to the top of the reservoir 16 of the well. A specialized drilling fluid or chemical casing stabilizes the reservoir by solidifying near the wellbore wall 44 while not penetrating so deep as to damage the formation. Temporary stabilization can be achieved with chemical casing 60 until a metallic or composite casing, such as expandable casing 90 or possibly conventional casing is run.

Still further, the above embodiments may be directed to a monodiameter wellbore for an artificial lift well, such as a well containing gas lift, jet pump or a submersible pump.

Certain components of the monodiameter well construction have been used to minimize potential problems and are particularly useful during monodiameter well construction due to borehole stability issues or integrity issues that have to be addressed by non-conventional means.

The monodiameter wellbore may be drilled by various means including a propulsion system (See U.S. Pat. No. 6,296,066), a drilling rig, coiled tubing, pile driving, hydraulic workover, or any other means. Conventional drilling technology may be used. Also, the Anaconda drilling system may be used (See U.S. Pat. No. 6,296,066). Eventually, lasers being developed by the University of Colorado will be used for drilling. One method of drilling the wellbore includes pipe drive type devices. In that type of device, the pipe is driven into the formation. For example, jackhammers may be used for drilling the borehole.

Figure 21:
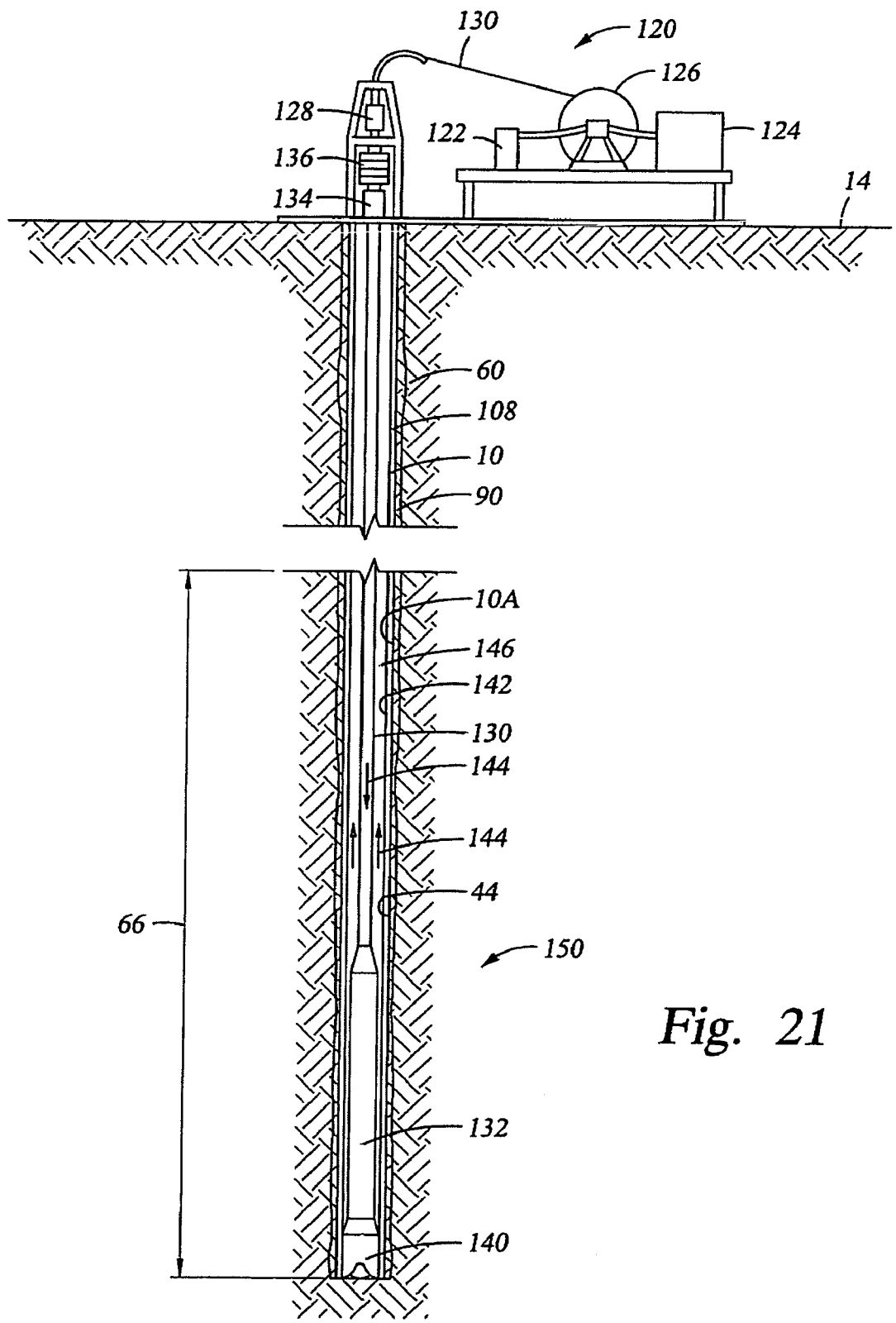
FIG. 21 is a schematic elevation view of a monodiameter wellbore being drilled with composite coiled tubing by a bottom hole assembly with a propulsion system.

Referring now to FIG. 21, there is shown another preferred well construction method to construct the monodiameter borehole using a coiled tubing drilling system 150 to drill a monodiameter wellbore 10 having a non-producing borehole 10A extending from the surface 14 to the reservoir barrier 16 and a producing or injection borehole 10B extending from the reservoir barrier 16 to the bottom 15 of the producing or injection zone 30. See FIG. 14. FIG. 21 shows a section 66 of non-producing wellbore 10A being drilled. The coiled tubing drilling system 120 includes a power supply 122, a processor 124, and a coiled tubing spool 126 at the surface 14. An injector head unit 128 feeds and directs coiled tubing 130 from the spool 126 into the borehole being drilled for monodiameter wellbore 10. Coiled tubing 130 may be steel or composite coiled tubing. The coiled tubing drilling system 120 includes a drilling assembly 150 having a coiled tubing string 130 with a bottom hole assembly 132 connected to its lower end and extending into wellbore 10.

The coiled tubing operation 120 utilizes spool 126 to feed the coiled tubing 130 over a guide and through injector 128 and stripper 134. The coiled tubing 130 is forced through blowout preventer 136 and into well 10 by injector 128. It should be appreciated that blowout preventers and other requisite safety control equipment may be deployed at the surface 14 for drilling and completing well 12. Further, it should be appreciated that this embodiment is described for explanatory purposes and that the present invention is not limited to the particular borehole disclosed, it being appreciated that the present invention may be used for various well plans. Operational parameters during the monodiameter well construction may include drilling and completion with overbalanced conditions, balanced conditions, or underbalanced conditions. All conditions are met by the apparatus and methods of the present invention.

The bottom hole assembly 132 is used for drilling the borehole and includes various components such as, for example, a propulsion system, a power section, an electronics section, a resistivity tool, a steerable assembly, a gamma ray and inclinometer instrument package, and a bit 140. The power section provides the power for rotation of bit 140. The bit 140 is preferably a SLICKBORE bit with a near bit reamer just above it. The resistivity tool determines the formation resistivity around the bottom hole assembly 132. The steerable assembly changes the trajectory of the borehole and the gamma ray and inclinometer instrument package evaluates the characteristics of the formation at the bit 140 and provides early information about the orientation and angle control of the bit 140 within the borehole. The power section is typically a downhole motor driven by the drilling fluids passing through the coiled tubing 130. The bottom hole assembly may include a seismic at bit or a testing while drilling tool. See U.S. provisional patent application Ser. No. 60/381,243 filed May 17, 2002 entitled MWD Formation Tester, hereby incorporated herein by reference. U.S. Provisional patent application Ser. No. 60/381,243 was converted to U.S. Pat. No. application Ser. No. 10/440,835 filed May 19, 2003. One preferred coiled tubing drilling system using composite coiled tubing is described in U.S. Pat. No. 6,296,066, hereby incorporated herein by reference. See also SPE 60750 "Anaconda: Joint Development Project Leads to Digitally Controlled Composite Coiled Tubing Drilling System", by Marker, Haukvik, Terry, Paulk, Coats, Wilson, Estep, Farabee, Berning and Song, dated Apr. 5-6, 2000.

The bottom hole assembly 132 and bit 140 are shown drilling borehole section 66 after having drilled and cased the upper section sections of borehole 10A, such as sections 46, 56 shown in FIG. 14. Drilling fluids 144 flow through the flowbore of coiled tubing 130 and back up the annulus 146. Although FIG. 21 illustrates the borehole 10A being cased with chemical casing 60 and expandable casing 90, the coiled tubing system 120 may be used with chemical casing, expandable casing, coil tubing or expandable coil tubing—metallic or composite, or a combination of chemical casing and expandable casing. It should be appreciated that the coiled tubing system may be used with any of the previously described methods and apparatus.

Figure 22:
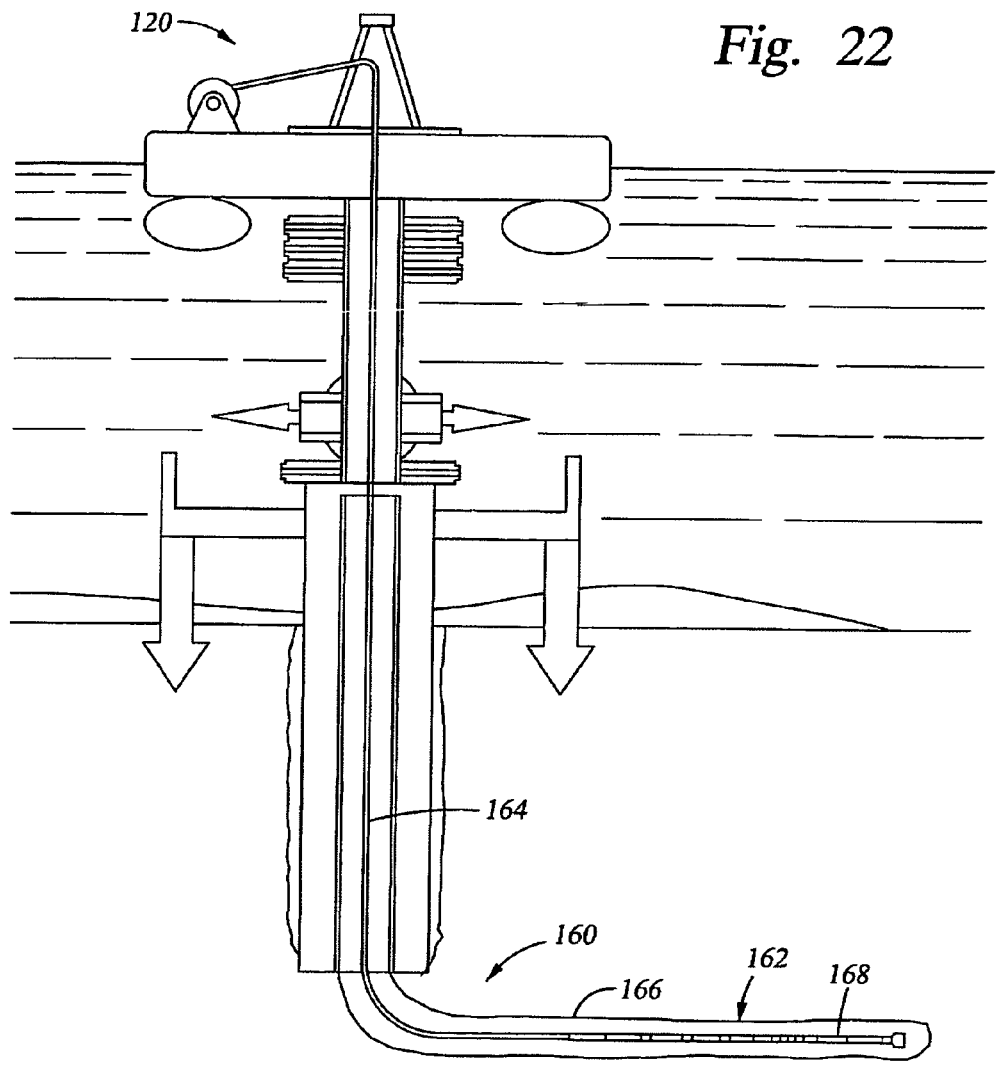
FIG. 22 is a schematic of a wired composite drilling unit for reservoir drilling and completion.

Referring now to FIG. 22, the wired composite coiled tubing system 160 with an integrated MWD/LWD can provide major benefits during the Monowell construction process. The system 160 enables continuous data transmission during all operational procedures, including procedures during which previous conventional data transmission becomes disabled. Furthermore, the transmission rate is greatly increased, resulting in high-resolution real-time data from sensors for formation evaluation, directional readings, pressure measurement, tension/weight on bit (WOB), for example. The high-resolution and continuous data transmission help to solve the potential challenges introduced when drilling a monodiameter well. These challenges include higher ECDs, longer openhole intervals, reduced clearances, and more. The high-quality data also have the potential to enable more effective use of other new technologies that address the geomechanical environment of the well. The wired composite coiled tubing system 160 can identify permeable zones, drilling-induced fractures, and borehole ballooning.

The continuous access to the data, including during trips, can help to provide early indications of potential problems such as fracture initiation or borehole instability. The knowledge of the location of loss zones can improve the effectiveness of chemical treatments to increase the fracture resistance of the open hole. This knowledge is particularly useful when drill ahead materials or chemical casing materials might have to be used to fill a washed out area before the expandables are set in a sequential well-construction process. Also, it can be quite useful when chemical casing can be used to drill long intervals before any casing is set.

In certain situations, management of ECDs can be important to the success of a monodiameter well-construction project. The wired composite coiled tubing system 160 with a MWD/LWD bottomhole assembly 162 can enhance the ability to manage ECDs. The use of coiled tubing as a drill string enables continuous circulation while tripping in the hole and allows continuous optimization of drilling fluid properties throughout the borehole and active drilling fluids system. Continuous access to annular pressure measurements transmitted through the wired coiled tubing 164 provides useful information about ECDs. With this information, drilling parameters and fluid properties are continuously adjusted to remain within the limits of pore pressure and fracture pressure (leakoff). Reductions in pressure resulting from swabbing are eliminated in a smooth, continuous manner by pumping through the coiled tubing drill string 164 while tripping out of the borehole 166.

In addition to the enhanced ability to control the pressure in the wellbore, the system 160 improves the capability to measure pore pressure and fracture pressure. If gas influx is observed when the pumps are stopped or slowed down, the wellbore pressure during the event can be precisely measured. Likewise, a formation integrity test (FIT) or a LOT can be performed with real-time downhole measurements of the transient pressure behavior during the test. During a LOT, which involves fracturing of the formation, this high-resolution data improves and speeds up the interpretation of the test. During a FIT, in which fracturing is not desired, the high quality of the real-time data can prevent inadvertent fracturing of the formation. Constant PWD measurements obtained through the wired composite drilling system 160 also give a high degree of control.

These characteristics of the system 160 create the potential to more safely operate within a narrower window of pore pressure and fracture gradient than is possible with previous technology. While the reservoir hole is drilled, the improved control of pressure in the wellbore, along with the potential for enhanced understanding of fracture resistance, reduces the chance of losing drilling fluids to the reservoir. This reduction helps prevent production problems associated with such losses.

The wired composite tubing 164 allows the bottomhole assembly to be engineered differently from conventional MWD/LWD systems. Conventional systems are self-powered with either batteries or turbines. Batteries are expensive, hazardous, and must be periodically changed. Turbines are complex mechanical devices that are susceptible to erosion and plugging. The mud pulser also suffers from these mechanical failures. The pulser is a slow telemetry method. It can send only a fraction of the sensor measurements to surface in real time. It can only operate during circulation, and therefore, it precludes telemetry during tripping with jointed pipe. This attribute requires that these prior art systems store the majority of their acquired data in the downhole tool memory. This data can be obtained only by tripping the bottomhole assembly out of the hole and downloading through a cable at surface. These prior art tools are preconfigured to attempt to optimize the storage and telemetry of the data. Large processors are used in the downhole tools to process the sensor signals and raw data to minimize the size of the stored data. Often, the data needed to make decisions is not transmitted in real time and is left in the tool's memory until the next trip out of the hole.

Figure 22A:
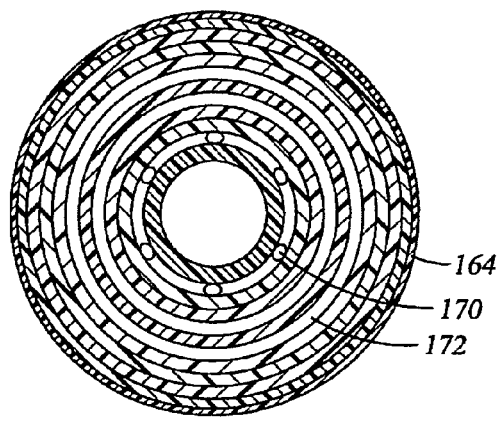
FIG. 22A is a cross-section through the wired composite coiled tubing showing conductors embedded in the wall of the composite tubing.

The wired composite tubing 164 and bottomhole assembly 168 are able to avoid this paradigm due to the embedded wires in the tubing 164. Power is provided from the surface, eliminating the need for batteries or turbines. All the raw sensor data is transmitted immediately to the surface in real-time, negating the need for a pulser. These three components typically have the highest rate of failure in conventional MWD/LWD systems. Because the raw sensor data is processed at surface, large processors or downhole memory are unnecessary. This benefit reduces complexity and eliminates large components on printed circuit boards in the downhole tools that are susceptible to vibration and shock. Quality assurance is easily monitored for the wired composite tubing 164 and bottomhole assembly 168. Most importantly, the availability of all the data, all the time, allows accurate, real-time decisions to be made while drilling. FIG. 22A is a cross-section through the wired composite coiled tubing 164 showing conductors 170 embedded in the wall 172 of the composite tubing 164.

A number of factors are important to the performance and reliability of a horizontal completion. Reservoir characteristics, effective well length, and near-wellbore conditions determine the inflow performance of the completion. Formation characteristics, such as sand uniformity and shaliness, along with the inflow performance, are important to the reliability of completions in unconsolidated formations. More effective placement of the horizontal well in the desired production zone leads to improvements in performance and reliability.

The formation evaluation sensors in the wired composite tubing and bottomhole assembly consist of an azimuthally focused gamma ray sensor for bed dip determination and a resistivity sensor with multiple depths of investigation for optimum wellbore placement. These sensors are particularly suited for high-inclination wells and geosteering the well-path across or through the reservoir.

Perforations, expandable screens, mechanical completion shutoffs, and chemical solutions/techniques are more efficiently placed using the wired composite coiled tubing and bottomhole assembly. For a monodiameter/monobore well, the most important goal is to have the most efficient well-construction process possible with the maximum production possible. The wired composite coiled tubing drilling-completion system supports this overall philosophy.

The MONOWELL/monodiameter architecture may be used with any type of reservoir formation and in any environment (deepwater, offshore, or land). The MONOWELL construction may be considered for hard rock, marginal exploration areas, marginal production fields, and infill field drilling. All of these areas demand that production be maximized and cost be minimized as much as possible. Before a well is drilled, the attributes of underbalance drilling should also be considered, along with how these attributes support the MONOWELL.

Anaconda's propulsion system and wired composite coiled tubing 130 allows for it to be set as a casing or completion liner directly across the interval. The propulsion system may or may not be removed from the well. The wiring within the wall of the composite tubing 130 can be used to actuate a disconnect at the top of the coil to allow for permanent setting in the well.

While underbalance drilling can occur using the traditional rig, the optimum solution for the MONOWELL is to integrate the wired composite coiled tubing with underbalance drilling. Using underbalance devices, such as a trip valve that allows the bottomhole assembly to be retrieved without killing the well, can allow real-time well testing by flowing the well to a separation vessel. Also, mud-logging data, downhole well-testing data, downhole pressure, and lithologies may be collected from the wired composite coiled tubing and bottomhole assembly drilling system for data acquisition and analyses. This integrated underbalanced wired composite drilling system is an optimum production drilling system for consideration when constructing a MONOWELL.

Depending on the MONOWELL's inner wellbore diameters, drilling hydraulics, and production requirements, differential sticking tolerances can be very limited. Underbalance drilling can help reduce, if not eliminate, differential sticking, allowing smaller diameters to be constructed.

In a still another preferred method and apparatus of the present invention, the coil tubing can be utilized as the casing or it can be expanded and used as the casing. Additional details are set forth in U.S. patent application Ser. No. 10/016,786 filed Dec. 10, 2001 entitled "Casing While Drilling", now U.S. Pat. No. 6,722,451, hereby incorporated herein by reference. See also IADC/SPE 59126 "Simultaneous Drill and Case Technology—Case Histories, Status and Options for Further Development", by Hahn, Van Gestel, Frohlich, and Stewart, dated Feb. 23-25, 2000.

There are shown specific embodiments of the present invention with the understanding that the present disclosure is to be considered an exemplification of the principles of the invention, and is not intended to limit the invention to that illustrated and described herein. Various dimensions, sizes, quantities, volumes, rates, and other numerical parameters and numbers have been used for purposes of illustration and exemplification of the principles of the invention, and is not intended to limit the invention to the numerical parameters and numbers illustrated, described or otherwise stated herein.

While a preferred embodiment of the invention has been shown and described, modifications thereof can be made by one skilled in the art without departing from the spirit of the invention.

The invention claimed is:

1. A method for drilling a monodiameter well bore through an unconsolidated formation, the method comprising:
   drilling an initial portion of the well bore with a drilling assembly having a bit, downhole motor and reamer,
   drilling said well bore with a drilling fluid having a pH in the range of from about 6 to about 10 and comprised of water, a polymeric cationic catalyst capable of accepting and donating protons which is adsorbed on said unconsolidated formation, a water soluble or dispersible polymer which is capable of being cross-linked by a thermoset resin and causing said resin to be hard and tough when cured and a water soluble or dispersible thermoset resin which cross-links said polymer, is catalyzed and cured by said catalyst and consolidates said unconsolidated formation;
   repeating the above steps by drilling additional well bore portions until the wellbore is drilled; and
   installing a string of casing in the borehole.

2. The method of claim 1 wherein said polymeric cationic catalyst is selected from the group consisting of polyethyleneimine, poly(dimethylaminoethylmethacrylate) and poly(dimethylaminopropylmethacrylate).

3. The method of claim 1 wherein said water soluble or dispersible polymer which is cross-linked by said thermoset resin is selected from the group consisting of polymers containing one or more of hydroxyl, amide, carboxyl and epoxy functional groups.

4. The method of claim 1 wherein said water soluble or dispersible polymer which is cross-linked by said thermoset resin is selected from the group consisting of polyvinylalcohol, polyvinylbutyral, polyesters, polyalkylacrylic acids, polyurethanes, acrylamide polymers, proteins, polyols and polysaccharides selected from the group consisting of chitosan, hydroxyethylcellulose, carboxymethylhydroxyethylcellulose, water soluble starches, guar gum, xanthan gum, welan gum, carragenan gum and arabic gum.

5. The method of claim 1 wherein said water soluble or dispersible thermoset resin is selected from the group consisting of melamine-formaldehyde type resins, urea-formaldehyde type resins and phenol-formaldehyde type resins.

6. The method of claim 1 wherein said water soluble or dispersible thermoset resin is selected from the group consisting of an alkyl ether of a melamine-formaldehyde resin and an alkyl ether of a urea-formaldehyde resin.

7. The method of claim 1 wherein said polymeric cationic catalyst is present in said drilling fluid in an amount in the range of from about 1% to about 15% by weight of water in said drilling fluid.

8. The method of claim 1 wherein said polymer which is cross-linked by said thermoset resin is present in said drilling fluid in an amount in the range of from about 0.5% to about 20% by weight of water in said drilling fluid.

9. The method of claim 1 wherein said thermoset resin is present in said drilling fluid in an amount in the range of from about 5% to about 80% by weight of water in said drilling fluid.

10. The method of claim 1 wherein the pH of said drilling fluid is about 8.

11. A method for drilling a monodiameter well bore through an unconsolidated formation, the method comprising:
    drilling an initial portion of the well bore with a drilling assembly having a bit, downhole motor and reamer;
    drilling said well bore with a drilling fluid having a pH in the range of from about 6 to about 10 and comprised of water and a polymeric cationic catalyst capable of accepting and donating protons which is adsorbed on said unconsolidated formation;
    contacting said well bore with a treating fluid having a pH in the range of from about 6 to about 10 and, comprised of water, a water soluble or dispersible polymer which is capable of being cross-linked by a thermoset resin and causing said resin to be hard and tough when cured and a water soluble or dispersible thermoset resin which cross-links said polymer, is catalyzed and cured by said catalyst and consolidates said unconsolidated formation
    repeating the above steps by drilling additional well bore portions until the wellbore is drilled; and
    installing a string of casing in the borehole.

12. The method of claim 11 wherein said polymeric cationic catalyst is selected from the group consisting of polyethyleneimine, poly(dimethylaminoethylmethacrylate) and poly(dimethylaminopropylmethacrylate).

13. The method of claim 11 wherein said water soluble or dispersible polymer which is cross-linked by said thermoset resin is selected from the group consisting of polymers containing one or more of hydroxyl, amide, carboxyl and epoxy functional groups.

14. The method of claim 11 wherein said water soluble or dispersible polymer which is cross-linked by said thermoset resin is selected from the group consisting of polyvinylalcohol, polyvinylbutyral, polyesters, polyalkylacrylic acids, polyurethanes, acrylamide polymers, proteins, polyols and polysaccharides selected from the group consisting of chitosan, hydroxyethylcellulose, carboxymethylhydroxyethylcellulose, water soluble starches, guar gum, xanthan gum, welan gum, carragenan gum and arabic gum.

15. The method of claim 11 wherein said water soluble or dispersible thermoset resin is selected from the group consisting of melamine-formaldehyde type resins, urea-formaldehyde type resins and phenol-formaldehyde type resins.

16. The method of claim 11 wherein said water soluble or dispersible thermoset resin is selected from the group consisting of an alkyl ether of a melamine-formaldehyde resin and an alkyl ether of a urea-formaldehyde resin.

17. The method of claim 11 wherein said polymeric catioinc catalyst is present in said drilling fluid in an amount in the range of from about 1% to about 15% by weight of water in said drilling fluid.

18. The method of claim 11 wherein said polymer which is cross-linked by said thermoset resin is present in said treating fluid in an amount in the range of from about 0.5% to about 20% by weight of water in said treating fluid.

19. The method of claim 11 wherein said thermoset resin is present in said treating fluid in an amount in the range of from about 5% to about 80% by weight of water in said treating fluid.

20. The method of claim 11 wherein said drilling fluid and treating fluid both have a pH of about 8.

21. A method for drilling a monodiameter well bore, the method comprising:
drilling an initial portion of the wellbore with a drilling assembly having a bit, downhole motor and reamer;
drilling the wellbore portion with drilling fluid having a pH in the range of from about 6 to about 10 and comprised of water, a water soluble or water dispersible polymer which is capable of being cross-linked by a thermoset resin and causing said resin to be hard and tough when cured, a particulate curable solid thermoset resin, a water soluble or dispersible thermoset resin, and a delayed dispersible acid-catalyst for curing said solid thermoset resin and said water soluble thermoset resin, said drilling fluid forming a filter cake on the walls of said well bore that cures into a hard and tough cross-linked chemical casing thereon;
forming a chemical casing on the wellbore portion;
repeating the above steps by drilling additional wellbore portions until the welibore is drilled; and
installing a string of casing in the wellbore.

22. The method of claim 21 wherein said water soluble or dispersible polymer which is cross-linked by said thermoset resin is selected from the group consisting of polymers containing one or more of hydroxyl, amide, carboxyl and epoxy functional groups.

23. The method of claim 21 wherein said water soluble or dispersible polymer which is cross-linked by said thermoset resin is selected from the group consisting of polyvinylalcohol, polyvinylbutyral, polyesters, polyalkylacrylic acids, polyurethanes, acrylamide polymers, proteins, polyols and polysaccharides selected from the group consisting of chitosan, hydroxyethylcellulose, carboxymethylhydroxyethylcellulose, water soluble starches, guar gum, xanthan gum, welan gum, carragenan gum and arabic gum.

24. The method of claim 21 wherein said particulate curable solid thermoset resin is selected from the group consisting of particulate solid melamine-formaldehyde type resins, particulate solid urea-formaldehyde type resins and particulate solid phenol-formaldehyde type resins.

25. The method of claim 21 wherein said particulate curable solid thermoset resin is selected from the group consisting of an alkyl ether of a melamine-formaldehyde resin and an alkyl ether of a urea-formaldehyde resin.

26. The method of claim 21 wherein said water soluble thermoset resin is selected from the group consisting of water soluble melamine-formaldehyde type resins, water soluble urea-formaldehyde type resins and water soluble phenol-formaldehyde type resins.

27. The method of claim 21 wherein said water soluble or dispersible thermoset resin is selected from the group consisting of an alkyl ether of a melamine-formaldehyde resin and an alkyl ether of a urea-formaldehyde resin.

28. The method of claim 21 wherein the acid in said delayed dispersible acid catalyst is an organic or inorganic acid selected from the group consisting of p-toluene sulfonic acid, dinonylnaphthalene sulfonic acid, dodecyl benzene sulfonic acid, oxalic acid, maleic acid, hexamic acid, a copolymer of phthalic and acrylic acid, trifluoromethane sulfonic acid, phosphonic acid, sulfuric acid, hydrochloric acid, sulfamic acid and ammonium salts that produce acids when dissolved in water.

29. The method of claim 21 wherein said drilling fluid further comprises one or more insoluble chemical casing reinforcing materials selected from the group consisting of carbon fibers, glass fibers, mineral fibers, cellulose fibers, silica, zeolite, alumina, calcium sulfate hemihydrate, acrylic latexes, polyol-polyesters and polyvinyl butyral.

30. The method of claim 21 wherein said water soluble or water dispersible polymer which is cross-linked by said thermoset resin is present in said drilling fluid in an amount in the range of from about 0.5% to about 20% by weight of water in said drilling fluid.

31. The method of claim 21 wherein said particulate curable solid thermoset resin is present in said drilling fluid in an amount in the range of from about 5% to about 50% by weight of water in said drilling fluid.

32. The method of claim 21 wherein said water soluble thermoset resin is present in said drilling fluid in an amount in the range of from about 5% to about 80% by weight of water in said drilling fluid.

33. The method of claim 21 wherein said acid in said delayed dispersible acid catalyst is present in said drilling fluid in an amount in the range of from about 0.5% to about 8% by weight of thermoset resin in said drilling fluid.

34. The method of claim 33 wherein said one or more insoluble chemical casing reinforcing materials are present in said drilling fluid in an amount in the range of from about 2% to about 25% by weight of water in said drilling fluid.

35. The method of claim 21 wherein the pH of said drilling fluid is about 8.

36. A method of consolidating unconsolidated formations and forming a chemical casing in a well bore penetrating the formations to improve the mechanical strength thereof while drilling the well bore comprising drilling said well bore with a drilling fluid having a pH in the range of from about 6 to about 10 and comprised of water, a polymeric cationic catalyst capable of accepting and donating protons which is adsorbed on said unconsolidated clays, shale, sand stone and the like, a water soluble or dispersible polymer which is capable of being cross-linked by a thermoset resin and causes said resin to be hard and tough when cured, a particulate curable solid thermoset resin, a water soluble thermoset resin and a dispersible delayed acid catalyst for curing said thermoset resins, said drilling fluid forming a filter cake on the walls of said well bore that cures and consolidates said unconsolidated formations penetrated by said well bore and forms a hard and tough cross-linked chemical casing on the walls of said well bore.

37. A method of consolidating unconsolidated formations and forming a chemical casing in a well bore penetrating the formation to improve the mechanical strength of the well bore while drilling the well bore comprising:
drilling said well bore with a drilling fluid having a pH in the range of from about 6 to about 10 and comprised of water, a polymeric cationic catalyst capable of accepting and donating protons which is adsorbed on said unconsolidated formations, a particulate curable solid thermoset resin and a delayed acid catalyst for curing said solid resin, said drilling fluid forming a filter cake on the walls of said well bore that cures and consolidates said unconsolidated formations penetrated by said well bore; and
contacting said well bore with a treating fluid comprised of water, a water soluble or dispersible polymer which is capable of being cross-linked by a thermoset resin and causing said resin to be hard and tough when cured and a water soluble or dispersible thermoset resin, said treating fluid components depositing on said filter cake formed in the previous step and said thermoset resin curing into a hard and tough cross-linked chemical casing on the walls of said well bore.

* * * * *